(12) United States Patent
Grossmann et al.

(10) Patent No.: US 12,388,600 B2
(45) Date of Patent: Aug. 12, 2025

(54) FLEXIBLE SRS SOUNDING FOR NR SYSTEMS

(71) Applicant: FRAUNHOFER-GESELLSCHAFT ZUR FOERDERUNG DER ANGEWANDTEN FORSCHUNG E.V., Munich (DE)

(72) Inventors: Marcus Grossmann, Erlangen (DE); Venkatesh Ramireddy, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 242 days.

(21) Appl. No.: 18/145,865

(22) Filed: Dec. 23, 2022

(65) Prior Publication Data

US 2023/0198713 A1 Jun. 22, 2023

Related U.S. Application Data

(63) Continuation of application No. PCT/EP2021/067325, filed on Jun. 24, 2021.

(30) Foreign Application Priority Data

Jun. 25, 2020 (EP) ..................................... 20182349

(51) Int. Cl.
*H04L 5/00* (2006.01)
(52) U.S. Cl.
CPC .......... *H04L 5/0051* (2013.01); *H04L 5/0012* (2013.01); *H04L 5/0092* (2013.01)

(58) Field of Classification Search
CPC ... H04B 1/7143; H04L 5/0048; H04L 5/0051; H04L 5/0092; H04L 5/006; H04L 5/0012
See application file for complete search history.

(56) References Cited

U.S. PATENT DOCUMENTS

| | | | |
|---|---|---|---|
| 2020/0169369 A1 | 5/2020 | Gao et al. | |
| 2023/0239088 A1* | 7/2023 | Gao | H04L 5/0051 370/329 |

FOREIGN PATENT DOCUMENTS

| | | |
|---|---|---|
| CN | 109921887 A | 6/2019 |
| WO | WO-2019210981 A1 | 11/2019 |

OTHER PUBLICATIONS

3GPP, "5G; NR; Physical layer procedures for data" 3GPP TS 38.214 V15.8.0 (Rel. 15)., etsi.org, Jan. 2020.
3GPP, "3GPP TSG RAN; NR; Radio Resource control (RRC) protocol specification (Rel. 16)", 3GPP TS 38.331 V16.0.0, 3gpp.org, Mar. 2020.
3GPP, 3GPP; TSG RAN; NR; Physical channels and modulation (Rel. 16), 3GPP TS 38.211 V16.1.0, 3gpp.org, Mar. 2020.
3Gpp, TS38.214 v15.9.0, NR Physical layer procedures for data, 3GPP Server release date (Mar. 26, 2020.).

* cited by examiner

*Primary Examiner* — Shukri Taha
(74) *Attorney, Agent, or Firm* — Perry + Currier

(57) ABSTRACT

A user device, UE, for a wireless communication network is configured or preconfigured with one or more Sounding Reference Signal, SRS, resources to be used for SRS transmissions. The one or more SRS resources include a plurality of frequency domain resources. Responsive to receiving an indication of a subset of SRS frequency domain resources for each resource, the UE performs an SRS transmission using the indicated subset of frequency domain resources.

15 Claims, 24 Drawing Sheets

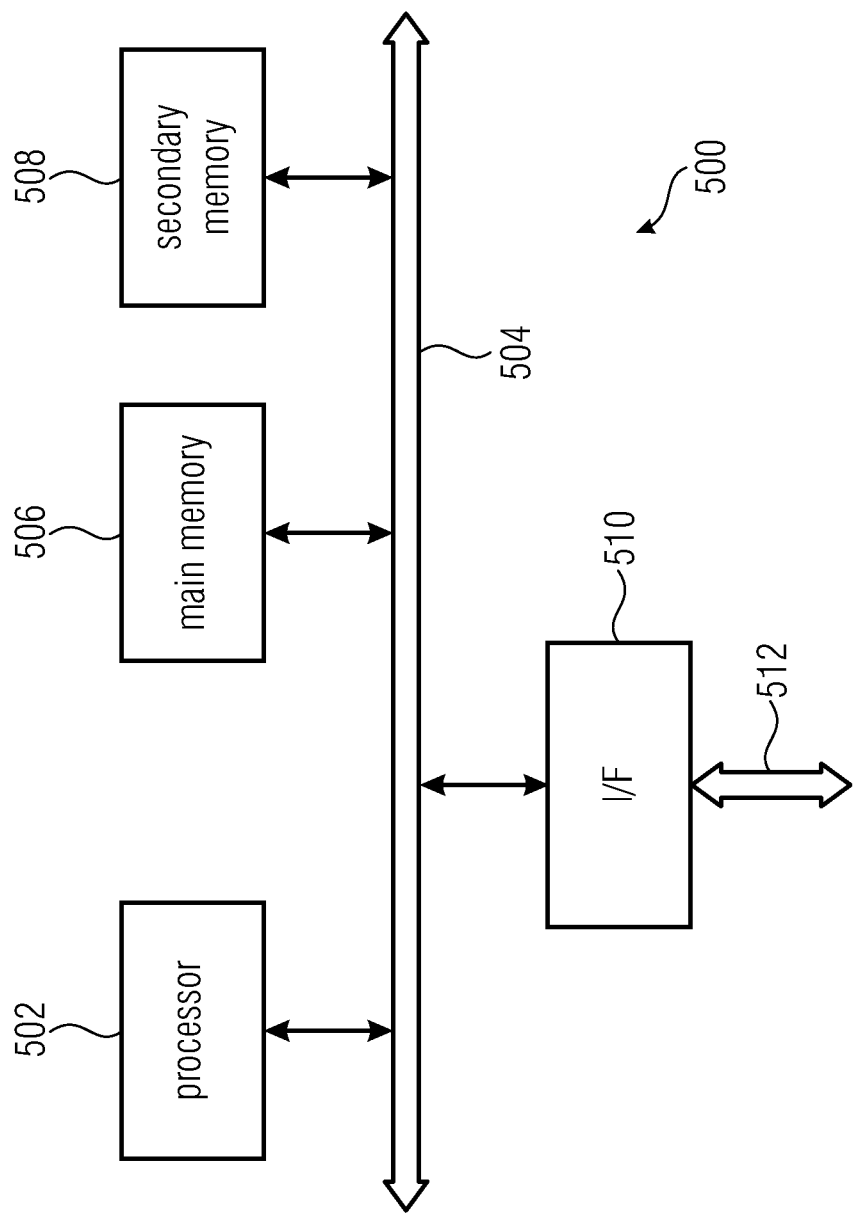

FLEXIBLE SRS SOUNDING FOR NR SYSTEMS

CROSS-REFERENCES TO RELATED APPLICATIONS

This application is a continuation of copending International Application No. PCT/EP2021/067325, filed Jun. 24, 2021, which is incorporated herein by reference in its entirety, and additionally claims priority from European Application No. EP 20 182 349.9, filed Jun. 25, 2020, which is incorporated herein by reference in its entirety.

BACKGROUND OF THE INVENTION

The present invention relates to the field of wireless communication systems or networks, more specifically to the field of determining a channel between a user device, UE, and a base station. Embodiments of the present invention relate to a flexible SRS sounding for NR systems or networks.

FIG. 1 is a schematic representation of an example of a terrestrial wireless network 100 including, as is shown in FIG. 1A, the core network 102 and one or more radio access networks $RAN_1$, $RAN_2$, ... $RAN_N$. FIG. 1B is a schematic representation of an example of a radio access network RAND that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, $UAV_S$, the latter also referred to as drones, buildings and other items or devices having embedded therein electronics, software, sensors, actuators, or the like as well as network connectivity that enables these devices to collect and exchange data across an existing network infrastructure. FIG. 1B shows an exemplary view of five cells, however, the RAND may include more or less such cells, and RAND may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1B by the arrows pointing to "core". The core network 102 may be connected to one or more external networks. The external network can be the Internet, or a private network, such as an Intranet or any other type of campus networks, e.g. a private WiFi or 4G or 5G mobile communication system. Further, some or all of the respective base station gNB, to $gNB_5$ may be connected, e.g. via the S1 or X2 interface or the XN interface in NR, with each other via respective backhaul links $116_1$ to $116_5$, which are schematically represented in FIG. 1B by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, the physical downlink, uplink and sidelink control channels, PDCCH, PUCCH, PSSCH, carrying for example the downlink control information, DCI, the uplink control information, UCI, and the sidelink control information, SCI. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also consist of a smaller number of OFDM symbols, e.g. when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base station gNB, to $gNB_5$, and a network of small cell base stations, not shown in FIG. 1, like femto or pica base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In a wireless communication system like to one depicted schematically in FIG. 1, multi-antenna techniques may be used, e.g., in accordance with LTE or NR, to improve user data rates, link reliability, cell coverage and network capacity. To support multi-stream or multi-layer transmissions, linear precoding is used in the physical layer of the communication system. Linear precoding may be performed by a precoder matrix which maps layers of data to ports. The precoding may be seen as a generalization of beamforming, which is a technique to spatially direct or focus a data transmission towards an intended receiver. The precoder matrix to be used at the gNB to map the data to the transmit antenna ports is decided using channel state information, CSI.

In a wireless communication system as described above, such as LTE or New Radio (5G), downlink signals convey data signals, control signals containing downlink, DL, control information (DCI), and a number of reference signals or symbols (RS) used for different purposes. A gNodeB (or gNB or base station) transmits data and control information (DCI) through the so-called physical downlink shared channel (PDSCH) and physical downlink control channel (PDCCH) or enhanced PDCCH (ePDCCH), respectively. Moreover, the downlink signal(s) of the gNB may contain one or multiple types of RSs including a common RS (CRS) in LTE, a channel state information RS (CSI-RS), a demodulation RS (DM-RS), and a phase tracking RS (PT-RS). The CRS is transmitted over a DL system bandwidth part (BWP) and used at the user equipment (UE) to obtain a channel estimate to demodulate the data or control information. The CSI-RS is transmitted with a reduced density in the time and frequency domain compared to CRS and used at the UE for channel estimation/channel state information (CSI) acquisition. The DM-RS is transmitted only in a bandwidth part of the respective PDSCH and used by the UE for data demodulation. For signal precoding at the gNB, several CSI-RS reporting mechanisms are used such as non-precoded CSI-RS and beamformed CSI-RS reporting (see reference [1]). For a non-precoded CSI-RS, a one-to-one mapping between a CSI-RS port and a transceiver unit, TXRU, of the antenna array at the gNB is utilized. Therefore, non-precoded CSI-RS provides a cell-wide coverage where the different CSI-RS ports have the same beam-direction and beam-width. For beamformed/precoded UE-specific or non-UE-specific CSI-RS, a beam-forming operation is applied over a single- or multiple antenna ports to have several narrow beams with high gain in different directions and therefore, no cell-wide coverage.

It is noted that the information in the above section is only for enhancing the understanding of the background of the invention and, therefore, it may contain information that does not form conventional technology that is already known to a person of ordinary skill in the art.

Starting from the above, there may be a need for improvements or enhancements of sounding a channel between a user device and a base station in a wireless communication system or network.

SUMMARY

An embodiment may have a user device, UE, for a wireless communication network, wherein the UE is configured or preconfigured with one or more Sounding Reference Signal, SRS, resources to be used for a SRS transmission, the one or more SRS resources comprising a plurality of frequency domain resources, wherein a bandwidth region used for the SRS transmission is associated with a set of frequency domain resources and segmented into multiple subbands, the bandwidth region being of size $m_{SRS,b}$ PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where $U \leq N$, and N denotes the number of subbands, and each bandwidth segment being associated with one or more subbands, and wherein, responsive to receiving an indication of a subset of SRS frequency domain resources, the UE is to perform an SRS transmission using the indicated subset of frequency domain resources, the indication indicating a single bandwidth segment to be used for the SRS transmission.

Another embodiment may have an entity for a wireless communication network, wherein the entity is to configure or preconfigure a user device, UE, with one or more Sounding Reference Signal, SRS, resources to be used for a Sounding Reference Signal, SRS, transmission, the one or more SRS resources comprising a plurality of SRS frequency domain resources, wherein the entity is to signal to the UE an indication of a subset of SRS frequency domain resources to be used by the UE for performing the SRS transmission, wherein a bandwidth region used for the SRS transmission is associated with a set of frequency domain resources and segmented into multiple subbands, the bandwidth region being of size $m_{SRS,b}$ PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where $U \leq N$, and N denotes the number of subbands, and each bandwidth segment being associated with one or more subbands, and wherein the indication indicates a single bandwidth segment to be used for the SRS transmission.

Another embodiment may have a method for operating a user device, UE, for a wireless communication network, the method having the steps of: configuring or preconfiguring the UE with one or more Sounding Reference Signal, SRS, resources to be used for a SRS transmission, the one or more SRS resources comprising a plurality of frequency domain resources, wherein a bandwidth region used for the SRS transmission is associated with a set of frequency domain resources and segmented into multiple subbands, the bandwidth region being of size $m_{SRS,b}$ PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where $U \leq N$, and N denotes the number of subbands, and each bandwidth segment being associated with one or more subbands, and responsive to receiving an indication of a subset of SRS frequency domain resources, performing an SRS transmission using the indicated subset of frequency domain resources, the indication indicating a single bandwidth segment to be used for the SRS transmission.

Another embodiment may have a method for operating an entity for a wireless communication network, the method having the steps of: configuring or preconfiguring a user device, UE, with one or more Sounding Reference Signal, SRS, resources to be used for a Sounding Reference Signal, SAS, transmission, the one or more SRS resources comprising a plurality of SRS frequency domain resources, and signaling to the UE an indication of a subset of SRS frequency domain resources to be used by the UE for performing the SRS transmission, wherein a bandwidth region used for the SRS transmission is associated with a set of frequency domain resources and segmented into multiple subbands, the bandwidth region being of size $m_{SRS,b}$ PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where U≤N, and N denotes the number of subbands, and each bandwidth segment being associated with one or more subbands, and wherein the indication indicates a single bandwidth segment to be used for the SRS transmission.

Another embodiment may have a non-transitory digital storage medium having a computer program stored thereon to perform a method for operating a user device, UE, for a wireless communication network, the method having the steps of: configuring or preconfiguring the UE with one or more Sounding Reference Signal, SRS, resources to be used for a SRS transmission, the one or more SRS resources comprising a plurality of frequency domain resources, wherein a bandwidth region used for the SRS transmission is associated with a set of frequency domain resources and segmented into multiple subbands, the bandwidth region being of size $m_{SRS,b}$ PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where U≤N, and N denotes the number of subbands, and each bandwidth segment being associated with one or more subbands, and responsive to receiving an indication of a subset of SRS frequency domain resources, performing an SRS transmission using the indicated subset of frequency domain resources, the indication indicating a single bandwidth segment to be used for the SRS transmission, or a method for operating an entity for a wireless communication network, the method having the steps of: configuring or preconfiguring a user device, UE, with one or more Sounding Reference Signal, SRS, resources to be used for a Sounding Reference Signal, SRS, transmission, the one or more SRS resources comprising a plurality of SRS frequency domain resources, and signaling to the UE an indication of a subset of SRS frequency domain resources to be used by the UE for performing the SRS transmission, wherein a bandwidth region used for the SRS transmission is associated with a set of frequency domain resources and segmented into multiple subbands, the bandwidth region being of size $m_{SRS,b}$ PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where U≤N, and N denotes the number of subbands, and each bandwidth segment being associated with one or more subbands, and wherein the indication indicates a single bandwidth segment to be used for the SRS transmission.

BRIEF DESCRIPTION OF THE DRAWINGS

Embodiments of the present invention will be detailed subsequently referring to the appended drawings, in which:

FIG. 25 illustrates an example of a computer system on which units or modules as well as the steps of the methods described in accordance with the inventive approach may execute.

DETAILED DESCRIPTION OF THE INVENTION

Figure 1A:
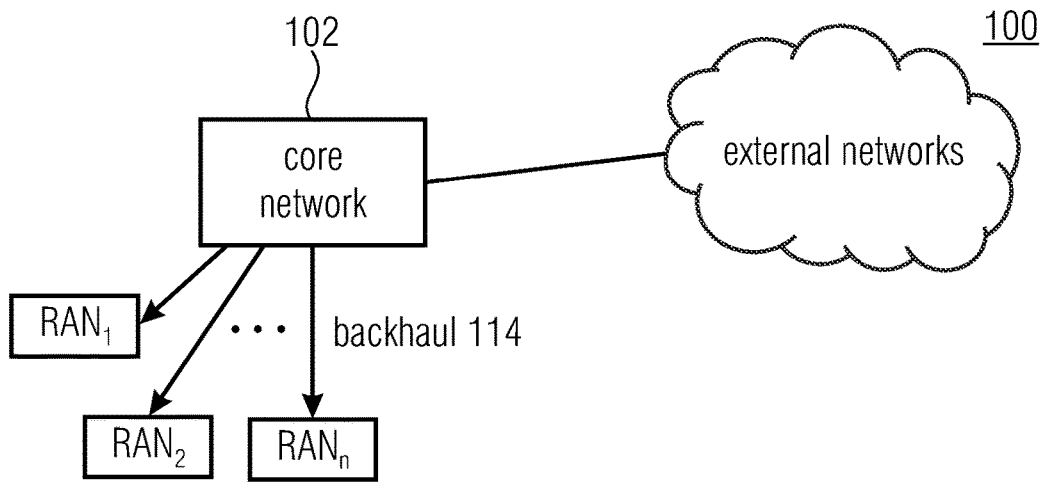
FIG. 1A is a schematic representation of an example of a terrestrial wireless network is a schematic representation of an example of a terrestrial wireless network including a core network and one or more radio access networks.

Embodiments of the present invention are now described in more detail with reference to the accompanying drawings, in which the same or similar elements have the same reference signs assigned.

In 5G NR, sounding reference signals (SRS) are UE specific reference signals transmitted by the UE for sounding the channel in the uplink. SRS are used for signal strength measurements in the case of beam management, UL CSI acquisition for link adaptation in the uplink and DL CSI acquisition when reciprocity is assumed in TDD.

Sounding reference signals (SRS) are UE specific reference signals transmitted by the UE in the uplink and are primarily used to aid the gNB to estimate the channel state information (CSI) in the uplink. The SRS transmissions are performed by the UE on a specific set of frequency domain resources which are configured to the UE by the network. Based on the SRS transmissions, the gNB estimates the CSI on the received SRS signals. The obtained CSI is used for a variety of purposes, namely for link adaptation in the uplink, downlink CSI acquisition, among many others. When uplink and downlink channel reciprocity is assumed, the downlink CSI is obtained based on the estimated uplink CSI. Furthermore, SRS transmissions are used for uplink beam management in 5G NR systems operating at frequency range 2 (FR2).

In the current NR specification (see reference [1]), the higher layer parameter 'SRS-config' is used to configure the UE with one or more resource set(s) with each resource set comprising one or more resource(s). The time domain behavior as well as the use case for each resource is specified on a resource set level. Amongst periodic, semi-persistent and aperiodic, the parameter 'resourceType' in 'SRS-config' specifies a particular time-domain behavior to a resource set. Upon reception of 'SRS-config', the UE begins to transmit the periodic SRS. However, the UE will not begin the semi-persistent SRS resource(s) transmission unless the UE receives an explicit MAC-CE activation message. Similarly, the UE will not begin the aperiodic SRS resource(s) transmission unless it receives a triggering request via DCI. In addition, amongst the use cases, beam management, codebook-based, non-codebook based and antenna switching, the parameter 'usage' in 'SRS-config' specifies a particular use case for each resource set.

On a resource level, a number of parameters are configured for resource mapping via the higher layer configuration 'SRS-Config'. The parameter 'nrofSymbols' ($N_S \in \{1,2,4\}$) determines the time duration of an SRS resource i.e., the number of consecutive symbol resources on which an SRS resource is transmitted in each slot. The starting symbol of an SRS resource can be located anywhere in the last six symbols of the slot and is configured by the parameter 'startPosition' ($l_0$). An SRS resource can also be repeated on two or four consecutive symbols in a slot on the same set of PRBs and is configured by the parameter 'repetition factor' (R). The allowed values of R are $\{1,2,4\}$, where $R \leq N_S$. Moreover, each SRS resource is associated with a one or more ports (P) indicated by the parameter 'nrofSRS-Ports'. The supported number of SRS ports $P \in \{1,2,4\}$ of an SRS resource depends on the parameter 'usage'.

SRS Bandwidth Configuration

An SRS resource is assigned with a set of frequency domain resources via a set of higher layer bandwidth configuration parameters indicated in 'SRS-Config' per SRS resource. These parameters are defined in the 3GPP Rel. 15 specification 38.211 (see reference [2]) and include $C_{SRS}$, $b_{SRS}$, $b_{hop}$, $n_{shift}$, and $n_{RRC}$.

- The parameter $C_{SRS} \in \{0, 1, \ldots, 63\}$ selects a row of the 64-length SRS Bandwidth configuration table below and determines the maximum sounding bandwidth defined by $m_{SRS,0}$ PRBs.
- The parameter $b_{SRS} \in \{0,1,2,3\}$ selects a column from the SRS Bandwidth configuration table below and determines the hopping bandwidth defined by $m_{SRS,b}$ PRBs, where $b=b_{SRS}$.
- The parameter $b_{hop} \in \{0,1,2,3\}$ selects a column from the SRS Bandwidth configuration table below and determines the sounding bandwidth defined by $m_{SRS,b}$ PRBs, where $b=b_{hop}$.
- The parameter $n_{shift} \in \{0, \ldots, 268\}$ determines the starting position (PRB index) of the maximum sounding bandwidth within the BWP.
- The parameter $n_{RRC} \in \{0, \ldots, 67\}$ is used to select the starting position (PRB index) of the sounding bandwidth within the maximum configured bandwidth $m_{SRS,0}$. In addition, when frequency hopping is enabled, the parameter $n_{RRC}$ is used to select a specific pattern out of a number of orthogonal patterns (see FIG. 1).

SRS Bandwidth configuration table

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

When $b_{hop} < b_{SRS}$, frequency hopping is enabled and the sounding bandwidth is greater than the hopping bandwidth. The entire sounding bandwidth is sounded in a number of hops. Each hop is associated with a symbol resource (OFDM symbol) and a number of PRBs defined by the hopping bandwidth. The number of hops required to sound the entire sounding bandwidth is given by $N_H = \Pi_{b=b_{hop}+1}^{b_{SRS}} N_b$, where $N_b$ is determined from the SRS Bandwidth configuration table above. Typically, $N_b$ is used to determine the number of hops in a bandwidth defined by $m_{SRS,b'}$ PRBs, with $b' < b_{SRS}$ and wherein the hopping bandwidth of each hop is defined by $m_{SRS,b}$ PRBs, with $b = b\_SRS$ The frequency domain starting position (PRB index) of each hop is different and is determined by the parameters 'nRRC', $N_b$, and SRS transmission counter $n_{SRS}$.

Figure 2:
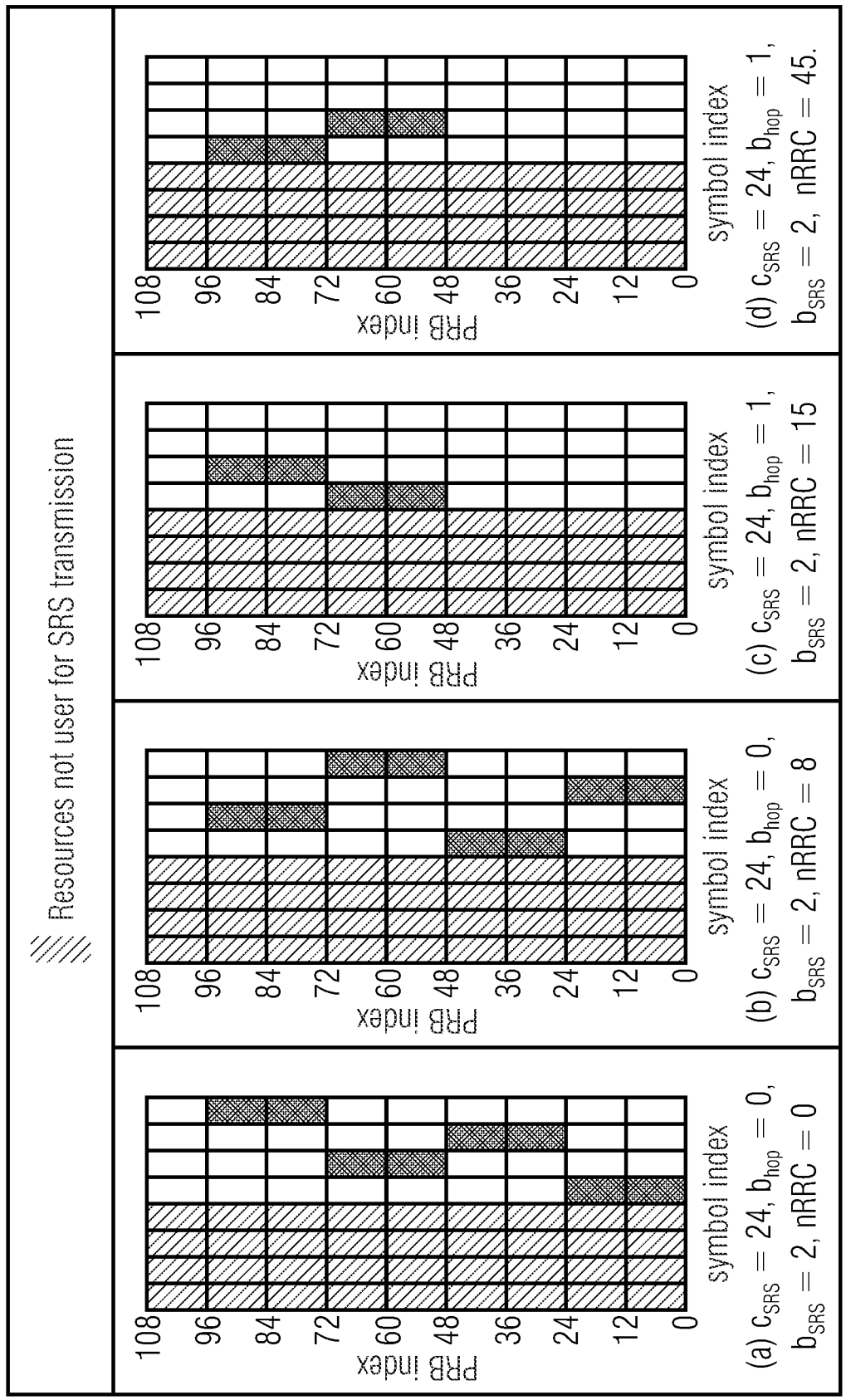
FIG. 2 illustrates a four symbol aperiodic SRS transmission.

FIG. 2 shows a four-symbol aperiodic SRS transmission for $c_{SRS}=24$. The maximum sounding bandwidth is given by $m_{SRS,0}=96$ PRBs. When $b_{hop}=0$ and $b_{SRS}=2$, the sounding bandwidth and the hopping bandwidth are given by 96 PRBs and 24 PRBs, respectively. As mentioned before, the parameter nRRC selects an orthogonal pattern out of 4 patterns. FIG. 2a and FIG. 2b show the selected orthogonal patterns for two different values of nRRC. When $b_{hop}=1$ and $b_{SRS}=2$, the sounding bandwidth is given by $m_{SRS,1}=48$ PRBs and there exist two such sets in the maximum sounding bandwidth of $m_{SRS,0}=96$ PRBs. The parameter nRRC selects one set of 48 PRBs in addition to selecting one orthogonal pattern out of 2 patterns. FIGS. 1c and 1d show the selected set of 48 PRBs and the selected orthogonal patterns for two different values of nRRC.

When $b_{hop} \geq b_{SRS}$, frequency hopping is disabled and the sounding bandwidth and the hopping bandwidth are equal. In this case, the bandwidth of the SRS resource defined by $m_{SRS,b}$ PRBs, where $b=\min(b_{hop}, b_{SRS})$ is sounded in a single hop (see FIG. 2).

Figure 3:
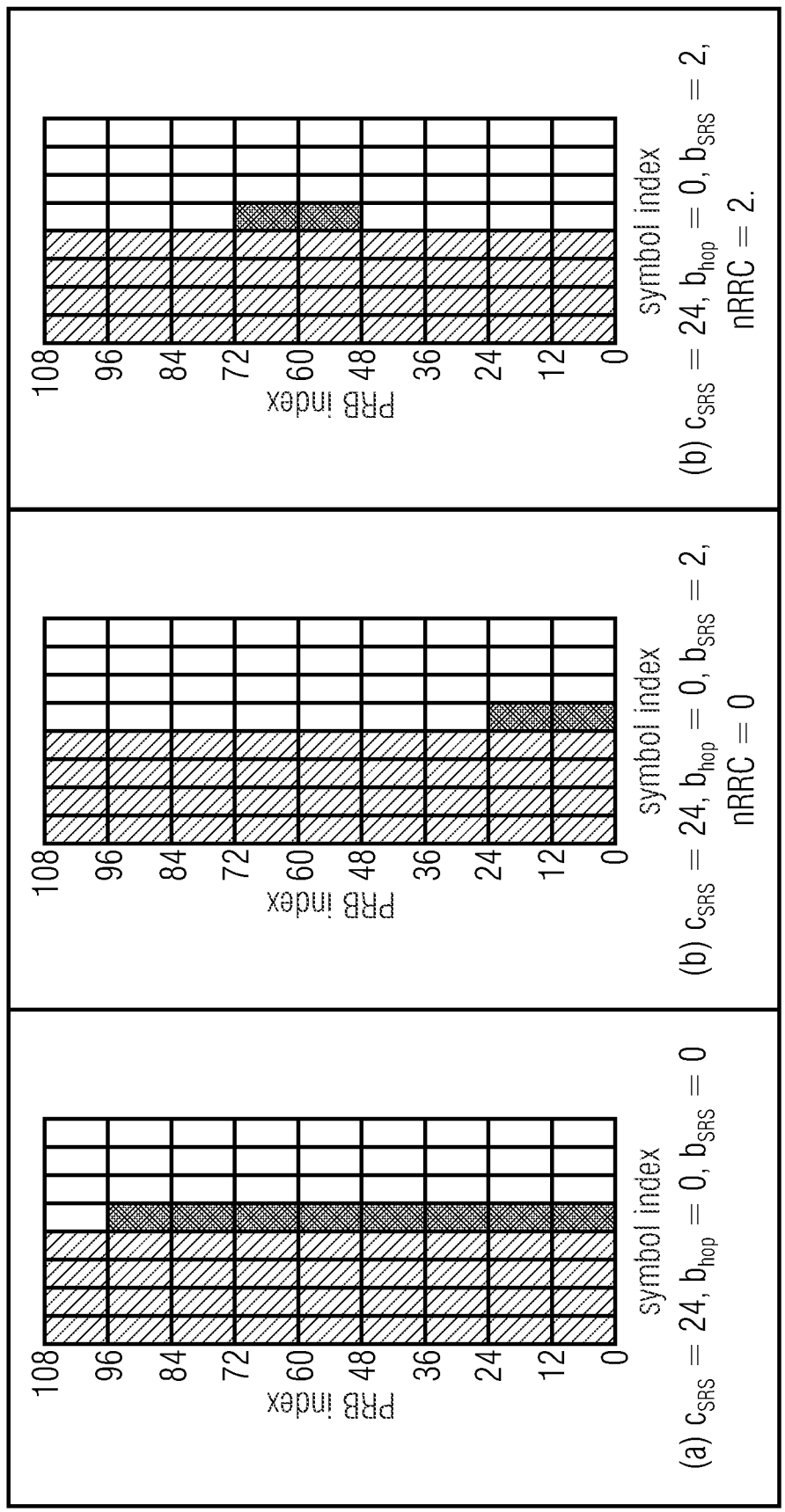
FIG. 3 illustrates a one symbol aperiodic SRS transmission.

FIG. 3 shows a one-symbol aperiodic SRS transmission for $c_{SRS}=24$. The maximum sounding bandwidth is given by $m_{SRS,0}=96$ PRBs. In FIG. 3a, when $b_{hop}=0$ and $b_{SRS}=0$, and the hopping bandwidth is equal to the maximum sounding bandwidth i.e., $m_{SRS,0}=96$ PRBs. The UE performs SRS sounding using a single OFDM symbol resource. For $b_{hop}=2$ and $b_{SRS}=2$, the hopping bandwidth is given by $m_{SRS,2}=24$ PRBs and there exist 4 sets of 24 PRBs in the maximum sounding bandwidth. The parameter nRRC selects one set of 24 PRBs out of 4 sets. As shown in FIG. 3b and FIG. 3c, for nRRC=0, the first set of 24 PRBs are sounded, whereas for nRRC=2, the third set of 24 PRBs are sounded.

The transmission counter counts the number of SRS transmissions for each SRS resource. For aperiodic SRS resources, the transmission counter resets after each slot and is calculated as $n_{srs} = \lfloor l'/R \rfloor$, where $l' \in \{0, \ldots, N_S-1\}$ is the SRS symbol index in the slot and R is the repetition factor. For aperiodic and semi-persistent resources, $n_{SRS}$ is calculated as follows (see reference [2])

$$n_{SRS} = \left(\frac{N_{slot}^{frame,\mu} + n_f + n_{s,f}^{\mu} - T_{offset}}{T_{SRS}}\right) \cdot \left(\frac{N_S}{R}\right) + \left\lfloor\frac{l'}{R}\right\rfloor$$

for slots that satisfy $(N_{slot}^{frame,\mu} n_f + n_{s,f}^{\mu} - T_{offset}) \mod T_{SRS}=0$, where $T_{SRS}$ and $T_{offset}$ are the periodicity and slot offset values configured by the parameter 'periodicityAndOffset-p' and 'periodicityAndOffset-sp' via the higher layer configuration 'SRS-config' for each periodic and semi-persistent resources, respectively, $N_{slot}^{frame,\mu}$ is the number of slots per frame for subcarrier spacing configuration $\mu$, $n_f$ is the system frame number and $n_{s,f}^{\mu}$ is the slot number within a frame for subcarrier spacing configuration p. For periodic and semi-persistent SRS resources, the slot offset is configured on a resource level i.e., per resource, whereas for aperiodic resources, the slot offset is configured on a resource set level i.e., per resource set. The slot offset parameter is indicated to the UE via the higher layer configuration 'SRS-config'.

Figure 4:
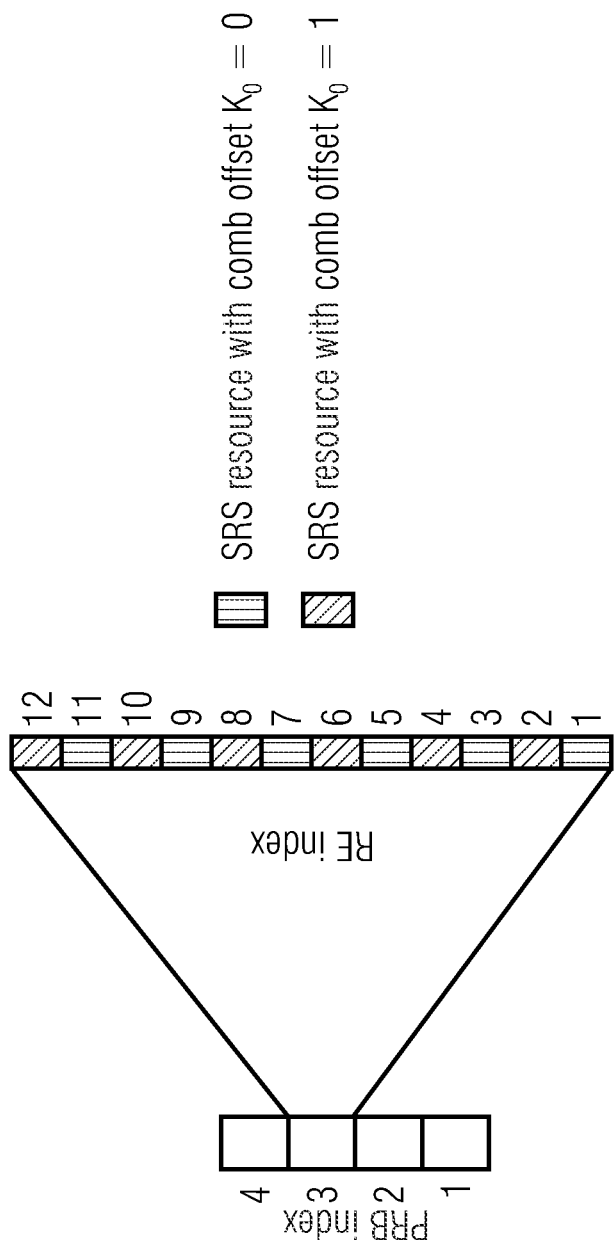
FIG. 4 illustrates an allocation/mapping of two SRS resources onto the REs within a PRB, with each SRS resource configured with identical comb factor ($K_{TC}=2$) and different comb offset values.

On a resource level, the higher layer parameters 'transmissionComb' and 'combOffset' included in the higher layer configuration 'SRS-config' assigns a specific comb factor ($K_{TC} \in \{2, 4\}$) as well as a comb offset ($K_o \in (0, \ldots, Kp_h-1)$) for each SRS resource. The two parameters when used in conjunction allows multiplexing of up to $K_{ir}$ resources/users in the frequency domain. FIG. 4 shows the frequency domain multiplexing of two SRS resources configured with an identical comb factor of 2 and different comb offset values $K_o=0$ and $K_o=1$. For $K_m=2$, each SRS resource occupies 6 different REs within a PRB. Due to the different $K_o$ value configured for each resource, the allocation/mapping of the SRS resources onto the REs is non-overlapping.

Thus, SRS sounding is performed by the UE on a specific set of frequency domain resources defined by the bandwidth region. The current specification supports SRS transmissions on a set of contiguous frequency domain resources of the configured bandwidth region. It has been found that the current NR specification has several disadvantages with regard to SRS transmissions. More specifically, the SRS may be either transmitted in one time instance or in multiple time instances. When the SRS is transmitted in multiple time instances, a subset of SRS is beneficial for cell-edge UEs as such UEs experience poor channel conditions compared to cell-center UEs. Especially, due to the limited transmit power, the channel estimation quality obtained at the base station from the SRS may often not be sufficient for cell-edge UEs. Moreover, the channel is typically frequency selective and varying in the frequency domain. Therefore, not all of the configured frequency domain resources may be useful for the SRS transmission. Further, the SRS transmission can only be performed on a set of contiguous frequency domain resources.

The present invention addressed these drawbacks and embodiments of several aspects of the present invention provide enhancements and improvements for the NR framework such that the SRS and the transmit power may be concentrated in the frequency domain to the subset of resources that may be received with a sufficient quality at the base station to perform the channel estimation. Several schemes for indicating information of frequency and time domain resources used for the SRS transmission are provided in accordance with embodiments of the present invention.

Figure 1B:
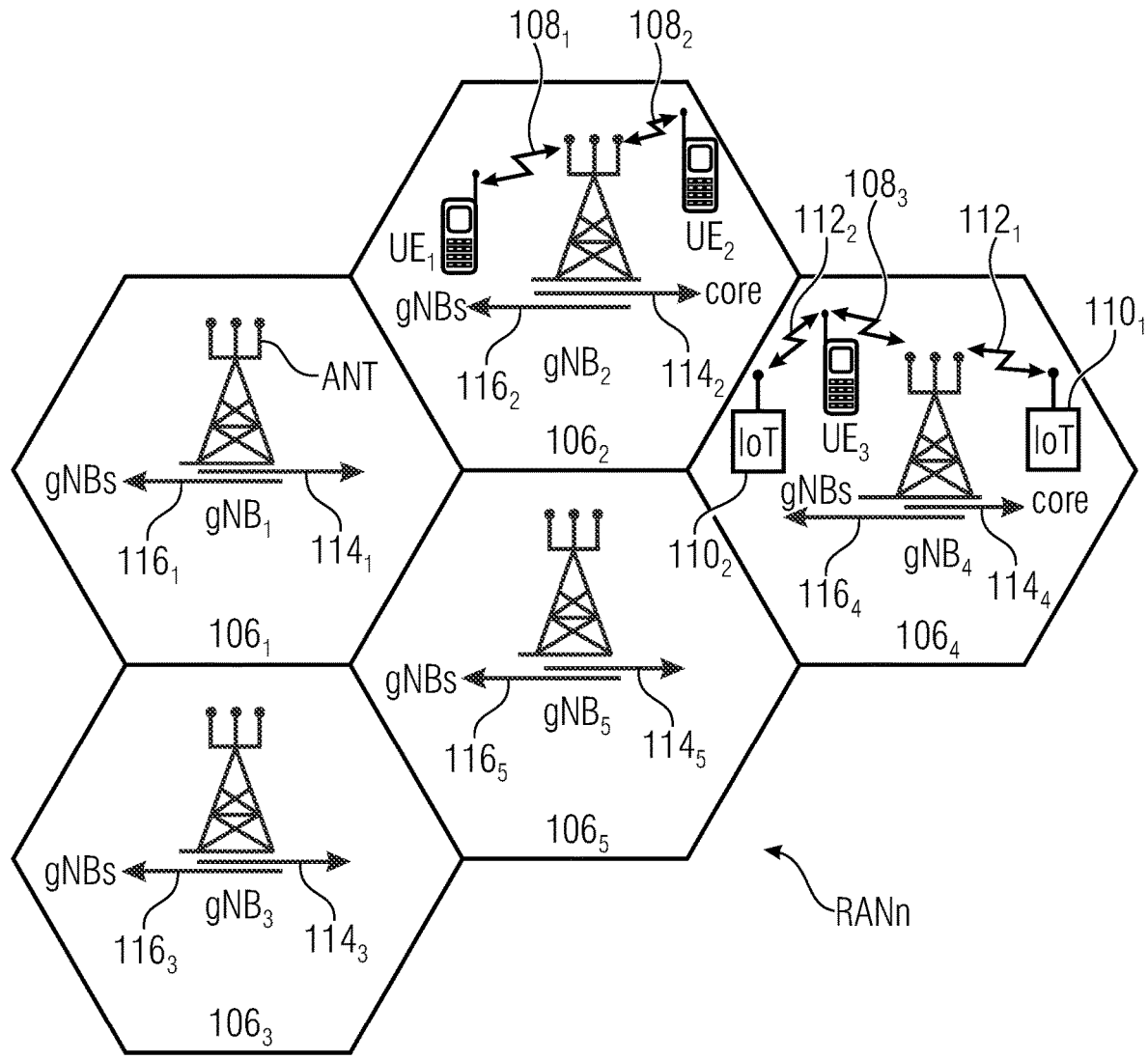
FIG. 1B is a schematic representation of an example of a radio access network that includes one or more base stations, each serving a specific area surrounding the base station schematically represented by respective cells.
Figure 5:
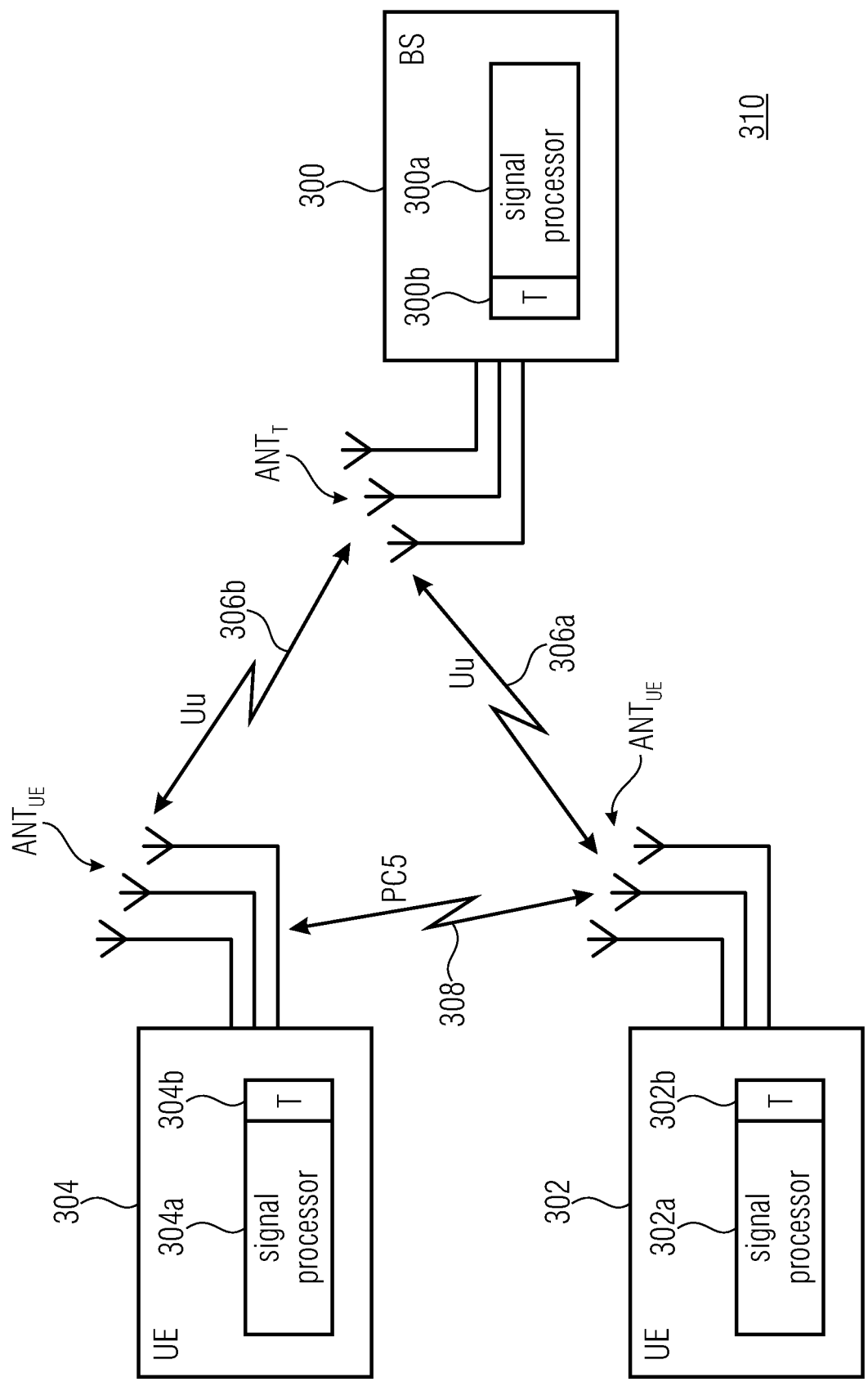
FIG. 5 is a schematic representation of a wireless communication system including a transmitter, like a base station, one or more receivers, like user devices, UEs, and one or more relay UEs for implementing embodiments of the present invention.

Embodiments of the present invention may be implemented in a wireless communication system as depicted in FIG. 1 including base stations and users, like mobile terminals or IoT devices. FIG. 5 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink, SL, interface. When the UEs are not served by the base station or are not connected to a base station, for example, they are not in an RRC connected state, or, more generally, when no SL resource allocation configuration or assistance is provided by a base station, the UEs may communicate with each other over the sidelink, SL. The system or network of FIG. 5, the one or more UEs 302, 304 of FIG. 5, and the base station 300 of FIG. 5 may operate in accordance with the inventive teachings described herein.

UE—Using Indicated SRS Frequency Domain Resources for SRS Transmission

The present invention provides a user device, UE, for a wireless communication network,
    wherein the UE is configured or preconfigured with one or more Sounding Reference Signal, SRS, resources to be used for SRS transmissions, the one or more SRS resources comprising a plurality of frequency domain resources, and
    wherein, responsive to receiving an indication of a subset of SRS frequency domain resources for each resource, the UE is to perform an SRS transmission using the indicated subset of frequency domain resources.

In accordance with embodiments, the number of frequency domain resources in the subset of SRS frequency domain resources is less than the number of frequency domain resources with which the UE is configured or preconfigured.

In accordance with embodiments, the UE is connected to an entity of the wireless communication network, like to a gNB over a Uu interface or to another UE over a sidelink interface, and is to receive the indication from the entity.

In accordance with embodiments, before receiving the indication, the UE is to perform an initial SRS transmission using the one or more configured or preconfigured SRS frequency domain resources.

In accordance with embodiments, the UE is to perform the SRS transmission on the indicated subset of frequency domain resources over one or more symbol resources.

In accordance with embodiments, each SRS resource comprises one or more SRS ports, a set of frequency domain resources defining an SRS sounding bandwidth, and a number of SRS symbol resources.

In accordance with embodiments,
    the plurality of SRS resources comprises N SRS subbands, with N>1, each SRS subband including a plurality of contiguous or non-contiguous Physical Resource Blocks, PRBs, and
    the indication indicates a subset of the SRS subbands, the subset including M SRS subbands, with M<N.

In accordance with embodiments, the UE is configured with one or more SRS parameters, like a number N or a size S of the SRS sounding subbands, via higher layer signaling, like RRC or MAC-CE signaling by the entity.

In accordance with embodiments, a number N and/or a size S of the SRS sounding subbands is defined by one or more higher layer parameters indicating the SRS sounding bandwidth, and the higher layer parameters may include one or more of $c_{SRS}$, $b_{SRS}$, $b_{hop}$, $m_{SRS,b}$, $\forall b \in \{0,1,2,3\}$ and $N_b, \forall b \in \{0,1,2,3\}$, with
    $c_{SRS}$ determining a maximum sounding bandwidth defined by $m_{SRS,0}$ PRBs,
    $b_{SRS}$ determining a hopping bandwidth defined by $m_{SRS,b}$ PRBs, with $b=b_{SRS}$,
    $b_{hop}$ determining the sounding bandwidth defined by $m_{SRS,b}$ PRBs, with $b=b_{hop}$, and
    $N_b$ determining the number of hops in a bandwidth defined by $m_{SRS,b}$ PRBs, with $b'<b_{SRS}$, and wherein the hopping bandwidth of each hop is defined by $m_{SRS,b}$ PRBs, with $b=b_{SRS}$ In accordance with embodiments,
the number of N SRS sounding subbands is defined by the SRS or sounding subband size, S, the value of S being configured via a higher layer signaling, like RRC or MAC-CE, or indicated via physical layer signaling, like DCI, or being derived from one or more higher layer parameters indicating a configured SRS or sounding bandwidth, or the SRS sounding subband size, S, is defined by the number N of SRS sounding subbands, the value of N being configured via a higher layer signaling, like RRC or MAC-CE, or indicated via physical layer signaling, like DCI, or being derived from one or more higher layer parameters indicating a configured SRS sounding bandwidth.

In accordance with embodiments, the number N of sounding subbands is given by $$N = \Pi_{b=b_{hop}+1}^{b_{SRS}} N_b, \text{ or}$$

$$N = \frac{m_{SRS,b_1}}{m_{SRS,b_2}}, \text{ where } b_1 = b_{hop} \text{ and } b_2 = b_{SRS},$$

and $m_{SRS,b_1}$ and $m_{SRS,b_2}$ denote a total number of PRBs of the sounding bandwidth and a total number of PRBs of a hopping bandwidth, respectively, with $$m_{SRS,b_2} \le M_{SRS,b_1} \text{ or } N = \frac{m_{SRS,b}}{4} \text{ or } N = \frac{m_{SRS,b}}{2},$$

where $b = b_{hop}$, $b = B_{SRS}$ or $b = \min(b_{SRS}, b_{hop})$.

In accordance with embodiments, the sounding subband size S is given by $$S = \left\lceil \frac{m_{SRS,b}}{N} \right\rceil \text{ or } \left\lfloor \frac{m_{SRS,b}}{N} \right\rfloor,$$

with $\lceil \cdot \rceil$ and $\lfloor \cdot \rfloor$ representing the ceiling and floor functions, respectively or $$S = \frac{m_{SRS,b}}{N},$$

if N is a multiple of $m_{SRS,b}$, or
the parameter $m_{SRS,0}$ which indicates a maximum number of PRBs of the sounding bandwidth for a bandwidth configuration selected by $c_{SRS}$.

In accordance with embodiments, the sounding subband size S has a fixed value as specified by a specification.

In accordance with embodiments, an SRS sounding bandwidth region for an SRS transmission is associated with a set of SRS frequency domain resources, like $m_{SRS,b}$ PRBs, and is segmented into the N subbands, each subband being associated with a subset of SRS frequency domain resources of the bandwidth region.

In accordance with embodiments, each subband contains S contiguous PRBs.

In accordance with embodiments, each subband contains S' non-contiguous sets of PRBs, and each set contains S" contiguous PRBs.

In accordance with embodiments, the UE is to perform an SRS transmission over one or more SRS symbol resources, each SRS symbol resource carrying an SRS transmit sequence in a specific set of SRS frequency-domain resources, and the set of SRS frequency-domain resources being associated either with the resources of one subband or with a part or a subset of the resources of one subband.

In accordance with embodiments, the subband size is equal to a hopping bandwidth of $m_{SRS,b}$ PRBs, with $b=b_{SRS}$, such that each SRS symbol resource is associated with all $m_{SRS,b}$ PRBs of one subband.

In accordance with embodiments, when no repetition is configured, a first SRS symbol resource is associated with a first subband, followed by a second SRS symbol resource associated with a second subband, and so on, wherein the number of symbol resources required to completely sound the configured bandwidth region may be less than or equal to the number of hops $N_H=N$.

In accordance with embodiments, when repetition is configured, R consecutive SRS symbol resources are associated with a first indicated subband, followed by R consecutive SRS symbol resources that are associated with a second indicated subband, and so on, with R denoting a repetition factor that may be configured via a higher layer signaling, like RRC signaling, wherein the number of symbol resources required to completely sound the configured bandwidth region may be less than or equal to the $RN_H$, where $N_H=N$.

In accordance with embodiments, when the subband size is not equal to a hopping bandwidth of $m_{SRS,b}$ PRBs, with $b=b_{SRS}$, each symbol resource is associated only with a subset of $m_{SRS,b}$ PRBs of one subband.

In accordance with embodiments, when no repetition is configured, a first SRS symbol resource is associated with a first subset of $m_{SRS,b}$ PRBs associated with a first subband, followed by a second SRS symbol resource that is associated with a second subset of $m_{SRS,b}$ PRBs associated with a first subband, and so on, followed by an SRS symbol resource that is associated with a first subset of $m_{SRS,b}$ PRBs that is associated with a second subband, and so on, wherein the number of symbol resources required to completely sound the configured bandwidth region may be less than or equal to the number of hops $N_H=S'N$.

In accordance with embodiments, when repetition is configured, R consecutive SRS symbol resources are associated with a first subset of $m_{SRS,b}$ PRBs which are associated with a first subband, followed by R consecutive SRS symbol resources that are associated with a second subset of $m_{SRS,b}$ PRBs which are associated with the first subband, and so on, followed by R consecutive SRS symbol resources are associated with a first set of $m_{SRS,b}$ PRBs associated with a second subband and so on with R denoting a repetition factor that may be configured via a higher layer signaling, like RRC signaling wherein the number of symbol resources required to completely sound the configured bandwidth region may be less than or equal to $RN_H$, where $N_H=S'N$.

In accordance with embodiments, the first subband is associated with a first symbol resource of a hopping pattern, and the second subband is associated with a second symbol resource of the hopping pattern, and wherein first subband and the second subband may be defined independent off an increasing PRB index.

In accordance with embodiments, the UE is to perform an SRS transmission on S' symbol resources associated with one or more subbands, wherein the sounding of each subband is completed within one slot so that all S' symbol resources belong to the same slot, or the S' symbol resources are transmitted over multiple slots, or the S' symbol resources are transmitted over multiple symbols across multiple slots.

In accordance with embodiments, the N subbands are segmented into T disjoint sets, wherein each of the T sets is associated with a symbol resource and one or more subbands, each subband being associated with a set of contiguous or non-contiguous sets of frequency domain resources, like PRBs, and the number of subbands of the sets is identical, i.e., $N_\alpha=n$, $\forall\alpha=1,2,\ldots,T$, or not identical $N_\alpha \neq n$, $\forall\alpha=1,2,\ldots,T$, where $N_\alpha$ denotes the number of subbands of set index a.

In accordance with embodiments, the indication indicates which subbands are selected from the N subbands by a N-length bitmap, where N denotes the number of sounding subbands, and each bit of the bitmap is associated with a subband and indicates if the subband is to be used for SRS sounding.

In accordance with embodiments, the sounding bandwidth region is segmented into U bandwidth segments, where U≤N, and N denotes the number of subbands, each bandwidth segment being associated with one or more subbands, and the U bandwidth segments being overlapped or non-overlapped in the frequency domain, and the indication indicates U' bandwidth segments used for SRS transmission, with U'≤U, for example, by an U-length bit-sequence, each bit of which being associated with a bandwidth segment and indicating if all subbands associated with the segment are to be used for SRS transmission.

In accordance with embodiments, each of the U' bandwidth segments is further segmented into $V_u$ bandwidth sub-segments, with $V_u \geq 1$, each bandwidth sub-segment being associated with one or more subbands, and the indication indicates U' bandwidth segments and the V and/or V', V'≤V, bandwidth sub-segments to be used for SRS transmission.

In accordance with embodiments, each of the $V_u$ bandwidth sub-segments is further segmented into $W_{u,v}$ bandwidth sub-subsegments, with $W_{u,v} \geq 1$, each bandwidth sub-subsegment being associated with one or more subbands, and the indication indicates W' bandwidth sub-sub-segments indicating the bandwidth sub-subsegments to be used for SRS transmission.

In accordance with embodiments, the sounding bandwidth region is segmented into U bandwidth segments, where U≤N, and N denotes the number of subbands, each bandwidth segment being associated with one or more subbands, and the U bandwidth segments being overlapped or non-overlapped in the frequency domain, and the indication indicates a single bandwidth segment to be used for SRS transmission.

In accordance with embodiments, when frequency hopping is enabled, the one or more subbands associated with one or more symbol resources are grouped into U time-frequency segments, with U≤N and N denoting the number of subbands, each subband comprising one or more contiguous or non-contiguous sets of PRBs, and the indicator is a U-bit indicator, each bit of which being associated with a time-frequency segment and indicating whether the time-frequency segment is to be used for SRS sounding.

In accordance with embodiments, the sounding bandwidth region is segmented into a first set of $U_1$ overlapping or non-overlapping bandwidth segments along the PRB index dimension, with $U_1 \leq N$ and N denoting the number of subbands, the one or more subbands associated with one or more symbol resources are grouped into a second set of $U_2$ overlapping or non-overlapping time-frequency segments along the symbol index dimension, with $U_2 \leq N$, and the indication indicates the one or more bandwidth segments and/or one or more time-frequency segments by a $U_1+U_2$-bit indicator, with each bit from the first $U_1$ bits of the bit indicator being associated with a bandwidth segment and each bit from the remaining $U_2$ bits of the bit indicator being associated with a time-frequency segment and indicating whether the segment is to be used for SRS sounding.

In accordance with embodiments, the one or more SRS resources comprise resources of a first resource pool and of a second resource pool, each resource pool associated with one or more SRS frequency domain resources, and the indication indicates that the one or more SRS frequency domain resources of the second resource pool are to be used for the SRS transmission, e.g., by a one-bit indication for signaling an activation of the second resource pool.

Base Station/Other UE

The present invention provides an entity for a wireless communication network, wherein the entity is to receive from a user device, UE, a Sounding Reference Signal, SRS, transmission on a plurality of configured or preconfigured SRS resources, the plurality of SRS resources comprising a plurality of SRS frequency domain resources, wherein the entity is to estimate a channel between the entity and the UE using the received SRS transmission and to determine a subset of SRS frequency domain resources for which a channel estimation fulfills one or more criteria, and wherein the entity is to signal to the UE an indication of the determined subset of SRS frequency domain resources to be used by the UE for performing a further SRS transmission.

UE—Coverage Enhancements for SRS Transmissions

The present invention provides a user device, UE, for a wireless communication network, wherein the UE is configured or preconfigured with one or more Sounding Reference Signal, SRS, resources to be used for SRS transmission, the one or more SRS resources comprising a plurality of frequency domain resources defining an SRS bandwidth region, and wherein the UE is to transmit an SRS transmit sequence on every r-th resource element of a PRB associated with the SRS bandwidth region, or on every r-th resource element across all PRBs.

In accordance with embodiments, the UE is to transmit an SRS transmit sequence for a first SRS transmission on every Kr-th or r-th resource element, and an SRS transmit sequence for a second SRS transmission on every r-th or Kr-th resource element In accordance with embodiments, the first SRS transmission is associated with the sounding of all N subbands of the configured bandwidth region and the second SRS transmission is associated with the sounding of one or more subbands of the configured bandwidth region, wherein the one or more subbands is less than the number N.

UE—SRS Transmission Granularity

The present invention provides a user device, UE, for a wireless communication network,
- wherein the UE is configured or preconfigured with one or more Sounding Reference Signal, SRS, resources to be used for SRS transmission, the one or more SRS resources comprising a plurality of SRS frequency domain resources defining an SRS bandwidth region, wherein the SRS bandwidth region comprises D PRB subsets, wherein each PRB subset comprises Z PRBs, and
- wherein the UE is to perform an SRS transmission over D or less than D PRB subsets, wherein, for each PRB subset, G PRBs out of the Z PRBs are used for the SRS transmission, wherein G<Z and G≥1.

In accordance with embodiments, the SRS bandwidth region is defined by $m_{SRS,b}$ Physical Resource Blocks comprising the D PRB subsets, with $b=b_{hop}$ or $b=\min(b_{hop}, b_{SRS})$.

In accordance with embodiments, wherein the SRS bandwidth region is grouped into a number of subbands, wherein each subband is associated with one or more PRB subsets comprising QZ PRBs, where Q≥1.

In accordance with embodiments, the UE is configured or preconfigured with a pattern defining one or more frequency domain locations of the G PRBs for each PRB subset to be used for SRS sounding.

In accordance with embodiments, the UE is configured or preconfigured with a parameter 'g' that indicates a pattern, out of $\binom{Z}{G}$ possible patterns for each PRB subset, or indicates a pattern out of P pre-defined patterns, where $P \le \binom{Z}{G}$, defining the one or more frequency domain locations of the G PRBs per PRB subset.

Network

The present invention provides a wireless communication network, comprising one or more user devices, UEs, according to the present invention.

In accordance with embodiments, the wireless communication network further comprises one or more entities of the present invention.

In accordance with embodiments, the one or more entities comprise another UE of the wireless communication network or an entity of the core network or the access network of the wireless communication network.

In accordance with embodiments, the entity of the core network or the access network comprises one or more of the following: a macro cell base station, or a small cell base station, or a central unit of a base station, or a distributed unit of a base station, or a road side unit, RSU, or an AMF, or an MME, or an SMF, or a core network entity, or mobile edge computing, MEC entity, or a network slice as in the NR or 5G core context, or any transmission/reception point, TRP, enabling an item or a device to communicate using the wireless communication network, the item or device being provided with network connectivity to communicate using the wireless communication network.

In accordance with embodiments, the user device, UE, comprises one or more of the following: a mobile terminal, or a stationary terminal, or a cellular IoT-UE, or a vehicular UE, or a leader, GL, UE, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit, RSU, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

Methods

The present invention provides a method for operating a user device, UE, for a wireless communication network, wherein the UE is configured or preconfigured with one or more Sounding Reference Signal, SRS, resources to be used for SRS transmissions, the one or more SRS resources comprising a plurality of frequency domain resources, the method comprising:
- responsive to receiving an indication of a subset of SRS frequency domain resources for each resource, performing an SRS transmission using the indicated subset of frequency domain resources.

The present invention provides a method for operating an entity for a wireless communication network, the method comprising:
- receiving from a user device, UE, a Sounding Reference Signal, SRS, transmission on a plurality of configured or preconfigured SRS resources, the plurality of SRS resources comprising a plurality of SRS frequency domain resources,
- estimating a channel between the entity and the UE using the received SRS transmission and determining a subset of SRS frequency domain resources for which a channel estimation fulfills one or more criteria, and
- signaling to the UE an indication of the determined subset of SRS frequency domain resources to be used by the UE for performing a further SRS transmission.

The present invention provides a method for operating a user device, UE, for a wireless communication network, wherein the UE is configured or preconfigured with one or more Sounding Reference Signal, SRS, resources to be used for SRS transmission, the one or more SRS resources comprising a plurality of frequency domain resources defining an SRS bandwidth region, the method comprising:
- transmitting an SRS transmit sequence on
  - every r-th resource element of a PRB associated with the SRS bandwidth region, or
  - on every r-th resource element across all PRBs.

The present invention provides a method for operating a user device, UE, for a wireless communication network, wherein the UE is configured or preconfigured with one or more Sounding Reference Signal, SRS, resources to be used for SRS transmission, the one or more SRS resources comprising a plurality of SRS frequency domain resources defining an SRS bandwidth region, wherein the SRS bandwidth region comprises D PRB subsets, wherein each PRB subset comprises Z PRBs, the method comprising:
- performing an SRS transmission over D or less than D PRB subsets, wherein, for each PRB subset, G PRBs out of the Z PRBs are used for the SRS transmission, wherein G<Z and G≥1.

Computer Program Product

Embodiments of the first aspect of the present invention provide a computer program product comprising instructions which, when the program is executed by a computer, causes the computer to carry out one or more methods in accordance with the present invention.

Hereafter, the terms 'sounding subbands' and 'subbands' are used interchangeably. Moreover, the terms 'sounding bandwidth' and 'bandwidth region' are used interchangeably. Also, the terms 'SRS transmission' and 'SRS sounding' are used interchangeably.

First Aspect

Figure 6A:
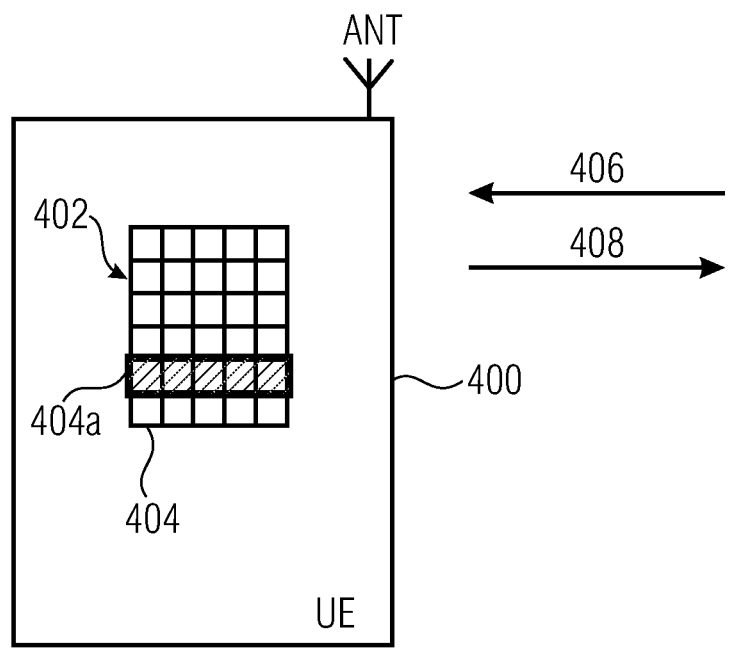
FIG. 6A illustrates a UE in accordance with embodiments of the first aspect of the present invention.

Embodiments of a first aspect of the present invention are now described. FIG. 6A illustrates a UE in accordance with embodiments of the first aspect of the present invention. A UE may be configured with SRS frequency domain resources and uses, responsive to a signaling, only a subset frequency domain resources for the SRS transmission. FIG. 6A illustrates a UE 400 for a wireless communication network, of like the system or network described above with reference to FIG. 1. The UE is configured or preconfigured with one or more Sounding Reference Signal, SRS, resources to be used for SRS transmissions, as is indicated at 402. The one or more SRS resources include a plurality of frequency domain resources 404. Responsive to receiving an indication 404 of a subset of SRS frequency domain resources for each resource, the UE perform an SRS transmission using the indicated subset of frequency domain resources, as indicated at 404*a*.

Figure 6B:
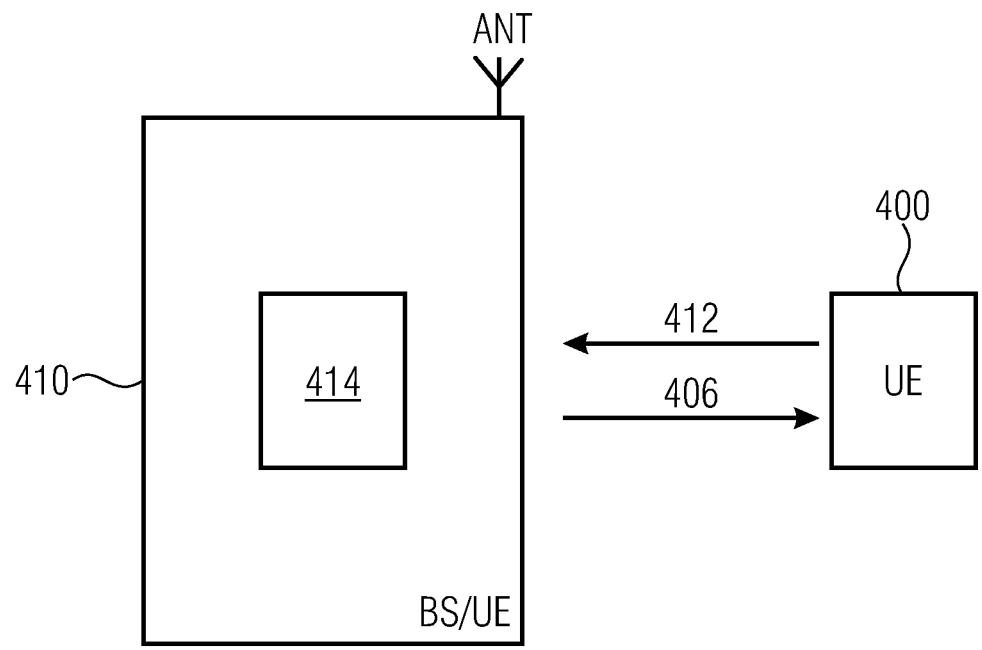
FIG. 6B illustrates a gNB/other UE in accordance with embodiments of the first aspect of the present invention.

FIG. 6B illustrates an entity, like a base station or another UE, in accordance with embodiments of the first aspect of the present invention, that is connected to a UE and signals a subset frequency domain resources for the SRS transmission. FIG. 6B illustrates an entity 410 for a wireless communication network that receives from a user device 400, like the UE of FIG. 6A, a Sounding Reference Signal, SRS, transmission on a plurality of configured or preconfigured SRS resources, as is indicated at 412. The plurality of SRS resources includes a plurality of SRS frequency domain resources. The entity 410 is to estimate a channel between the entity 410 and the UE 400 using the received SRS transmission and determines a subset of SRS frequency domain resources for which a channel estimation fulfills one or more criteria, as is illustrated at 414. The entity 410 signals to the UE 400 the indication 404*a* of the determined subset of SRS frequency domain resources to be used by the UE 400 for performing a further SRS transmission 408.

In accordance with embodiments, high accuracy channel estimates for the uplink may be achieved using a multi-step SRS sounding procedure. The higher layer parameter 'SRS-config' (see reference [1]) configures the UE with one or more resource sets with each resource set comprising one or more resources. In the first step, the UE is configured to perform SRS sounding for each resource in the configured bandwidth region defined by N subbands. Here a subbands refers to a set of contiguous or non-contiguous PRBs. Upon reception of the said SRS transmissions, the gNB estimates the uplink channel and selects one or more sounding subbands. The UE is configured to receive an indication of the selected one or more sounding subbands for a subset of resources associated with a resource set. Upon reception of the said selected sounding subbands, in further steps, the UE is configured to perform SRS transmission on the selected sounding subbands (using one or more symbol resources) in one or more SRS transmissions.

The user equipment, UE, 400 may perform a method including the following steps:

receiving, from a network node or other UE 410, a sounding reference signal, SRS, configuration 402 providing one or more SRS resources 404, each SRS resource comprising one or more SRS ports, a set of frequency domain resources defining the SRS transmission bandwidth, and a number of symbol resources for the SRS transmission, receiving, from the network node or the other UE 410, an indication 406 of a subset 404*a* of frequency domain resources, wherein, the subset 404*a* of frequency domain resources is defined by a fraction of the SRS transmission bandwidth, and performing the SRS transmission 408 for the indicated subset of frequency domain resources over one or more symbol resources.

Number of Subbands and Subband Size
Number of Subbands

In accordance with embodiments, the number of sounding subbands (N) may be dependent on one or more of the higher layer parameters indicating the configured sounding bandwidth provided in 'SRS-Config'. These higher layer parameters include $c_{SRS}$, $b_{SRS}$, $b_{hop}$, $m_{SRS,b}$, $\forall b \in \{0,1,2,3\}$ and $N_b$, $\forall b \in \{0,1,2,3\}$. In addition or alternatively, the number of sounding subbands can be dependent on the configured sounding subband size (S), where the value of S is either configured via a higher layer (e.g., RRC or MAC-CE) to the UE by a network node, or it is derived from one or more of the above mentioned higher layer parameters indicating the sounding bandwidth. In one exemplary embodiment, the number of sounding subbands depends on the parameters $N_b$, $\forall b \in (b_{hop}+1, \ldots, b_{SRS})$ defined in the SRS bandwidth configuration table above, and the number of sounding subbands is given by $N = \Pi_{b=b_{hop}+1}^{b_{SRS}} N_b$. In another exemplary embodiment the number of sounding subbands is given by $$N = \frac{m_{SRS,b_1}}{m_{SRS,b_2}}, \text{ where } b_1 = b_{hop} \text{ and } b_2 = b_{SRS}.$$

Here, $m_{SRS,b_1}$ and $m_{SRS,b_2}$ denote the total number of PRBs of the sounding bandwidth and the total number of PRBs of the hopping bandwidth, respectively, where $m_{SRS,b_2} \leq m_{SRS,b_1}$. In a further exemplary embodiment, the number of sounding subbands is given by $$N = \frac{m_{SRS,b}}{4} \text{ or } N = \frac{m_{SRS,b}}{2},$$

where $b = b_{hop}$, $b = B_{SRS}$ or $b = \min(b_{SRS}, b_{hop})$.

Depending on the configured sounding bandwidth, the supported number of sounding subbands is given by $$N \in \left\{1, \ldots, \frac{m_{SRS,b}}{4}\right\}, \text{ where } b = b_{hop} \text{ or } b = \min(b_{SRS}, b_{hop}).$$

In accordance with embodiments, the number of sounding subbands (N) is configured to the UE via higher layer, e.g., via RRC or MAC-CE signaling by a network node or indicated to the UE via physical layer, e.g., via DCI.

According to the current NR specification (see reference [2]), a bandwidth part comprises 272 PRBs. Therefore, the maximum size of the bandwidth region that can be configured to the UE is 272 PRBs. Furthermore, the minimum size of the bandwidth region is given by 4 PRBs. The NR specification supports the following set of values for the size of the bandwidth region configured to an SRS resource (in number of PRBs): B∈ {4, 8, 12, 16, 20, 24, 28, 32, 36, 40, 44, 48, 52, 56, 60, 64, 68, 72, 76, 80, 84, 88,92,96, 104, 108, 112, 120, 128, 132, 136, 144, 152, 160, 168, 176, 184, 192, 208, 216, 224, 240, 256, 264, 272}.

In accordance with embodiments, the number of sounding subbands may depend on the configured size of the bandwidth region (i.e., the value selected from B). The set B may be divided into Q subsets $B_q$, q=1, ... , Q, wherein each subset may be associated with a number of subbands ($N_q$, q=1, ..., Q). In one example, the set B may be divided into Q=4 disjoint subsets. The first subset $B_1$ is given by $B_1$= {4, ... , 68}, the second subset $B_2$ is given by $B_2$= {72, ... , 136}, the third subset $B_3$ is given by $B_3$= {140, ... , 204}, and the fourth subset $B_4$ is given by $B_4$={208, ... , 272}. The number of subbands configured to the UE may depend on the subset $B_q$, q=1, ... ,4. When the configured size of the bandwidth region is given by a value from set $B_q$, the number of subbands is given by N=$N_q$, where $N_q$ may be either fixed (i.e., known in specification), defined by a look-up table, or determined by one of the aforementioned embodiments. In another example, the Q subsets are defined such that the values in each subset are multiples of a number a, where a≥1. The value of a may be dependent on the subset index of $B_q$.

In one embodiment, when S is the subband size configured to the UE or determined by the UE or known to the UE via a lookup table, the number of subbands is given by $$N = \left\lceil \frac{m_{SRS,b}}{S} \right\rceil \text{ or } \left\lfloor \frac{m_{SRS,b}}{S} \right\rfloor,$$

where [·] and [·] represent the ceiling and floor functions, respectively. When the subband size is a multiple of $m_{SRS,b}$, the number of subbands may simply be given by $$N = \frac{m_{SRS,b}}{S}, \text{ where } b = b_{hop} \text{ or } b = b_{SRS} \text{ or } b = \min(b_{hop}, b_{SRS}).$$

In some examples, the number of subbands N may also depend on at least one of the higher layer parameters 'resourceType', 'usage', 'srs-ResouceSetID', 'srs-ResourceID' and/or the type of activation/triggering of the SRS resource(s) or SRS resource set(s).

Subband Size

In accordance with an embodiment, the sounding subband size (S) may be dependent on one or more of the higher layer parameters indicating the configured sounding bandwidth provided in 'SRS-Config'. These higher layer parameters include $c_{SRS}$, $b_{SRS}$, $b_{hop}$, $m_{SRS,b}$, ∀b∈ {0,1,2,3} and $N_b$, ∀b∈ {0,1,2,3}.

Alternatively, the sounding subband size depends on the number of configured sounding subbands (N), where the value of N is either configured via higher layer signaling (e.g., RRC or MAC-CE) to the UE by the network node, or it is derived from one or more of the above mentioned higher layer parameters indicating the sounding bandwidth or indicated to the UE via physical layer, e.g., via DCI.

In accordance with an embodiment, the sounding subband size (5) is derived from the parameter $m_{SRS,b}$ which indicates the number of PRBs of the sounding bandwidth and from the number of sounding subbands (N) configured to the UE. Here, b in $m_{SRS,b}$ is given by b=$b_{SRS}$, b=$b_{hop}$ or b=min ($b_{SRS}$, $b_{hop}$) and depends on the usage of frequency hopping for the SRS transmission. When $b_{hop}$<$b_{SRS}$, frequency hopping for the SRS transmission may be enabled, and b=$b_{SRS}$, or when $b_{hop}$≥$b_{SRS}$, frequency hopping may be disabled, and b=min ($b_{SRS}$, $b_{hop}$). The sounding subband size may be given by $$S = \left\lceil \frac{m_{SRS,b}}{N} \right\rceil \text{ or } \left\lfloor \frac{m_{SRS,b}}{N} \right\rfloor \text{ or}$$

$$S = \frac{m_{SRS,b}}{N} \text{ (if } N \text{ is a multiple of } m_{SRS,b}\text{)},$$

where [·] and [·] represent the ceiling and floor functions, respectively. In another exemplary embodiment, the sounding subband size is determined from the parameter $m_{SRS,0}$ which indicates the maximum number of PRBs of the sounding bandwidth for a bandwidth configuration selected by $C_{SRS}$.

In accordance with embodiments, the sounding subband size S may be fixed in specification, e.g., S=2 or S=4.

In accordance with embodiments, the sounding subband size is configured via higher layer (RRC or MAC-CE) to the UE by a network node or indicated to the UE via physical layer, e.g., via DCI.

In the current NR specification TS 38.211 (see reference [2]), the granularity of the SRS transmission bandwidth is a multiple of 4 PRBs since all bandwidth values ($m_{SRS,b}$) in the SRS bandwidth configuration table above are multiples of 4. Hence, the smallest sounding subband size that is supported is given by four PRBs. For enhancing the channel estimation accuracy, the granularity of the smallest subband size may be reduced, e.g., to two PRBs. Therefore, the value range of the sounding subband size may be given either by S∈{4, ... , 272} or S∈ {2, ... , 272}.

Association of Subbands to Frequency Domain Resources

In accordance with embodiments, the bandwidth region used for SRS transmission is associated with a set of frequency domain resources (e.g., $m_{SRS,b}$ PRBs) and segmented into multiple subbands. Each subband is associated with a subset of frequency domain resources of the bandwidth region.

In one exemplary embodiment, the bandwidth region is segmented into N subbands, wherein each subband contains S contiguous PRBs In one exemplary embodiment, the bandwidth region is segmented into N subbands, wherein each subband may contain S non-contiguous PRBs. Here, a subband may be associated with S' non-contiguous sets of PRBs, wherein each set contains S" contiguous PRBs. The association of the S' sets to a subband is predefined by a specific pattern (see e.g., FIG. 7). The pattern may be either configured to the UE, or it is a priori known to the UE, i.e., it is fixed in specification. Note that each subband of the N subbands may comprise a set of contiguous PRBs or a set of non-contiguous PRBs.

Figure 7:
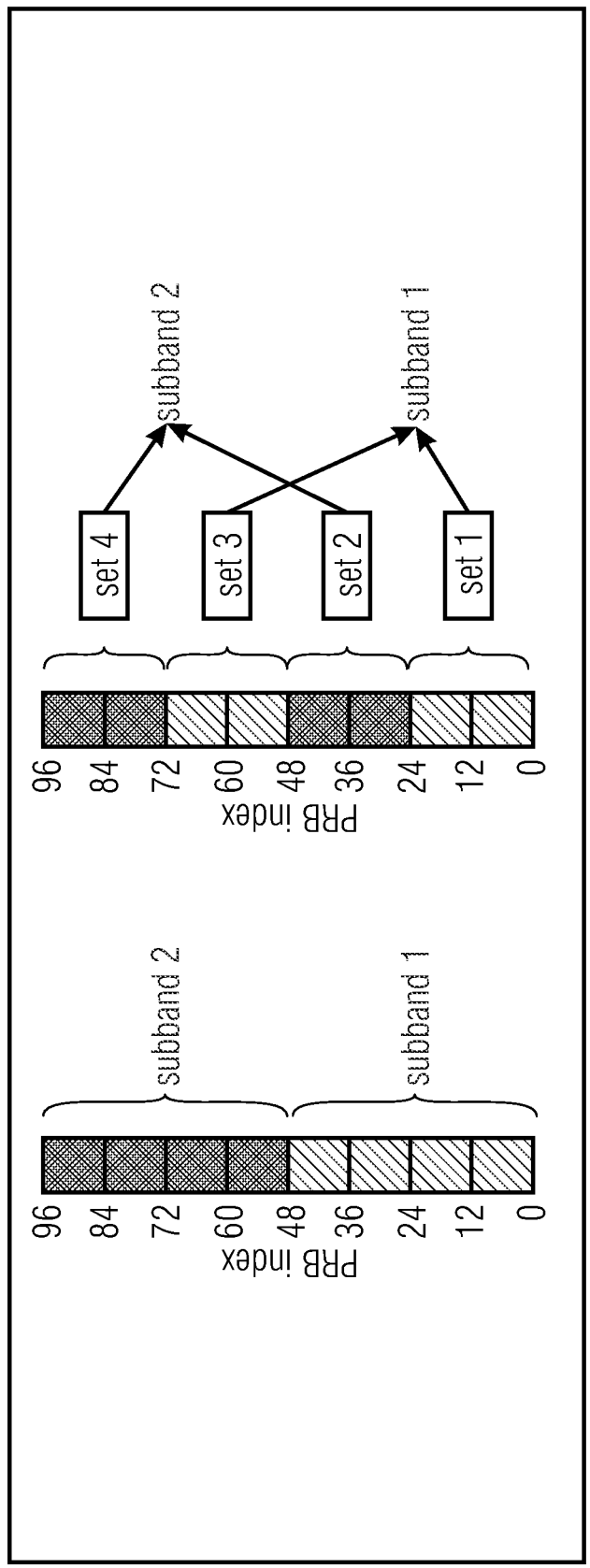
FIG. 7 illustrates an association of subbands to PRBs; (left) subband 1 contains a first set of 48 contiguous PRBs and subband 2 contains a second set of 48 contiguous PRBs; (right) subband 1 contains a set of 48 PRBs associated with S'=2 PRB-sets 1 and 3 and subband 2 contains a set of 48 PRBs associated with S'=2 PRB-sets 2 and 4, wherein each PRB-set contains S"=24 contiguous PRBs.

In some examples, for a configured bandwidth of 96 PRBs and N=2 subbands, the subband size is given by 48 PRBs. The association of the subbands to the PRBs is shown with two examples in FIG. 7. Each subband is associated with S'=2 sets and each set contain S"=24 contiguous PRBs. In FIG. 7 (left), the PRBs per subband are contiguous and each subband contains 48 contiguous PRBs. In FIG. 7 (right), the PRBs per subband are non-contiguous and each subband contains 48 non-contiguous PRBs. The first subband is associated with sets 1 and 3, whereas the second subband is associated with sets 2 and 4.

SRS Subband Sounding Over Multiple Symbol Resources

In accordance with an embodiment, the UE is configured to perform the SRS transmission over one or more symbol resources wherein the bandwidth region used for the SRS transmission is segmented into one or more subbands. Each symbol resource carries an SRS transmit sequence in a specific set of frequency-domain resources wherein the set of frequency-domain resources are associated either with the resources of one subband or with a part of the resources of one subband.

In one exemplary embodiment, the subband size is equal to the hopping bandwidth of $m_{SRS,b}$ PRBs (b=$b_{SRS}$), such that each symbol resource is associated with all $m_{SRS,b}$ PRBs of one subband. When repetition is not configured to the UE, a first symbol resource is associated with a first subband, followed by a second symbol resource that is associated with a second subband, and so on. In one example, the number of symbol resources required to completely sound the configured bandwidth region may be given by the number of hops $N_H$=N. In another example, the number of symbol resources required to sound the indicated subbands in the configured bandwidth region may be given by the number of indicated subbands M, where M<N. When repetition is configured to the UE, R consecutive symbol resources are associated with a first subband, followed by R consecutive symbol resources that are associated with a second subband, and so on. Here, R denotes the repetition factor that is configured via a higher layer (e.g., RRC) to the UE. In one example, the number of symbol resources required to completely sound the configured bandwidth region may be given by R·$N_H$. In another example, the number of symbol resources required to sound the indicated subbands in the configured bandwidth region may be given by R·M, where M<N.

Note again that a symbol resource refers to an OFDM symbol assigned for SRS transmission. The association of all $m_{SRS,b}$ PRBs of one subband to a symbol resource may depend on a predefined pattern (hopping pattern) that is configured using the bandwidth parameters (see the SRS Bandwidth configuration table above) and by the higher layer parameter 'nRRC'. This means the terms 'first subband' and 'second subband' denote the subbands that are associated with the first symbol resource and second symbol resource of a hopping pattern, respectively, and may not necessarily be the first subband and second subband defined with respect to the increasing PRB index. Moreover, when the UE is configured to sound only a subset of subbands out of N subbands, the terms 'first subband' and 'second subband' may denote the first selected subband and second selected subband out of N subbands, respectively.

In one exemplary embodiment, the subband size is not equal to the hopping bandwidth of $m_{SRS,b}$ PRBs (b=$b_{SRS}$), such that each symbol resource is associated only with a subset of $m_{SRS,b}$ PRBs of one subband. The UE is configured with N subbands (e.g., the N subbands are indicated to the UE) to be sounded and each subband may be associated with S'$m_{SRS,b}$ PRBs, where b=$b_{SRS}$. Each subband may comprise S' sets of $m_{SRS,b}$ contiguous PRBs. The SRS transmission for a subband is performed over S'N symbol resources. The S' PRB sets of each subband are associated with S' consecutive symbol resources. In some examples, the association (or mapping) of the S' PRB sets to the S' symbol resources may be pre-defined and may depend or not on the subband index. The mapping may be either fixed in specification, or higher layer configured (e.g., via RRC or MAC-CE), or indicated via the physical layer (e.g., via DCI). The SRS transmission is performed over multiple symbols, where a first symbol resource is associated with a first subset of $m_{SRS,b}$ PRBs associated with a first subband, followed by a second symbol resource that is associated with a second subset of $m_{SRS,b}$ PRBs associated with a first subband, and so on, followed by a symbol resource that is associated with a first subset of $m_{SRS,b}$ PRBs that is associated with a second subband, and so on. In one example, the number of symbol resources required to completely sound the configured bandwidth region may be given by the number of hops $N_H$=S'N. In another example, the number of symbol resources required to sound the indicated subbands (M) in the configured bandwidth region may be given by the number of selected subbands S'M, where M<N. When repetition is configured to the UE, R consecutive symbol resources are associated with a first subset of $m_{SRS,b}$ PRBs which are associated with a first subband, followed by R consecutive symbol resources that are associated with a second subset of $m_{SRS,b}$ PRBs which are associated with the first subband, and so on followed by R consecutive symbol resources are associated with a first set of $m_{SRS,b}$ PRBs associated with a second subband and so on. Here, R denotes the repetition factor that is configured via higher layer signaling to the UE. In one example, the number of symbol resources required to completely sound the configured bandwidth region may be given by RS'N. In another example, the number of symbol resources required to sound the indicated subbands in the configured bandwidth region may be given by RS'M, where M<N.

This means the terms 'first subband' and 'second subband' denote the subbands that are associated with the first symbol resource and second symbol resource of a hopping pattern, respectively, and may not necessarily be the first subband and second subband defined with respect to the increasing PRB index. Moreover, when the UE is configured to sound only a subset of subbands out of N subbands, the terms 'first subband' and 'second subband' may denote the first selected subband and second selected subband out of N subbands, respectively.

Figure 8:
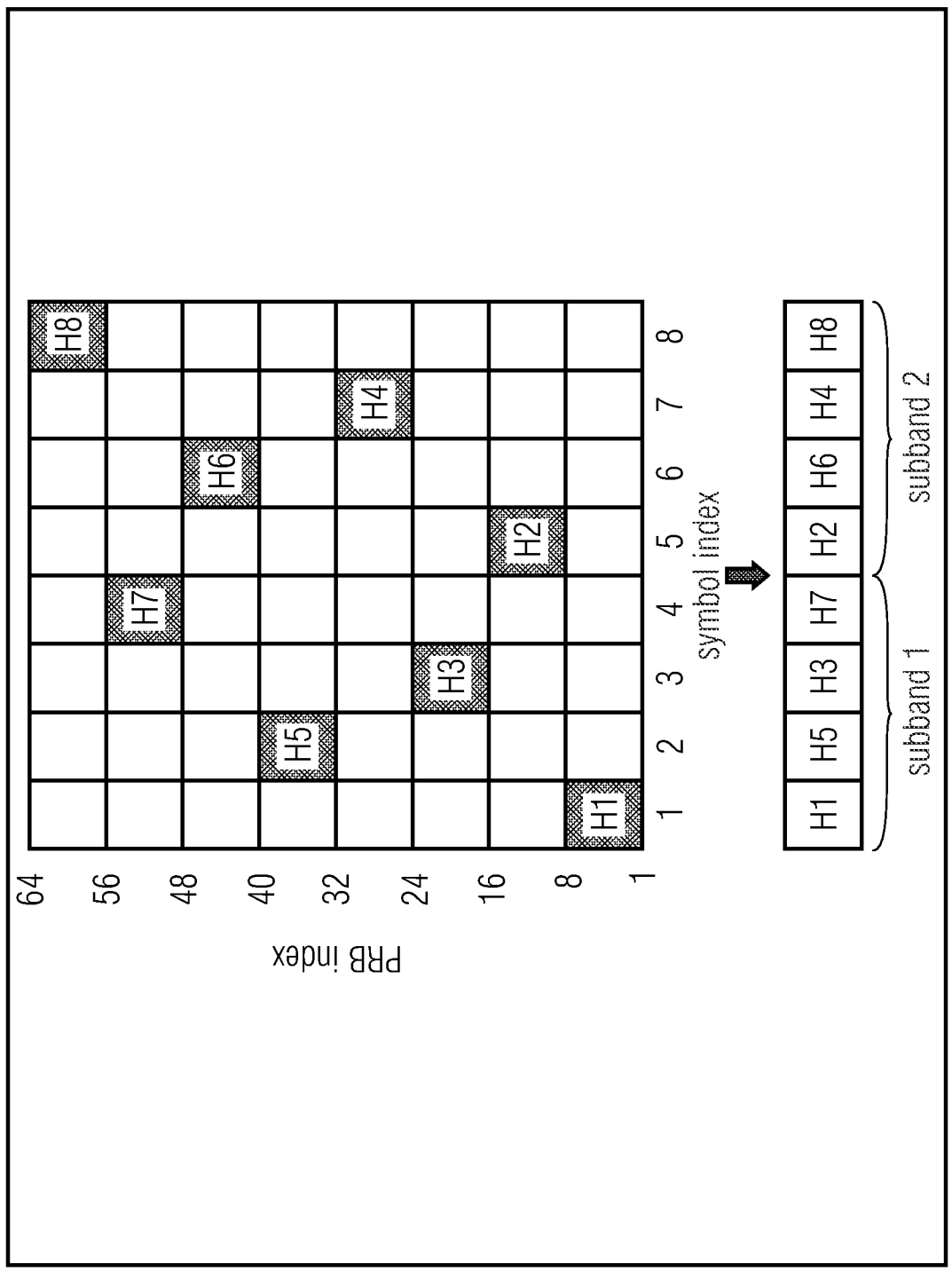
FIG. 8 illustrates an embodiment enabling frequency hopping and Subband 1 is associated with S'=4 sets of PRBs and the first four consecutive symbol resources and subband 2 is associated with S'=4 sets of PRBs and the following four consecutive symbol resources.

FIG. 8 shows an example of the frequency hopping pattern of an SRS resource configured with N=2 subbands and S'=4 sets of $m_{SRS,b}$=8 contiguous PRBs. Therefore, $N_H$=8. For the sake of convenience, only the symbols used for the SRS transmission are shown in the figure. The first subband is associated with the S'=4 PRB sets {$H_1$, $H_3$, $H_5$, $H_7$}, wherein each subset $H_i$={(i−1)$m_{SRS,b}$+1, ..., i$m_{SRS,b}$}, i=1, ..., S'N comprises $m_{SRS,b}$=8 contiguous PRBs. The 4 PRB sets {$H_1$, $H_3$, $H_5$, $H_7$} of the first subband are associated with the first four consecutive symbol resources {1, 2, 3, 4}. The second subband is associated with the S'=4 PRB sets {$H_2$, $H_4$, $H_6$, $H_6$} which are associated with the remaining four consecutive symbol resources {5, 6, 7, 8}.

Figure 9:
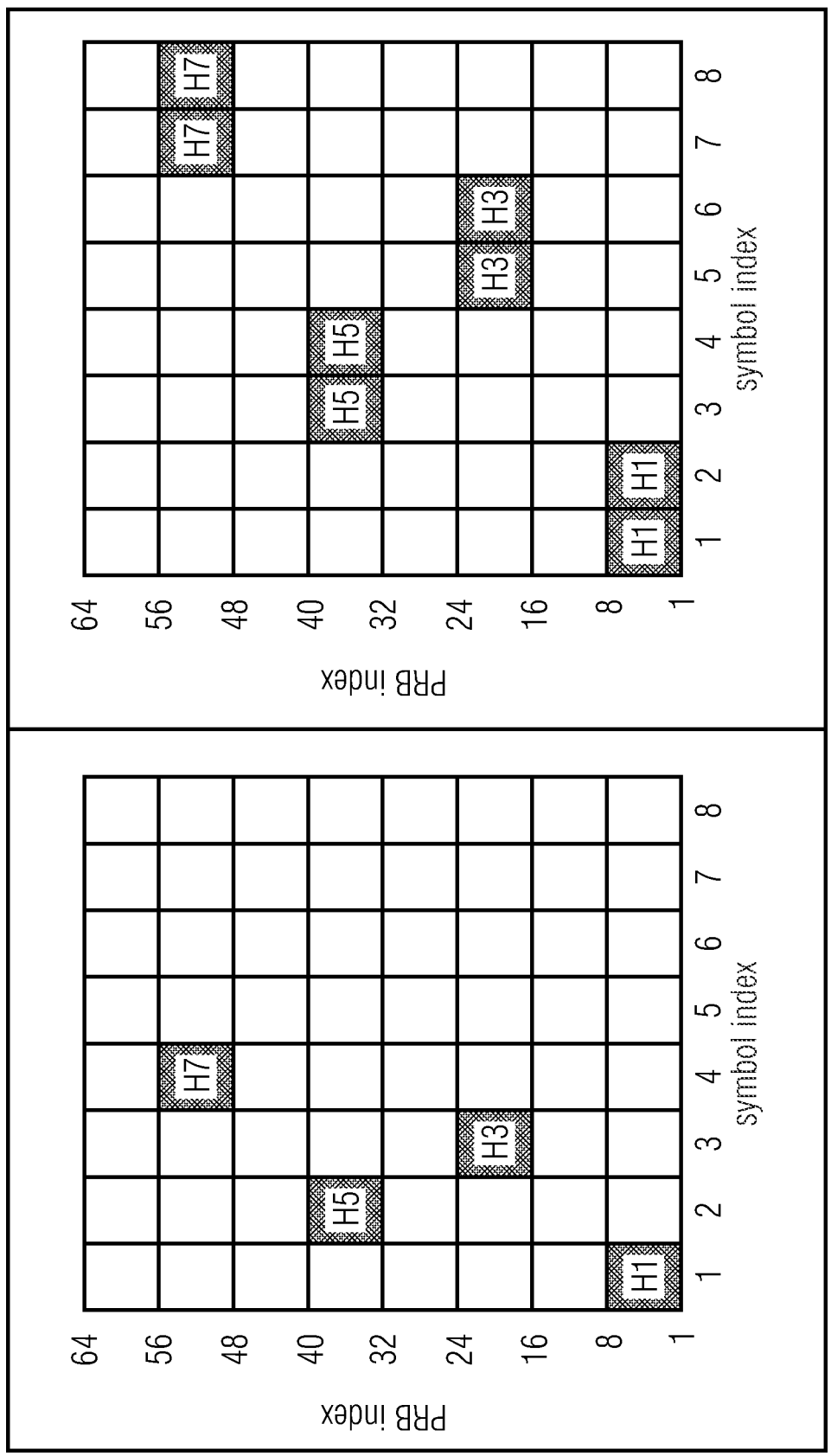
FIG. 9 illustrates the sounding of S'=4 sets of 8 PRBs associated with a single subband without repetition (left) and using (left) only 4 OFDM symbol resources when R=1 and (right) using 8 OFDM symbol resources when R=2.

FIG. 9 shows an example for an SRS transmission on multiple symbol resources for two different values of R when only one subband is indicated to the UE for the SRS sounding example shown in FIG. 8. The subband is associated with S'=4 sets of 8 PRBs. When R=1, the four sets of PRBs are sounded on four consecutive symbol resources. When R=2, for each set of PRBs, the SRS sounding is performed on two consecutive symbol resources.

In accordance with embodiments, the UE performs the SRS transmission on S' symbol resources that are associated with one or more subbands. In one option, the sounding of each subband may be completed within one slot (intra-slot subband SRS sounding). This means all S' symbol resources may belong to the same slot. In another option, the S' symbol resources that are associated with the one or more subbands are transmitted over multiple slots (inter-slot subband SRS sounding). In another option, the S' symbol resources are transmitted over multiple symbols across multiple slots (intra-slot+inter-slot subband SRS sounding).

In accordance with embodiments, the UE is configured to perform an SRS transmission using one or more symbol resources, wherein each symbol resource (hereafter denoted as OFDM symbol or symbol) assigned for SRS transmission carries an SRS transmit sequence in a specific set of frequency-domain resources (PRBs) wherein the set of frequency domain resources are associated with the resources of one or more subbands. When repetition is configured to the UE, the UE is configured to use R symbol resources for the SRS transmission of multiple subbands, wherein the same set of subbands are sounded by the UE on each of the R symbol resources. Here, R denotes the repetition factor that is configured, for example, via a higher layer signaling to the UE.

In one embodiment, the SRS resource(s) used for SRS transmission is/are configured with N subbands and the N subbands may be segmented into T disjoint sets, wherein each of the T sets is associated with a symbol resource and one or more subbands. Each subband is associated with a set of contiguous or non-contiguous sets of frequency domain resources (PRBs). In some examples, the number of subbands of the sets are identical, i.e., $N_\alpha = n$, $\forall \alpha = 1, 2, \ldots, T$, where $N_\alpha$ denotes the number of subbands of set index a. In some examples, the number of subbands of the sets may not be identical $N_\alpha \neq n$, $\forall \alpha = 1, 2, \ldots, T$. In one method, all N subbands may be configured to be used for SRS transmission. Then, the UE performs the SRS transmission over multiple symbol resources, where each symbol resource is associated with a subset of the Nsubbands. In another method, the UE is configured with one or multiple subbands (N'≤N) to be used for the SRS transmission.

In some examples, the number of sets is T=2, and the first set is associated with one or more even numbered subbands ($N_1$), and the second set is associated with one or more odd numbered subbands ($N_2$), wherein $N_1$ and $N_2$ denote the number of even and odd numbered subbands, respectively, and $N_1+N_2 \leq N$.

In some examples, the number of sets is given by T=4, and the first set may be associated with a first set of even subbands ($N_{11}$), the second set may be associated with a second set of even subbands ($N_{12}$), the third set may be associated with a first set of odd subbands ($N_{21}$), and the fourth set may be associated with a second set of odd subbands ($N_{22}$), wherein $N_{11}$, $N_{12}$, $N_{21}$, and $N_{22}$ denote the number of subbands of the first set of even subbands, the number of subbands of the second set of even subbands, the number of subbands of the first set of odd subbands, and the number of subbands of the second set of odd subbands, respectively, wherein $N_{11}+N_{12}+N_{21}+N_{22} \leq N$. In one instance, $N_{ab}=n$, $\forall a$, b. In another instance $N_{ab} \neq n$, $\forall (a, b)$, $\alpha \in \{1, 2\}$, $b \in \{1, 2\}$.

In some examples, when the UE is configured for SRS transmission on all N subbands, the classification of odd and even subbands may be performed based on the subband indices of the N subbands. In some examples, when the UE is configured for SRS transmission on one or more subbands out of N subbands, the classification may be performed based on the global indices of the N subbands. In some examples, the classification may be performed based on the local index of the configured one or more subbands out of a total of N subbands.

Figure 10:
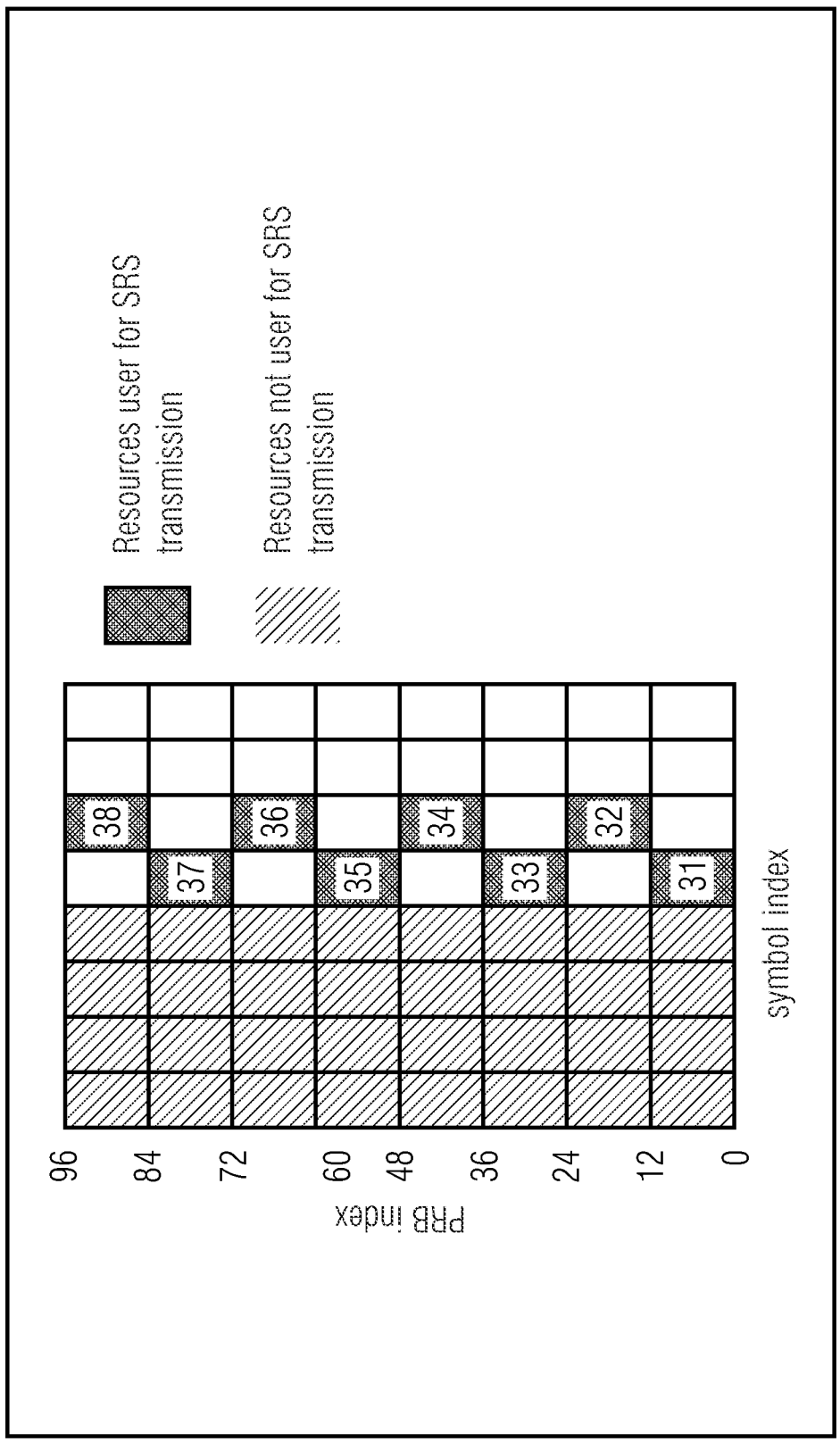
FIG. 10 illustrates the SRS sounding on subbands {S1,S3,S5,S7} using the first OFDM symbol resource and SRS sounding on subbands {S2,S4,S6,S8} using the second OFDM symbol resource when T=2 and N=8.

In some examples (see FIG. 10), an SRS resource is configured with N=8 and T=2 disjoint sets and all N subbands are configured to be used for SRS transmission. The N/2 even subbands {S2,S4,S6,S8} may be used for SRS transmission using a first symbol resource and the remaining N/2 odd subbands {S1,S3,S5,S7} may be used for SRS transmission using a second symbol resource (see FIG. 10). The gNB, upon reception of the SRS from the UE, estimates the channel on each symbol resource. For the first symbol resource, the channel estimates are available for subbands {S2,S4,S6,S8} and the channel estimates for the remaining subbands {S1,S3,S5,S7} may be obtained using interpolation and/or extrapolation. Similarly, for the second symbol resource, the channel estimates are available for the subbands {S1,S3,S5,S7} and the channel estimates for the remaining subbands {S2,S4,S6,S8} may be obtained using interpolation and/or extrapolation. After obtaining the channel estimates associated with all subbands on two symbol resources, the channel estimates are combined to enhance the channel estimation accuracy for the SRS resource. From a UE perspective, the subband sounding can be performed with twice of the amount of power on each symbol resource as only half of the subbands are sounded on each symbol resource.

In some examples, when a UE performs an SRS transmission on a subband comprising $S'm_{SRS,b}$ PRBS, where $S' \geq 1$ and $b=b_{SRS}$, all $S'm_{SRS,b}$ PRBs may be sounded. In one instance, all REs associated with each PRB may be sounded. In another instance, only a subset of REs associated with each PRB may be sounded, wherein the subset of REs is less than the total number of REs associated with a PRB.

In some examples, when a UE performs an SRS transmission on a subband comprising $S'm_{SRS,b}$ PRBs, where $S' \geq 1$ and $b=b_{SRS}$, only a subset of PRBs out of $S'm_{SRS,b}$ PRBs are sounded, wherein the subset of PRBs is less than the total number of PRBs associated with a subband. In one instance, for each PRB that is used for sounding, all REs associated with that PRB may be sounded. In another instance, for each PRB that is used for sounding, only a subset of REs associated with that PRB may be sounded, wherein the subset of REs is less than the total number of REs associated with that PRB.

Indication of Subbands

In accordance with embodiments, the UE is configured to receive an indication of the subbands used for the SRS transmission from the network node. Several methods for the indication of the subbands are proposed in the following. In one method, the indication of the subbands is performed by an N-length bitmap, where N denotes the number of sounding subbands. Each bit of the bitmap is associated with a subband and indicates if the subband is used for SRS sounding. For example, when the m-th bit of the bitmap is set to '1', the associated subband may be used. Correspondingly, when the m-th bit of the bitmap is set to '0', the associated subband may not be used for SRS transmission. In another method, the indication of the subbands is performed by an $\lceil \log_2(\binom{N}{M}) \rceil$-bit indicator indicating M selected subbands out of the total N sounding subbands.

In one method, the number of selected subbands (M) of the bandwidth region used for the SRS transmission is pre-configured (i.e., it is fixed). For example, when the subband indicator is represented by an N-sized bitmap, as described above, the bitmap contains M '1's and N-M '0's indicating the M selected subbands used for SRS transmission.

In another method, the number of selected subbands (M) of the bandwidth region used for the SRS transmission is indicated to the UE via higher-layer configuration (RRC or MAC-CE) or via physical-layer signaling e.g., via DCI.

Low Signaling Overhead Subband Indication Methods

When the number of configured subbands is large, the overhead for the subband indication can be very large which reduces the system efficiency. For example, when the subband size is given by 4 PRBs, based on the current bandwidth configuration table (see the SRS Bandwidth configuration table above), the number of subbands can be up to 68 which may require a bitmap of size 68 bits for indicating the subbands. In order to reduce the overhead for the subband indication, several signaling methods based on bandwidth segmentation are proposed in the following.

Bandwidth Segmentation and Indication

Method 1:

In accordance with an embodiment, the configured bandwidth region to the UE may be segmented into U bandwidth segments, where U≤N, and N denotes the number of subbands. In some examples, the bandwidth region is of size $m_{SRS,b}$ PRBs where $b=b_{hop}$ or $b=\min(b_{hop}, b_{SRS})$. Each bandwidth segment may be associated with one or more subbands. Moreover, the U bandwidth segments may be overlapped or non-overlapped in the frequency domain. This means, in the case of overlapping bandwidth segments, one or more subbands associated with one bandwidth segment may also be associated with one or more other bandwidth segments. When U=N, each bandwidth segment is associated with only one subband.

Figure 11:
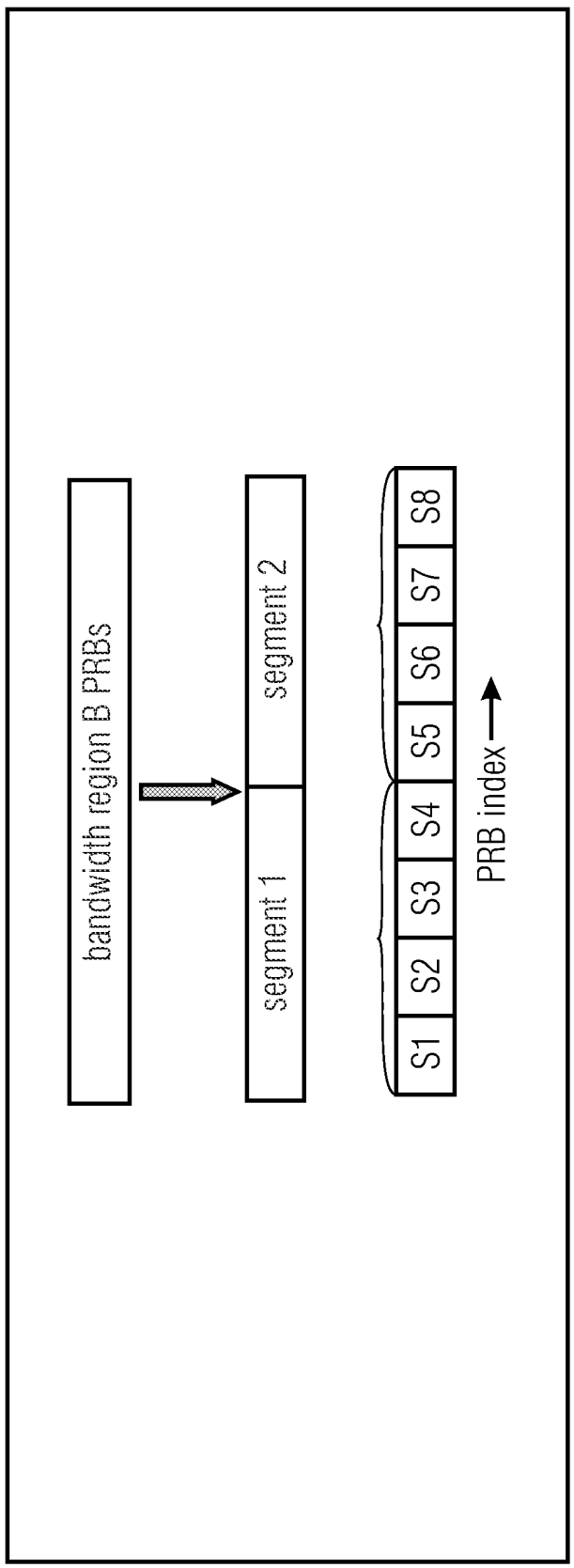
FIG. 11 illustrates the segmentation of the configured bandwidth region into U=2 non-overlapping bandwidth segments with each bandwidth segment comprises 4 subbands.

FIG. 11 shows an example for the segmentation of the configured SRS bandwidth region into U=2 non-overlapping segments and the association of the subbands to each bandwidth segment. The bandwidth region comprises 8 subbands.

In accordance with an embodiment, the configured bandwidth region is segmented into U bandwidth segments and the UE is configured to receive an indication of U' (U'≤U) bandwidth segments used for SRS transmission. In some examples, the UE may be configured to receive an indication of U' selected bandwidth segments by an U-length bit-sequence (called as bandwidth segment indicator in the following). Each bit of the bit-sequence is associated with a bandwidth segment and indicates if all subbands associated with the segment are used for SRS transmission. For example, when the u-th bit of the bit-sequence is set to '1', all subbands associated with that bandwidth segment may be used for SRS transmission. Correspondingly, if the u-th bit of the bit-sequence is set to '0', all subbands associated with that bandwidth segment may not be used for SRS transmission. In some examples, the indication of the bandwidth segments is performed by an $\lceil \log_2(_{U'}^{U}) \rceil$-bit indicator indicating U' selected bandwidth segments out of the total U bandwidth segments.

The number U and U' denote the number of bandwidth segments and selected bandwidth segments, respectively. The value of U and/or the value of U' may be fixed, or configured to the UE via higher layer signaling (e.g., RRC or MAC-CE) or via physical layer signaling (e.g., via the DCI).

Method 2:

In accordance with embodiments, each bandwidth segment of method 1 may be further segmented into $V_u$ bandwidth sub-segments ($V_u \geq 1$), wherein each bandwidth sub-segment is associated with one or more subbands. The number of bandwidth sub-segments $V_u$ can be dependent or not on the segment index u. In some examples, the number of bandwidth sub-segments is identical to all bandwidth segments such that $V_u = V$, $\forall u$.

Figure 12:
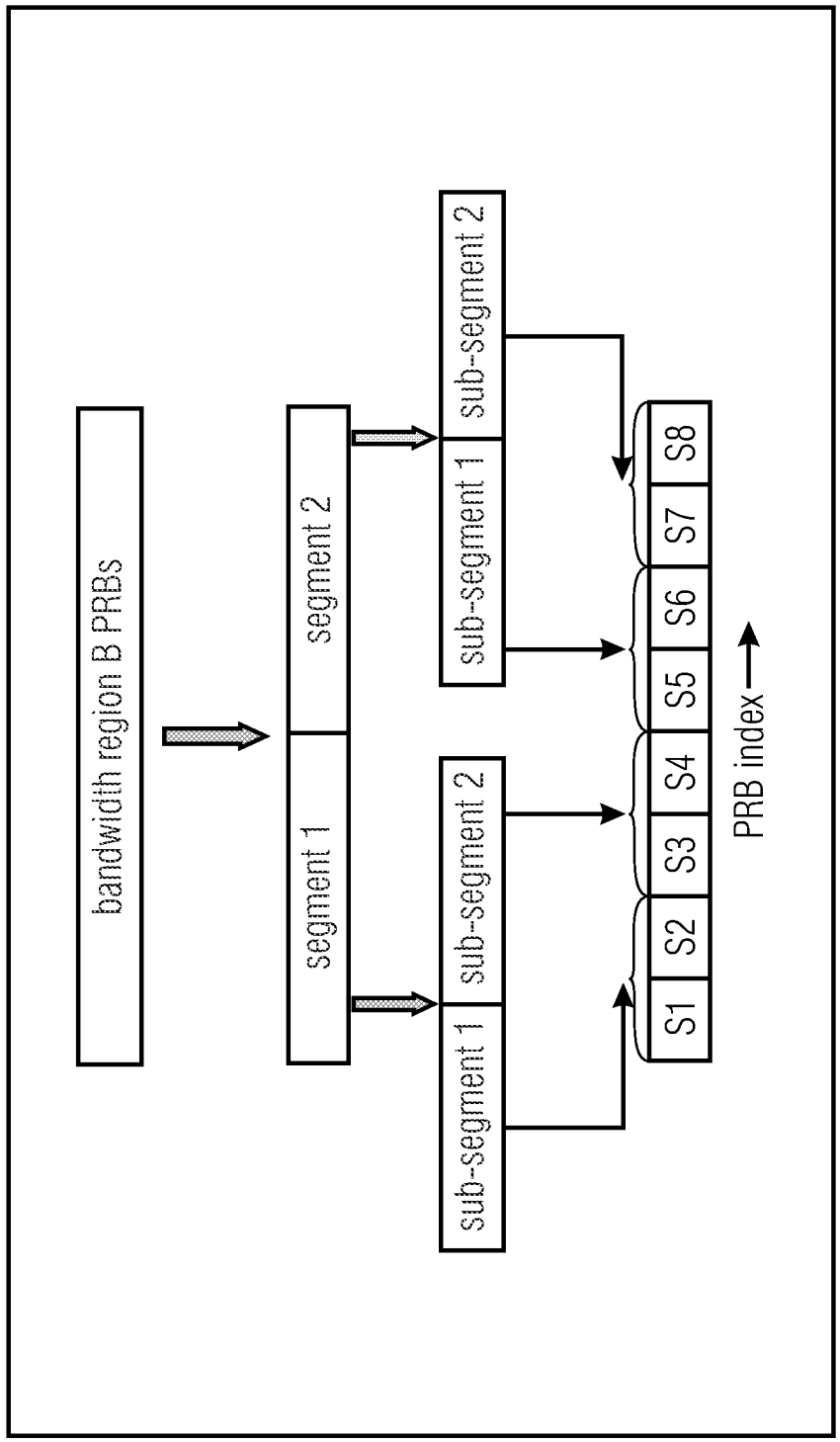
FIG. 12 illustrates the segmentation of the configured bandwidth region to U=2 bandwidth segments and further segmentation of each bandwidth segment to V=2 bandwidth sub-segments and wherein each bandwidth sub-segment comprises 2 subbands.

FIG. 12 shows an example of the segmentation scheme of the bandwidth region into U=2 bandwidth segments wherein each bandwidth segment is further segmented into V=2 bandwidth sub-segments. The bandwidth region comprises 8 subbands, and each bandwidth sub-segment comprises two subbands.

In accordance with embodiments, the UE is configured to receive an indication of U' (U'≤U) bandwidth segments and V and/or V' (V'≤V) bandwidth sub-segments used for SRS transmission. In some examples, the V bandwidth sub-segments per indicated bandwidth segment are indicated by a V-bit indicator (sub-segment indicator per selected segment). Each bit of the bit indicator is associated with a bandwidth sub-segment and indicates if the subband or subbands associated with the bandwidth sub-segment are used for SRS sounding. For example, when the v-th bit of the bit-sequence is set to '1', the v-th bandwidth sub-segment may be used for SRS transmission. Correspondingly, when the v-th bit of the bit-sequence is set to '0', the v-th bandwidth sub-segment may not be used for SRS transmission. In another method, the indication of the selected bandwidth sub-segments per segment is performed by an $\lceil \log_2(_{V'}^{V}) \rceil$-bit indicator indicating V' selected bandwidth sub-segments out of the total V bandwidth sub-segments in each selected segment (sub-segment indicator for each selected segment).

In accordance with embodiments, the total size of the bit indicator that follows the bandwidth segment indicator may be given by $U_1 \cdot V$-bits when a bitmap is used, or at least $U' \cdot \lceil \log_2(_{V'}^{V}) \rceil$-bits when a combinatorial indicator is used.

The number V and V' denotes the number of bandwidth sub-segments and selected bandwidth sub-segments in each bandwidth segment, respectively. The value of V and/or V' may be fixed, or configured to the UE via higher layer signaling (e.g., RRC or MAC-CE) or via physical layer signaling (e.g., via the DCI).

Method 3:

In accordance with embodiments, each bandwidth sub-segment of method 2 may be further segmented into $W_{u,v}$ bandwidth sub-subsegments ($W_{u,v} \geq 1$) wherein each bandwidth sub-subsegment may be associated with one or more subbands. The number of bandwidth sub-subsegments $W_{u,v}$ may be dependent on the bandwidth sub-segment or not. In one example, $W_{u,v} = W$, $\forall u, v$.

Figure 13:
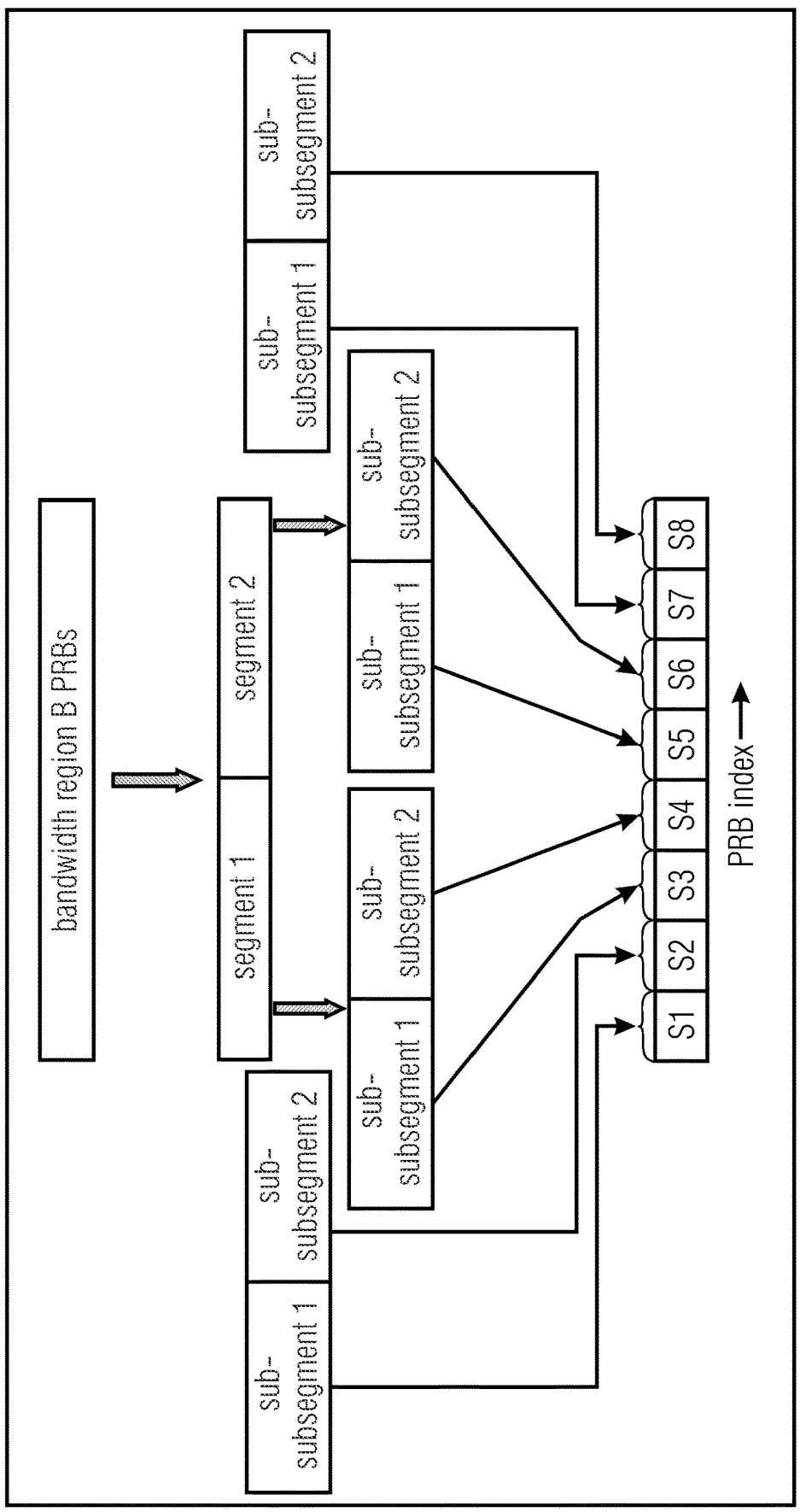
FIG. 13 illustrates the segmentation of the configured bandwidth region into U=2 bandwidth segments and segmentation of each bandwidth segment into V=2 bandwidth sub-segments. Further segmentation of each bandwidth sub-segment into W=2 bandwidth sub-subsegments and bandwidth sub-subsegment comprises only one subband.

FIG. 13 shows the segmentation of the bandwidth region into U=2 bandwidth segments, wherein each bandwidth segment is further segmented into V=2 bandwidth sub-segments. Each bandwidth sub-segment is further segmented into W=2 bandwidth sub-subsegments. The bandwidth region comprises 8 subbands, and each bandwidth sub-subsegment comprises only one subband.

In accordance with embodiments, the UE may be configured to receive an indication of W' bandwidth sub-subsegments indicating the bandwidth sub-subsegments used for SRS transmission. In some examples, each bandwidth sub-subsegment is indicated by a W-bit indicator (called as bandwidth sub-subsegment indicator for each bandwidth sub-segment). Each bit of the bit-sequence is associated with a bandwidth sub-subsegment and indicates if the subbands associated with the bandwidth sub-subsegment are used for SRS sounding. For example, when the w-th bit of the bit-sequence is set to '1', the subbands associated with that bandwidth sub-subsegment may be used. Correspondingly, when the w-th bit of the bit-sequence is set to '0', the subbands associated with the bandwidth sub-subsegment may not be used for the SRS transmission. In another method, the indication of the selected bandwidth sub-subsegments for each bandwidth sub-segment is performed by an $\lceil \log_2(_{W'}^{W}) \rceil$-bit indicator indicating W' selected bandwidth sub-subsegments out of the total W bandwidth sub-segments in each bandwidth sub-segment (bandwidth sub-subsegment indicator for each segment).

In accordance with embodiments, the total size of the bit indicator that follows the bandwidth sub-segment indicator may be given by $V_{tot} \cdot W$-bits when a bitmap is used, and at least $V_{tot} \lceil \log_2(_{W'}{}^W) \rceil$-bits when a combinatorial indicator is used, wherein $V_{Vot}$ is the total number of bandwidth sub-segments selected across all selected bandwidth segments comprising U'·V bandwidth sub-segments. The value of $V_{tot}$ may be fixed, or configured to the UE via higher layer signaling (e.g., RRC or MAC-CE) or physical layer signaling (e.g., via the DCI).

The number W and W denotes the number of bandwidth sub-subsegments for each selected bandwidth sub-segment. The value of W may be fixed, or configured to the UE via higher layer signaling (e.g., RRC or MAC-CE) or physical layer signaling (e.g., via the DCI).

Method 4:

In accordance with embodiments, the configured bandwidth region is segmented into U overlapping or non-overlapping bandwidth segments, where U≤ N, and N denotes the number of subbands. In some examples, the bandwidth region is of size $m_{SRS,b}$ PRBs, where $b=b_{hop}$ and $b_{hop} < b_{SRS}$. Each bandwidth segment may be associated with one or more subbands, and the UE is configured with a single bandwidth segment to be used for SRS transmission. In the case of overlapping bandwidth segments, one or more subbands associated with one bandwidth segment may also be associated with another bandwidth segment. In some examples, each subband may comprise one or more contiguous sets of PRBs comprising of a total of $S'm_{SRS,b}$ PRBs, where S'≥1 and $b=b_{SRS}$.

In one method, the indication of the selected segment may be performed by a [$\log_2$ U]-bit indicator via physical layer (e.g., via the DCI) or via a higher layer (eg., RRC or MAC-CE). Each codepoint out of U codepoints of the [$\log_2$ U]-bit indicator is associated with a bandwidth segment and indicates if the subbands associated with that segment are used for SRS sounding.

Figure 14:
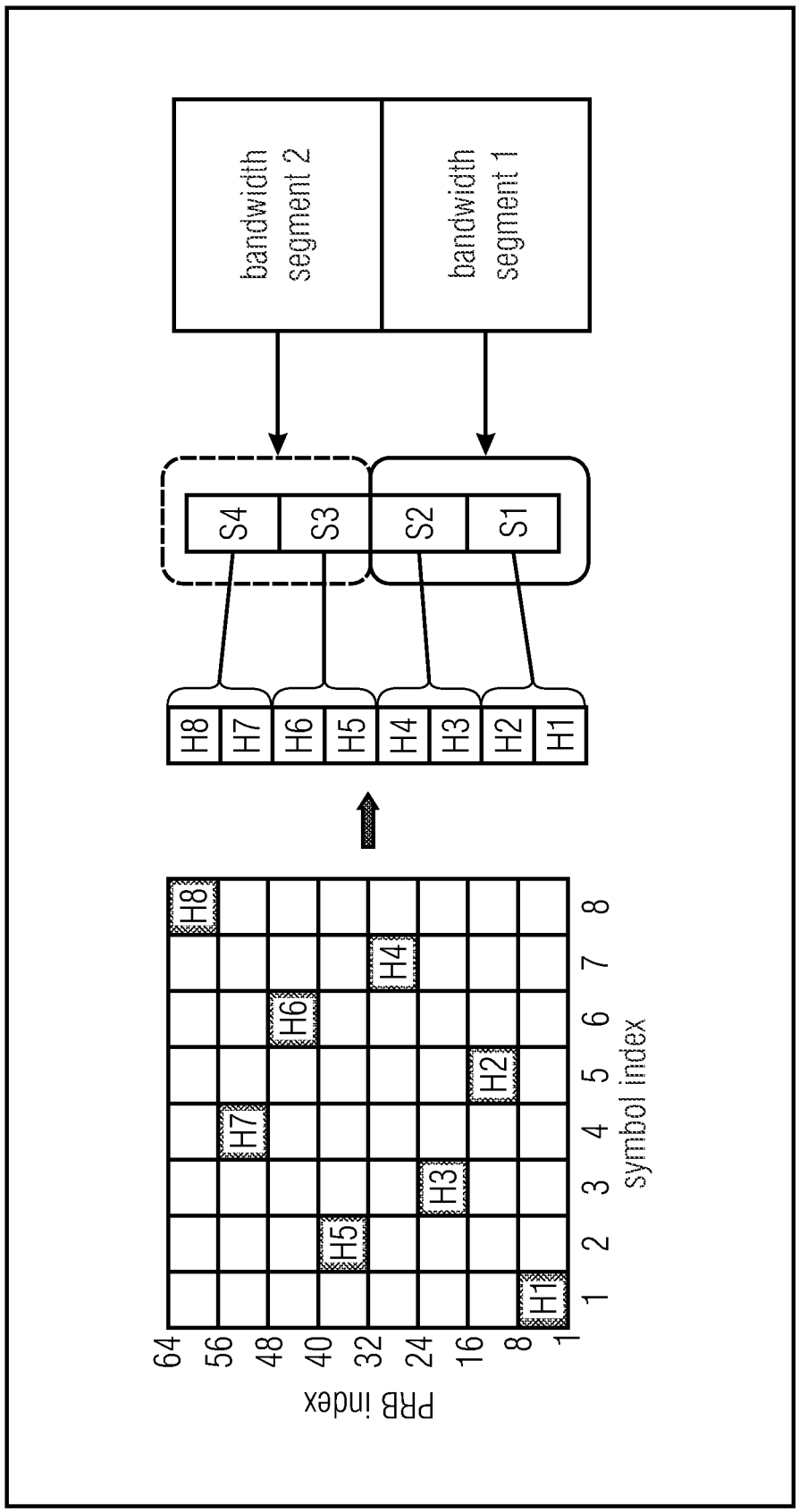
FIG. 14 illustrates the segmentation of the configured bandwidth region into U=2 non-overlapping segments with each segment associated with two subbands when frequency hopping is enabled with 8 hops. Each subbands is associated with two hops i.e., S'=2 sets of contiguous PRBs.
Figure 15:
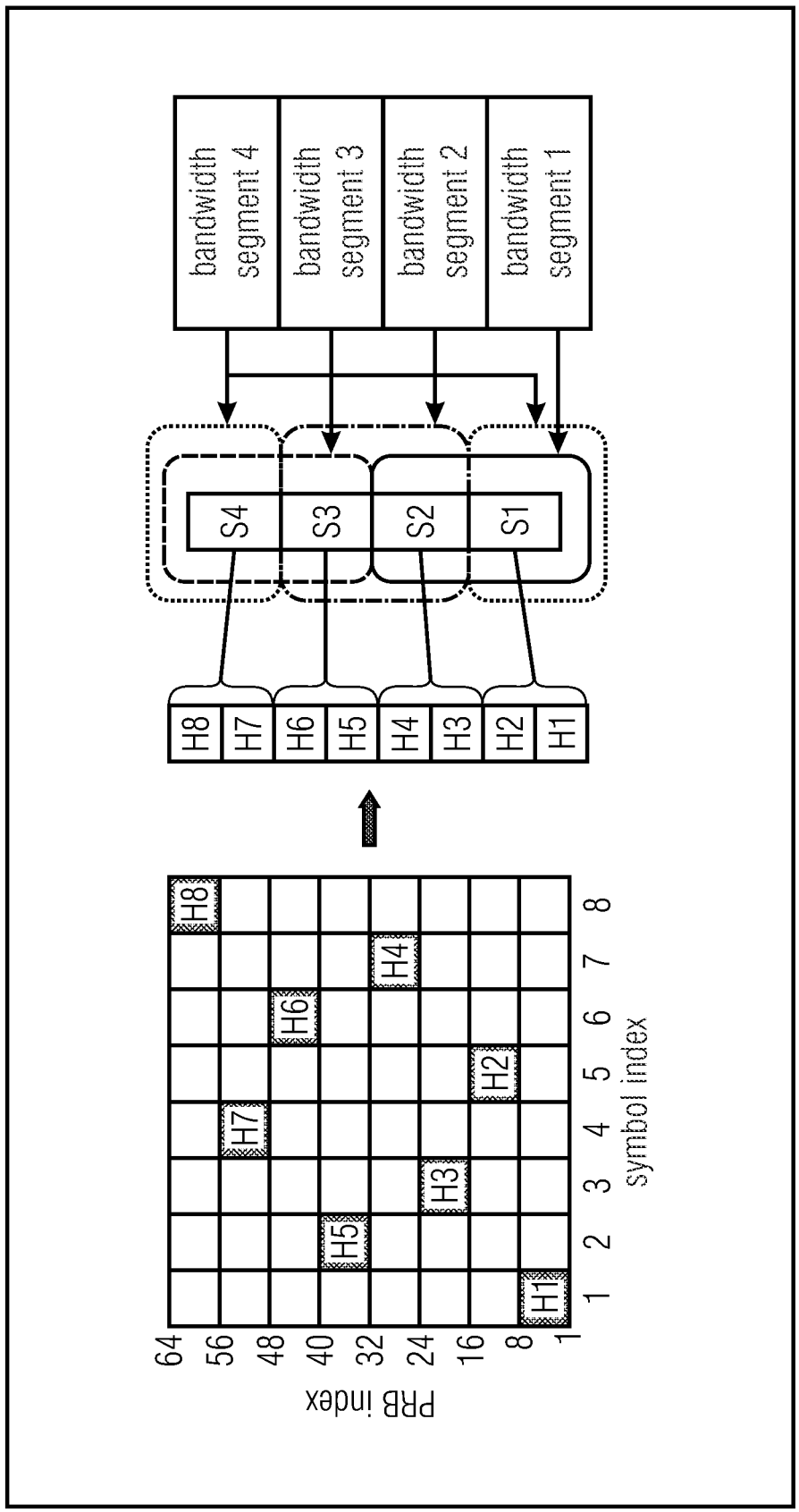
FIG. 15 illustrates the segmentation of the configured bandwidth region into U=4 overlapping segments with each segment associated with two subbands when frequency hopping is enabled with 8 hops. Each subbands is associated with two hops i.e., S'=2 sets of contiguous PRBs.

FIG. 14 and FIG. 15 show examples of the segmentation of the configured bandwidth region when frequency hopping is enabled. For the sake of convenience, only the symbols used for SRS transmission are shown in the figures. An example frequency hopping pattern (nRRC=0) of an SRS resource with $N_H$=8 hops is shown. Each hop is associated with a symbol resource and a set of $m_{SRS,b}$=8 contiguous PRBs defined by the hopping bandwidth. Regardless of the hopping pattern, as the hops are counted with respect to an increasing PRB index and the segmentation is performed along the PRB index dimension, each subband is associated with S'=2 contiguous sets of PRBs. Moreover, the segmentation is performed such that the bandwidth region of each segment comprises $$\frac{m_{SRS,b}}{2} \text{ contiguous } PRBs, \text{ where } b = b_{hop} \text{ and } b_{hop} < b_{SRS}.$$

In some examples, configured bandwidth may be segmented into a number of non-overlapping segments e.g., see FIG. 14. Each segment is associated with a codepoint. For example, for U=2, indicating a '0' to the UE may select the first segment and all subbands associated with the first segment may be used for SRS transmission. Indicating a '1' to the UE may select the second segment and all subbands associated with the second segment may be used for SRS transmission. In FIG. 14, the first segment is associated with subbands {S1,S2}, whereas the second segment is associated with the subbands {S3,S4}. In FIG. 14, each subband is associated with two hops i.e., S'=2 sets of contiguous PRBs.

In some examples, the configured bandwidth may be segmented into a number of overlapping segments e.g., see FIG. 12. Each segment is associated with a set of contiguous subbands. Each segment is associated with one codepoint. For example, for U=4, the codepoint '00' selects the first segment, the codepoint '01' selects the second segment, the codepoint '10' selects the third segment and the codepoint '11' selects the fourth segment. In FIG. 15 the first segment is associated with subbands {S1,S2}, the second segment is associated with the subbands {S2,S3}, the third segment is associated with subbands {S3,S4} and the fourth subband is associated with subbands {S1,S4}. In FIG. 15, each subband is associated with two hops i.e., S'=2 sets of contiguous PRBs.

Time-Frequency Segmentation and Indication

Figure 16:
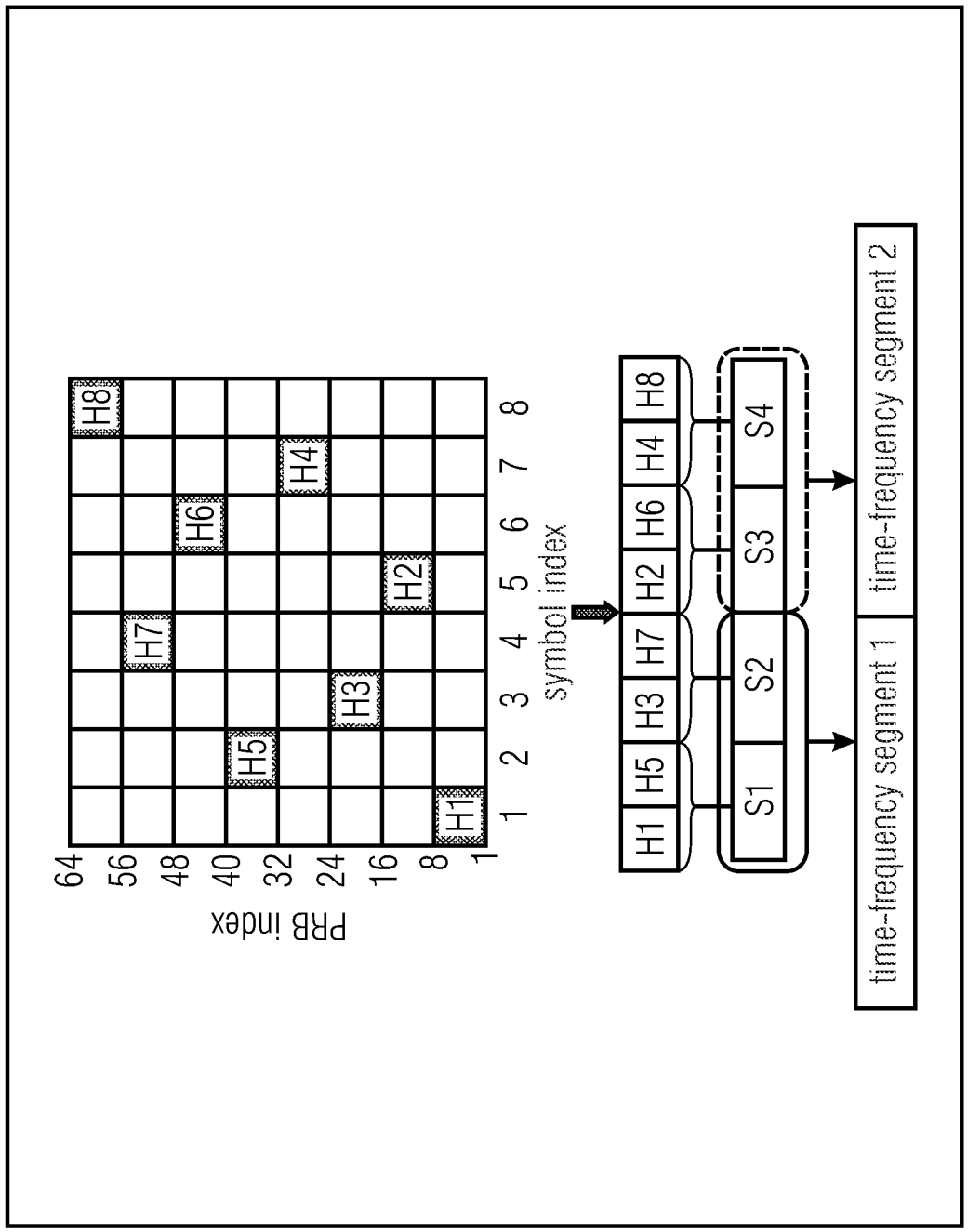
FIG. 16 illustrates the grouping of four subbands to form U=2 non-overlapping segments, each segment is associated with two subbands each.

Method 5:

In accordance with embodiments, when frequency hopping is enabled, the one or more subbands associated with one or more symbol resources may be grouped into a total of U time-frequency segments, where U≤ N, and N denotes the number of subbands (see FIG. 16). In other words, each time-frequency segment may be associated with one or more subbands and one or more symbol resources. Moreover, each subband may comprise one or more contiguous or non-contiguous sets of PRBs comprising of a total of $S'm_{SRS,b}$ PRBs, where S'≥1 and $b=b_{SRS}$.Each symbol resource may be associated with a sub-set of the subbands associated with that time-frequency segment, wherein, in one instance, the subset of the subbands may be given by $m_{SRS,b}$ PRBs, where $b=b_{SRS}$. In addition, the time-frequency segments may be overlapping. This means, the one or more subbands associated a time-frequency segment may also be associated with one or more other time-frequency segments.

In some examples, the UE may be configured with one or more time-frequency segments by a U-bit indicator which may be indicated to the UE via physical layer (e.g., via the DCI) or via higher layer (e.g., RRC or MAC-CE) signaling. Each bit of the bit indicator is associated with a time-frequency segment and indicates whether the time-frequency segment is used for SRS sounding. For example, when the u-th bit of the bit-sequence is set to '1', all subbands associated with that time-frequency segment may be used for SRS transmission.

Correspondingly, if the u-th bit of the bit-sequence is set to '0', all subbands associated with that time-frequency segment may not be used for the SRS transmission.

In some examples, the UE is configured with a single time-frequency segment, wherein the time-frequency segment is indicated to the UE by a $\lceil \log_2 U \rceil$-bit indicator via physical layer (e.g., via the DCI) or via higher layer (e.g., RRC or MAC-CE) signaling. Each of the U codepoints of the $\lceil \log_2 U \rceil$-bit indicator is associated with a time-frequency segment and indicates if the subbands associated with that time-frequency segment are used for SRS sounding.

Figure 17:
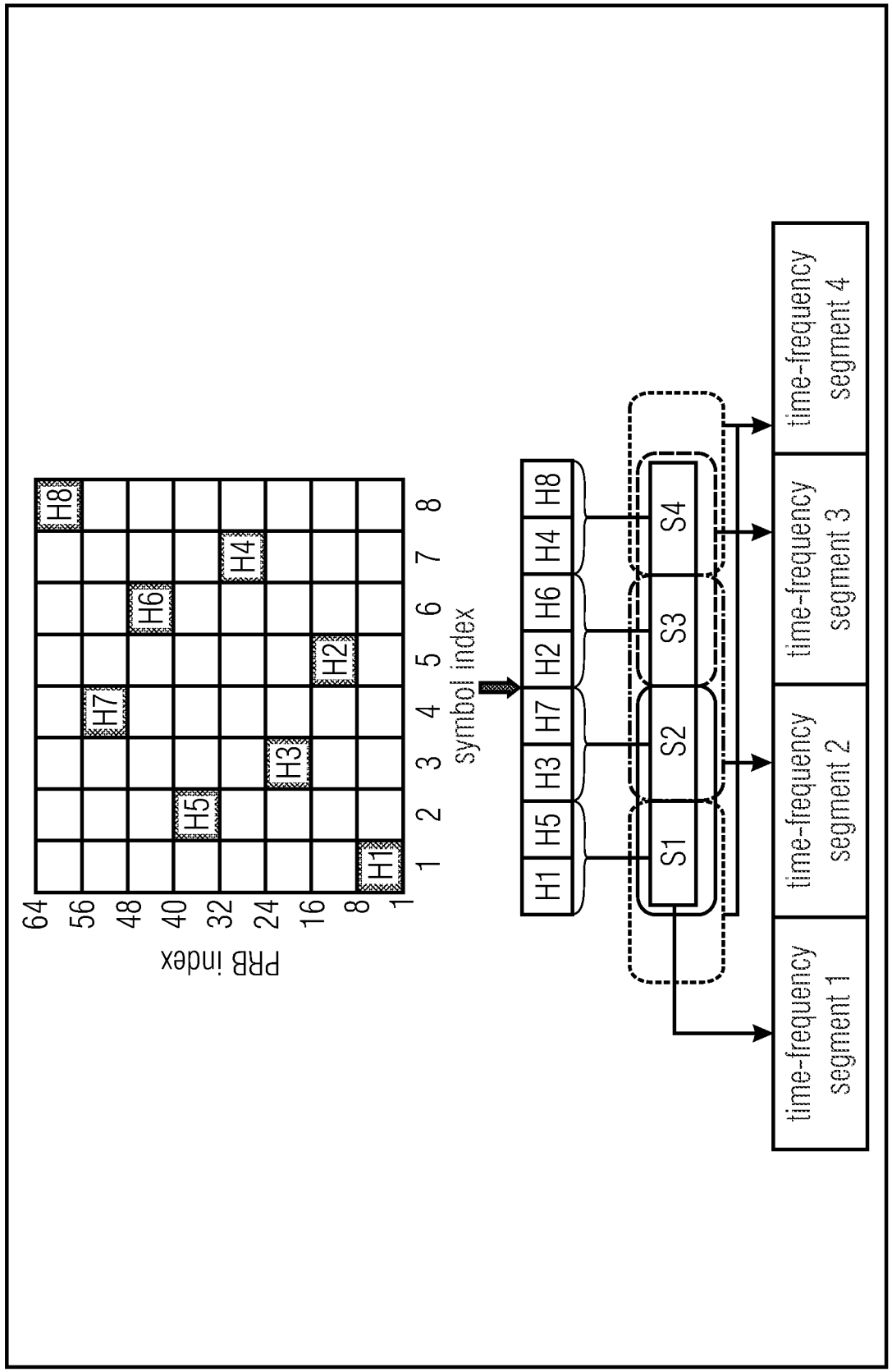
FIG. 17 illustrates the grouping of four subbands to form U=4 overlapping segments, each segment is associated with two subbands and the subbands may be associated with more than one segment.

FIG. 16 and FIG. 17 show examples of grouping of one or more subbands associated with one or more symbol resources into one or more time-frequency segments, when frequency hopping is enabled. For the sake of convenience, only the symbols used for SRS transmission are shown in the figures. An example frequency hopping pattern (nRRC=0) of an SRS resource with $N_H$=8 hops in one hopping cycle is shown. Each subbands comprises S'=2 non-contiguous sets of PRBs associated with two consecutive symbol resources and each set comprises S"=8 contiguous PRBs defined by the hopping bandwidth. Each hop is associated with a symbol resource. The S'=2 PRB sets {H$_1$, H$_3$} of the first subband are associated with the first two consecutive symbol resources {1,2}, the second subband is associated with the S'=2 PRB sets {H$_3$, H$_7$} and are associated with the two consecutive symbol resources {3,4}, the third subband is associated with the S'=2 PRB sets {H$_2$, H$_6$} are associated with the two consecutive symbol resources {5,6} and the fourth subband is associated with the S'=2 PRB sets {H$_4$, H$_8$} are with the two consecutive symbol resources {7,8}. Moreover, the grouping of subbands into time-frequency segments is performed such that the bandwidth region of each time-frequency segment comprises $$\frac{m_{SRS,b}}{2} \text{ contiguous } PRBs, \text{ where } b = b_{hop} \text{ and } b_{hop} < b_{SRS}.$$

Note that the mapping of the set of PRBs of each hop to each symbol resource is dependent on the configured 'nRRC' value. For example, for nRRC=0, the eight symbol resources may be associated with the hops {H1,H5,H3,H7, H2,H6,H4,H8}, whereas for nRRC=2, the eight symbol resources may be associated with the hops {H3,H7,H2,H6, H4,H8,H1,H5}. Therefore, the association of the set of PRBs (hops) to the symbol resources and hence the subbands depends on the configured 'nRRC' value.

Also, note that the subband 1 in method 4 is associated with two sets of contiguous PRBs given by the hopping bandwidth of two hops {H1,H2}, whereas the subband 1 (S1) in method 5 is associated with two sets of non-contiguous PRBs defined by the hopping bandwidth of the two hops {H1,H5}.

In some examples, the subbands may be grouped into a number of non-overlapping time-frequency segments, e.g., see FIG. 16. Each time-frequency segment is associated with a codepoint. For example, for U=2, and indicating a '0' to the UE may select the first time-frequency segment and all subbands associated with the first time-frequency segment may be used for SRS transmission. Indicating a '1' to the UE may select the second time-frequency segment and all subbands associated with the second time-frequency segment may be used for SRS transmission. FIG. 16 shows an example for the grouping of four subbands into two time-frequency segments, wherein the first two subbands form a first time-frequency segment and the remaining two subbands form a second time-frequency segment. Each subband is in turn associated with two sets of PRBs which are mapped to two consecutive symbol resources. The first segment is associated with subbands {S1,S2} and symbol resources {1,2,3,4} and the second segment is associated with subbands {S3,S4} and symbol resources {5, 6, 7, 8}.

In some examples, the subbands may be grouped into a number of overlapping time-frequency segments, e.g., see FIG. 17. Each segment is associated with a set of contiguous subbands. Each segment is associated with one codepoint. For example, for U=4, the codepoint '00' of the [log$_2$ U]-bit indicator may be associated with the first segment, the codepoint '01' may be associated with the second segment, the codepoint '10' may be associated with the third segment and the codepoint '11' may be associated the fourth segment. FIG. 17 shows an example of grouping of four subbands into four segments, wherein the first two subbands {S1,S2} form a first segment, the two subbands {S2,S3} form a second segment, the two subbands {S3,S4} form a third segment and the subbands {S1,S4} form a fourth segment. Each subband is associated with two sets of PRBs mapped to two consecutive symbol resources. Thus, the first segment is associated with subbands {S1,S2} and symbol resources {1,2,3,4}, the second segment is associated with subbands {S2,S3} and symbol resources {3, 4, 5, 6}, the third segment is associated with subbands {S3,S4} and symbol resources {5, 6, 7, 8}, and the fourth segment is associated with subbands {S1,S4} and symbol resources {1, 2, 7, 8}.

Example: Association of Slot to a Time-Frequency Segment

In one example, when frequency hopping spans across N$_S$ slots in one hopping cycle, each slot may be associated with a time-frequency segment. This means, the number of slots used for SRS transmission in one hopping cycle is equal to the number of time-frequency segments i.e., U=N$_S$. Each slot may be associated with one or more subbands, where each subband may be associated with one or more OFDM symbol resources and one or more contiguous or non-contiguous sets of PRBs comprising of a total of S'm$_{SRS,b}$ PRBs, where S'≥1 and b=b$_{SRS}$.

Figure 18:
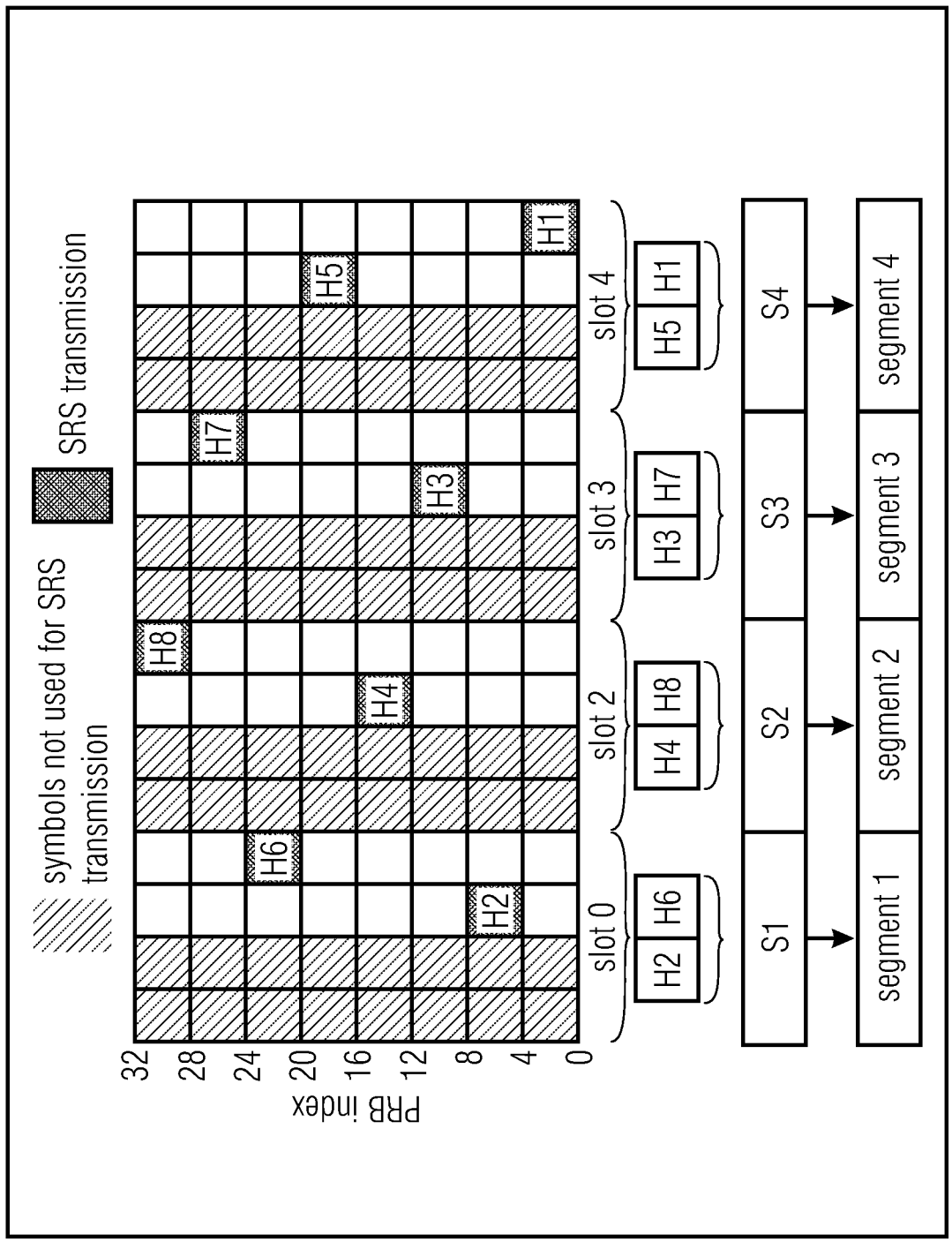
FIG. 18 illustrates the association of each slot to a time-frequency segment. Here, each slot is associated with one subband and each subband is associated with S'=2 non-consecutive PRB sets and two consecutive symbol resources.

FIG. 18 shows an example of the frequency hopping scheme for a periodic SRS resource. The number of hops in the hopping cycle is N$_H$=8 and the SRS transmission spans across N$_S$=4 slots. This means the number of time-frequency segments is given by U=4. Each time-frequency segment is associated with one subband, wherein each subband is associated with two sets of non-contiguous PRBs that are mapped onto two consecutive symbol resources. Subband 1 which is associated with slot 1 and time-frequency segment 1 is associated with PRB sets {H2,H6} and symbol resources {1,2}, subband 2 which is associated with slot 2 and time-frequency segment 2 is associated with PRB sets {H4,H8} and symbol resources {3,4}, subband 3 which is associated with slot 3 and time-frequency segment 3 is associated with PRB sets {H3,H7} and symbol resources {5,6}, and subband 4 which is associated with slot 4 and time-frequency segment 4 is associated with PRB sets {H5,H1} and symbol resources {7,8}.

Method 6:

In accordance with embodiments, the configured bandwidth region is segmented into a first set of U$_1$ overlapping or non-overlapping bandwidth segments along the PRB index dimension, where U$_1$≤N and N denotes the number of subbands. In addition, the one or more subbands associated with one or more symbol resources may be grouped into a second set of U$_2$ overlapping or non-overlapping time-frequency segments along the symbol index dimension, where U$_2$≤N. The bandwidth region is given by m$_{SRS,b}$ PRBs, where b=b$_{hop}$ and b$_{hop}$<b$_{SRS}$ and each subband may comprise one or more contiguous sets of PRBs comprising of a total of S'm$_{SRS,b}$ PRBs, where S'≥1 and b=b$_{SRS}$.Each bandwidth segment and time-frequency segment may be associated with one or more subbands. In the case of overlapping bandwidth segments, one or more subbands associated with a bandwidth segment may also be associated with one or more of the other bandwidth segments. Similarly, in the case of overlapping time-frequency segments, one or more subbands associated with a time-frequency segment may also be associated with one or more of the other time-frequency segments.

In some examples, the number of bandwidth segments U$_1$ and the number of time-frequency segments U$_2$ may be identical i.e., U$_1$=U$_2$.

In some examples, the UE may be configured with one or more bandwidth segments or one or more time-frequency segments by a $U_1+U_2$-bit indicator indicated to the UE via physical layer (e.g., via the DCI) or via higher layer (e.g., RRC or MAC-CE) signaling. Each bit from the first $U_1$ bits of the bit indicator is associated with a bandwidth segment and each bit from the remaining $U_2$ bits of the bit indicator is associated with a time-frequency segment and indicates whether the segment is used for SRS sounding. For example, when the u-th bit of the bit-sequence is set to '1', all subbands associated with that segment may be used for SRS transmission. Correspondingly, if the u-th bit of the bit-sequence is set to '0', all subbands associated with that segment may not be used for SRS transmission.

In some examples, the UE may be configured with a single segment and the indication of the selected segment to the UE may be performed by a $\log_2(U_1+U_2)$-bit indicator via physical layer (e.g., via the DCI) or via higher layer (e.g., RRC or MAC-CE) signaling. Each codepoint out of $U_1+U_2$ codepoints is associated with a segment and indicates if the subbands associated with the segment are used for SRS sounding.

Note that the mapping of the set of PRBs associated with each hop to each symbol resource is dependent on the configured 'nRRC' value. However, for the first set of U segments, since the hops are counted with respect to an increasing PRB index, each subband is associated with a one or more contiguous sets of PRBs or hops, regardless of the hopping pattern or configured 'nRRC' value. For the second set of U segments that are formed by grouping of one or more subbands, the hopping pattern or the configured 'nRRC' value does makes a difference in the association of the set of PRBs associated with each hop to each symbol resources. For example, for nRRC=0, the eight symbol resources may be associated with the hops {H1,H5,H3,H7, H2,H6,H4,H8}, whereas for nRRC=2, the eight symbol resources may be associated with the hops {H3,H7,H2,H6, H4,H8,H1,H5}. Therefore, the association of the set of PRBs (hops) to the symbol resources and hence the subbands depends on the configured 'nRRC' value.

Figure 19:
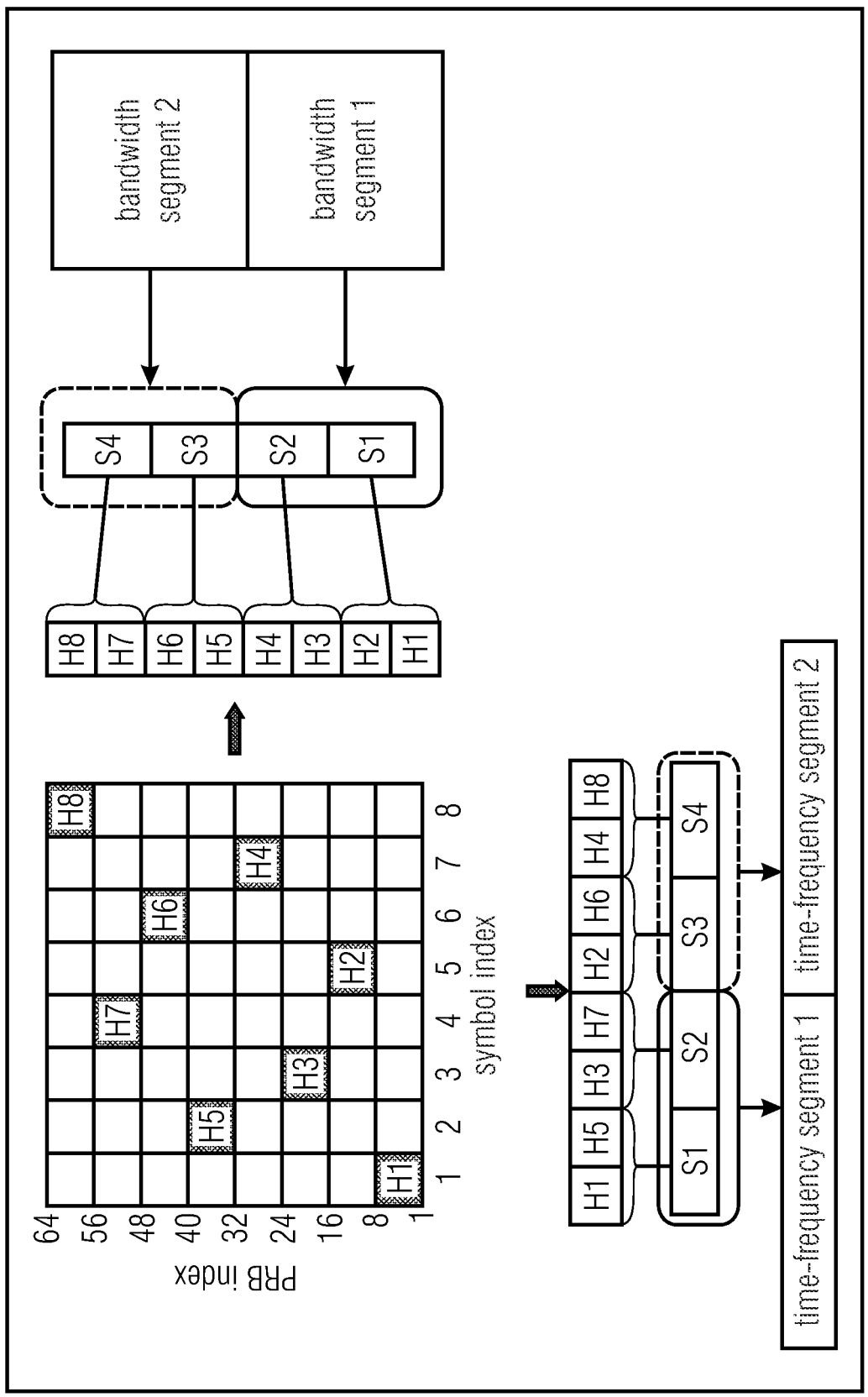
FIG. 19 illustrates the segmentation of the bandwidth region into U=2 bandwidth segments and each bandwidth segment is associated with two subbands. Grouping of two subbands to form U=2 non-overlapping time-frequency segments.
Figure 20:
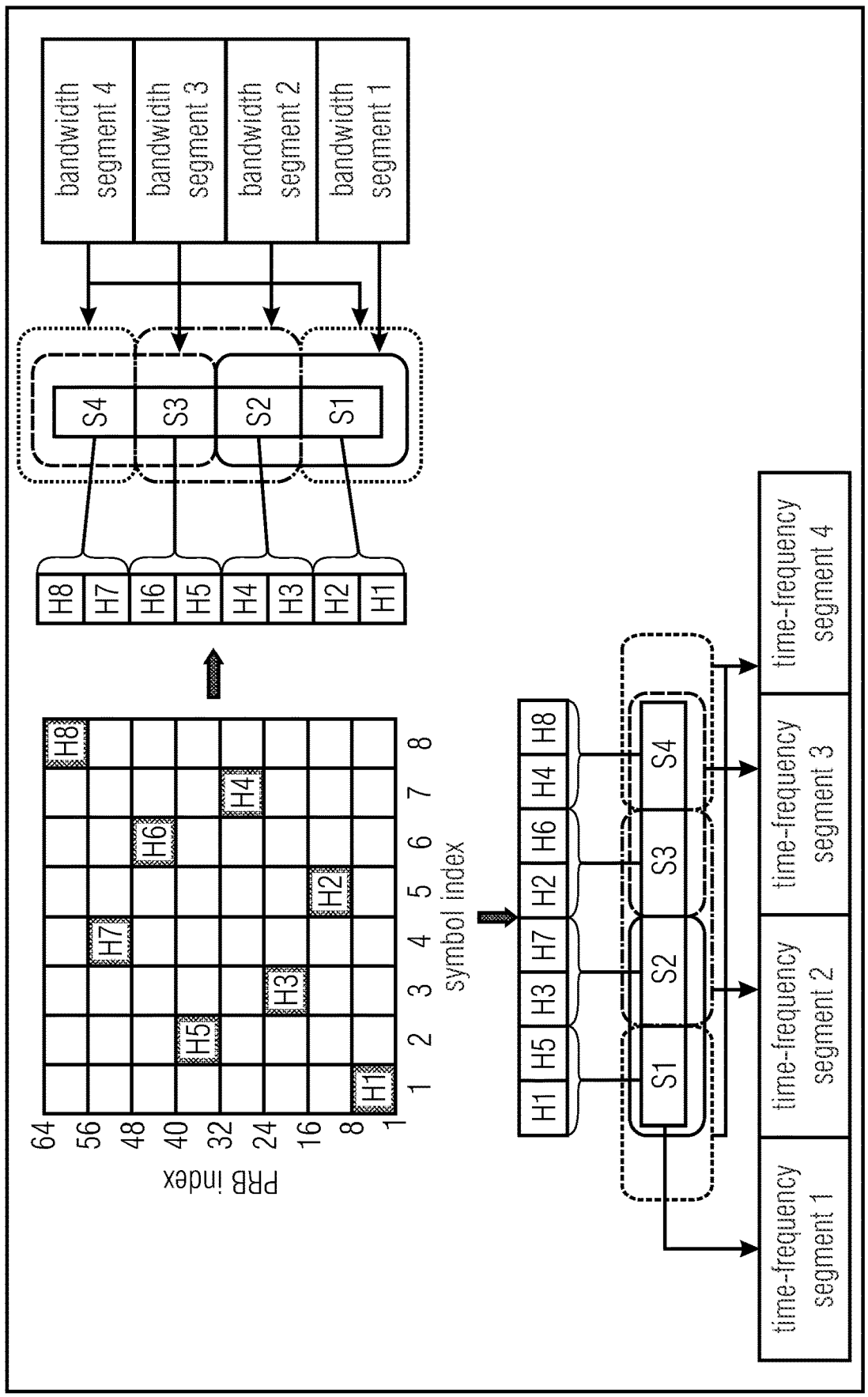
FIG. 20 illustrates the segmentation of the bandwidth region into U=4 overlapping bandwidth segments and grouping of subbands to form U=4 overlapping time-frequency segments. Each bandwidth/time-frequency segment is associated with two subbands and the subbands may be associated with more than one bandwidth/time-frequency segment.

FIG. 19 and FIG. 20 show examples of the segmentation of the configured bandwidth region as well as the grouping of four subbands associated with eight symbol resources into two or four segments, when frequency hopping is enabled. For the sake of convenience, only the symbols used for SRS transmission are shown in the figures. An example frequency hopping pattern (nRRC=0) of an SRS resource with $N_H$ =8 hops is shown. Each hop is associated with a symbol resource and a set of $m_{SRS,b}$=8 contiguous PRBs defined by the hopping bandwidth. When the segmentation is performed along the PRB index dimension and as the hops are counted with respect to an increasing PRB index, regardless of the hopping pattern, each subband is associated with a S'=2 contiguous sets of S"=8 contiguous PRBs. The first subband is associated with sets {H1,H2} the second subband is associated with sets {H3, H4}, the third subband is associated with sets {H5, H6}, and the fourth subband is associated with sets {H7,H8}. When the grouping is performed along the symbol index dimension, each subband comprises S'=2 non-contiguous sets associated with two consecutive symbol resources and each set comprises S"=8 contiguous PRBs defined by the hopping bandwidth. The S'=2 PRB sets {H1, H3} of the first subband are associated with the first two consecutive symbol resources {1,2}, the second subband is associated with the S'=2 PRB sets {H3, H7} are associated with the two consecutive symbol resources {3,4}, the third subband is associated with the S'=2 PRB sets {H2, H6} are associated with the two consecutive symbol resources {5,6} and the fourth subband is associated with the S'=2 PRB sets {H4, H8} are associated with the two consecutive symbol resources {7,8}. Moreover, the segmentation of the configured bandwidth region into bandwidth segments and the grouping of subbands into time-frequency segments is performed such that the bandwidth region of each bandwidth segment and time-frequency segment comprises $$\frac{m_{SRS,b}}{2} \text{ PRBs, where } b = b_{hop} \text{ and } b_{hop} < b_{SRS}.$$

In some examples the number of bandwidth segments and time-frequency segments are equal i.e., $U_1$=U and $U_2$=U e.g., see FIG. 19 and FIG. 20.

In some examples, the subbands associated with the bandwidth segments may not be overlapping. Similarly, the subbands associated with the time-frequency segments may not be overlapping e.g., see FIG. 19. In some examples, for U=2, the total number of segments is given by four. The number of codepoints equals the number of segments. Out of four codepoints, the first two codepoints may be associated with the two non-overlapping bandwidth segments, whereas the remaining two codepoints may be associated with the two non-overlapping time-frequency segments. As shown in FIG. 19, the first segment i.e., the first bandwidth segment is associated with sets {H1,H2,H3,H4} and the second segment i.e., the second bandwidth segment is associated with sets {H5,H6,H7,H8}, the third segment i.e., the first time-frequency segment is associated with sets {H1, H3,H5,H7} and symbol resources {1,2,3,4}, and the fourth segment i.e., the second time-frequency segment is associated with sets {H2,H4,H6,H8} and symbol resources {5, 6, 7, 8}.

In some examples, the subbands associated with the bandwidth segments may be overlapping. Similarly, the subbands associated with the time-frequency segments may be overlapping e.g., see FIG. 20. The number of codepoints equals the number of segments. Out of eight codepoints, the first four codepoints may be associated with the four overlapping bandwidth segments, whereas the remaining four codepoints may be associated with the four-overlapping time-frequency segments. As shown in FIG. 20, the first bandwidth segment i.e., the first bandwidth segment may be associated with sets {H1,H2,H3,H4}, the second segment i.e., the second bandwidth segment is associated with sets {H3,H4,H5,H6}, the third segment i.e., the third bandwidth segment is associated with sets {H5,H6,H7,H8}, the fourth segment i.e., the fourth bandwidth segment is associated with sets {H1,H2,H7,H8}, the fifth segment i.e., the first time-frequency segment is associated with sets {H1,H3,H5, H7} and symbol resources {1,2,3,4}, the sixth segment i.e., the second time-frequency segment is associated with sets {H2,H3,H6,H7} and symbol resources {3, 4, 5, 6}, the seventh segment i.e., the third time-frequency segment is associated with sets {H2,H4,H6,H8} and symbol resources {5, 6, 7, 8}, and the eighth segment i.e., the fourth time-frequency segment is associated with sets {H1,H4,H5,H8} and {1, 2, 7, 8}

Examples of Segment Indicators

In accordance with embodiments, the segmentation of the bandwidth region into U segments or the grouping of N subbands into U segments may be performed such that each segment is associated with $f \cdot m_{SRS,b}$ PRBs. Here, $b=b_{hop}$ or $b=\min(b_{hop}, b_{SRS})$ and $f \in [0,1] \subset \mathbb{R}$. The value of f may be fixed, or configured to the UE via higher layer signaling (e.g., RRC or MAC-CE) or physical layer signaling (e.g., via the DCI). In some examples, $$f \in \left\{\frac{1}{4}, \frac{1}{2}, \frac{3}{4}\right\}.$$

In accordance with embodiments, the association of each segment to a number of subbands may be given by a fixed pattern depending on the bandwidth size of each segment defined by $f \cdot m_{SRS,b}$ PRBs, where $b=b_{hop}$ or $b=\min\{b_{hop}, b_{SRS}\}$. In some examples, the number of segments U may be derived from the value of f or vice-versa. In the following, few examples are provided detailing the association of the subbands to segments for different values of f.

In some examples, for f=¼, the bandwidth region is segmented into four non-overlapping segments. The first segment is associated with a first set of N/4 contiguous subbands, the second segment is associated with a second set of N/4 contiguous subbands, the third segment is associated with a third set of N/4 contiguous subbands and the fourth segment is associated with a fourth set of N/4 contiguous subbands.

In some examples, for f=¼, the bandwidth region is segmented into four non-overlapping segments. The first segment may be associated with a first set of N/4 even subbands, the second segment may be associated with a second set of N/4 even subbands, the third segment may be associated with a first set of N/4 odd subbands and the fourth segment may be associated with a second set of N/4 odd subbands.

In some examples, for $$f = \frac{1}{2},$$

the bandwidth is segmented into two non-overlapping segments. The first segment may be associated with a first set of N/2 contiguous subbands and the second segment may be associated with the remaining N/2 contiguous subbands.

In some examples, for $$f = \frac{1}{2},$$

the bandwidth region is segmented into two non-overlapping segments. The first segment may be associated with a set of N/2 even subbands and the second segment may be associated with a set of N/2 odd subbands.

In some examples, for $$f = \frac{1}{2},$$

the bandwidth region is segmented into four overlapping segments. The first segment is associated with a first set of N/2 contiguous subbands, the second segment is associated with a second set of N/2 contiguous subbands, the third segment is associated with a set of N/2 even subbands and the fourth segment is associated with a set of N/2 odd subbands.

In some examples, for f=¾, the bandwidth region is segmented into four overlapping segments. The first segment is associated with three sets i.e., a first, a second and a third set each of N/4 contiguous subbands. The second segment is associated with the first, the third and a fourth set each of N/4 contiguous subbands. The third segment is associated with the second, the third and the fourth set each of N/4 contiguous subbands. The fourth segment is associated with the first, the second and the fourth set each of N/4 contiguous subbands.

In some examples, for f=¾, the bandwidth region is segmented into four overlapping segments. The first segment is associated with three sets i.e., a first and a second set each of N/4 even subbands and a first set of N/4 odd subbands. The second segment is associated with the first set of N/4 even subbands and the first and a second set each of N/4 odd subbands. The third segment is associated with the second set of N/4 even subbands and the first and the second set each of N/4 odd subbands. The fourth segment is associated with the first and the second set each of N/4 even subbands and second set of N/4 odd subbands.

In some examples, for f=¾, the bandwidth region is segmented into eight overlapping segments. The first segment is associated with three sets i.e., a first, a second and a third set each of N/4 contiguous subbands. The second segment is associated with the first, the third and a fourth set each of N/4 contiguous subbands. The third segment is associated with the second, the third and the fourth set each of N/4 contiguous subbands. The fourth segment is associated with the first, the second and the fourth set each of N/4 contiguous subbands. The fifth segment is associated with three sets i.e., a first and a second set each of N/4 even subbands and a first set of N/4 odd subbands. The sixth segment is associated with the first set of N/4 even subbands and the first and a second set each of N/4 odd subbands. The seventh segment is associated with the second set of N/2 even subbands and the first and the second set each of N/4 odd subbands. The eighth segment is associated with the first and the second set each of N/4 even subbands and second set of N/4 odd subbands.

Activation/Triggering of Resources/Resource Sets Instead of Indication of Sounding Subbands In one embodiment, the UE may be configured with one or more resource pools, wherein each resource pool may be associated with one or more resource sets, wherein each resource set may be associated with one or more resources. In one example, the number of resource pools configured to the UE is given by two. The first resource pool may be the 'primary' resource pool and the second resource pool may be the 'secondary' resource pool.

In accordance with embodiments, the one or more resources or the one or more resource sets associated with the secondary resource pool may not be active unless the UE receives an explicit indication of the activation of the resource or the resource sets of the secondary resource pool. In one example, the one or more resource sets of the secondary resource pool may be activated by a higher layer signaling (e.g. MAC-CE) or by physical layer signaling (e.g. DCI triggering).

In accordance with embodiments, a one-bit indication may be used in the physical layer signaling or in the higher layer signaling to activate/trigger the one or more resource sets from the configured resource pools. A '0' may indicate the activation/triggering of the one or more resource sets associated with the primary resource pool, and a '1' may indicate the activation/triggering of the one or more resource sets associated with the secondary resource pool.

In accordance with embodiments, the resources from the primary resource pool may be used for a first SRS transmission and the resources from the 'secondary' resource pool may be used for a second SRS transmission. The first SRS transmission may use all PRBs of the configured bandwidth region of size m $R_S$ and the second SRS transmission may use a subset ($<m_{SRS}^P$) of PRBs of the configured bandwidth region.

Instead of indicating to the UE the one or more selected subbands of an SRS resource, the gNB may form an association of the selected subbands to one or more resources associated with one or more resource sets from the secondary resource pool configured to the UE. Upon association of the subbands to the resources from the secondary resource pool, the gNB may activate/trigger the resources from the secondary resource pool.

In accordance with embodiments, a set of PRBs allocated to each SRS resource ($r_p$) from the primary resource pool may be overlapping with one or more resources in the secondary resource pool.

In accordance with embodiments, each resource ($r_p$) from the primary resource pool may be associated with one or more resources ($r_s^\alpha$, $\forall \alpha=1, \ldots, A$) from the secondary resource pool with respect to the bandwidth regions (see FIG. 18). The bandwidth of the resource ($r_p$) from the primary pool is given by $m_{SRS}^P$ PRBs, and the bandwidth of each resource ($r_s^\alpha$) from the secondary pool related to the resource from the primary pool is given by $m_{SRS}^{S,r_s^\alpha}$ PRBs, where $m_{SRS}^{S,r_s^\alpha} < m_{SRS}^P, \forall \alpha$.

In one example, the size of the bandwidth regions of all A resources from the secondary resource pool may be identical. In another example, the bandwidth regions of all A resources from the secondary resource pool may be partially identical or different.

Figure 21:
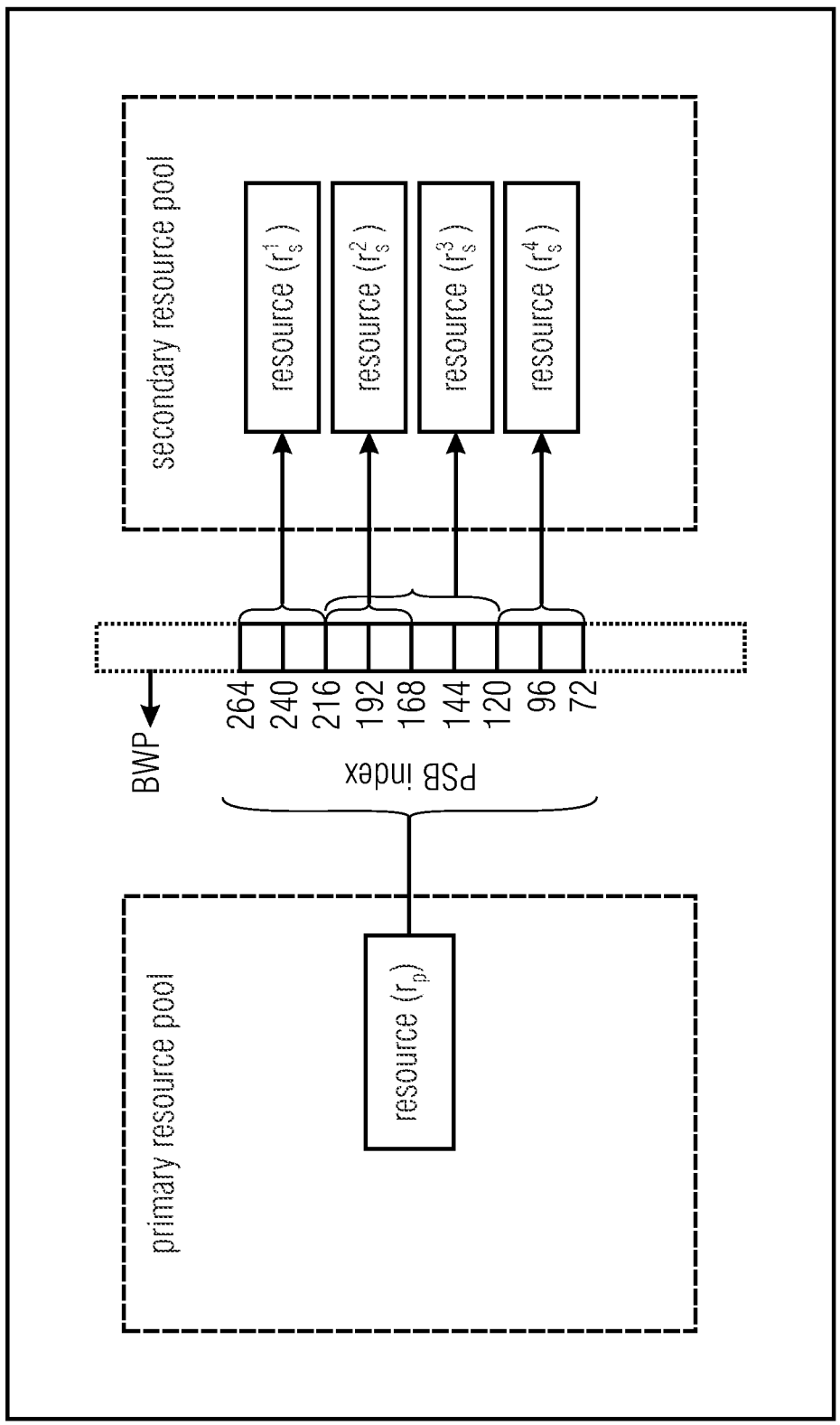
FIG. 21 illustrates the association of a resource from a primary resource pool to A=4 resources from a secondary resource pool. The allocated PRBs of the resources in the secondary resource pool are overlapping with the allocated PRBs of the resource from the primary resource pool.

In FIG. 21, the resource from the primary resource pool whose bandwidth is given by $m_{SRS}^P=192$ PRBs is associated with A=4 resources from the secondary resource pool. The bandwidth regions of the first, second, third and fourth resources from the secondary resource pool is given by 48 PRBs, 48PRBs, 96 PRBs and 48 PRBs, respectively. The bandwidths of each resource from the secondary resource pool is allocated such that the allocated PRBs are overlapping with the PRBs of the primary resource as shown in the Figure. Moreover, the resources from the secondary resource pool may also be overlapping as shown in the figure.

Second Aspect

Figure 22:
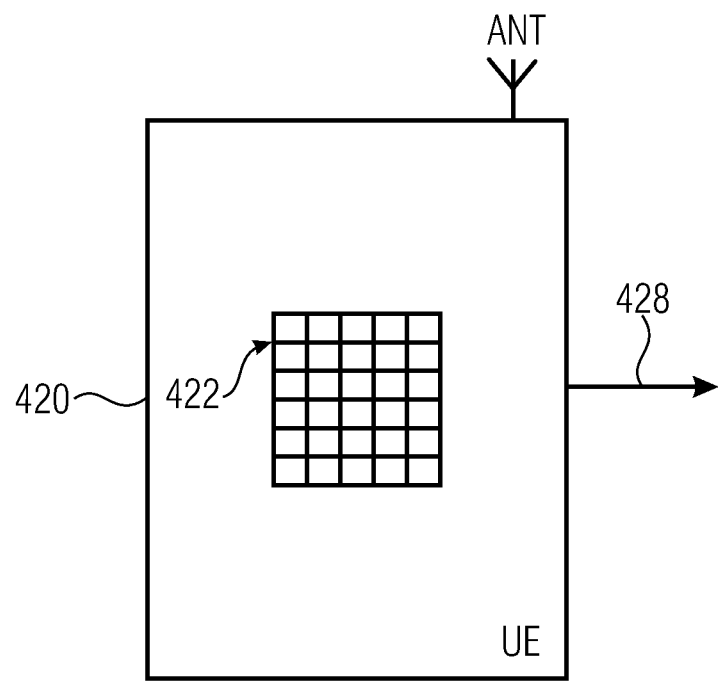
FIG. 22 illustrates a UE in accordance with embodiments of the second aspect of the present invention.

Embodiments of a second aspect of the present invention are now described. FIG. 22 illustrates a UE in accordance with embodiments of the second aspect of the present invention and providing Coverage enhancements for SRS transmissions. FIG. 22 illustrates a UE 420 for a wireless communication network, of like the system or network described above with reference to FIG. 1. The UE is configured or preconfigured with one or more Sounding Reference Signal, SRS, resources to be used for SRS transmissions, as is indicated at 422. The one or more SRS resources include a plurality of frequency domain resources 424 defining an SRS bandwidth region. The UE transmits an SRS transmit sequence 429 on
- every r-th resource element of a PRB associated with the SRS bandwidth region, or
- on every r-th resource element across all PRBs.

Embodiments of the second aspect of the present invention facilitate enhancements of the capacity of the uplink SRS transmissions by allowing a number of SRS resources associated with a single UE or multiple UEs to be multiplexed in the frequency domain. The multiplexing of a large number of SRS resources may enhance the uplink capacity of the SRS transmissions.

In one embodiment, the UE may be configured to transmit the SRS transmit sequence on every r-th resource element of a PRB associated with the configured bandwidth region of an SRS resource and is configured to be used for SRS transmission of the said resource. In some examples, $r \in \{1, 2, 4, 8, 12\}$. When r=8, eight different SRS resources associated with a single UE or multiple UEs may be multiplexed for the same bandwidth region.

In one embodiment, the UE may be configured to transmit the SRS transmit sequence on every r-th resource element across all PRBs associated with the configured bandwidth region of an SRS resource and are configured to be used for SRS transmission of a resource. In some examples, $r \in \{1, 2, 4, 8, 12\}$. For example, when r=8 and $m_{SRS,b}=8$ PRBs every eight RE is sounded out of a total of 96 REs, and eight different SRS resources associated with a single UE or multiple UEs may be multiplexed.

In one method, the value of 'r' may be higher layer configured (e.g., via RRC or MAC-CE) to the UE. In another method, the value of 'r' is indicated to the UE via the physical layer (e.g., via the DCI).

The following embodiments facilitate enhancements of the SRS transmission capacity and coverage by allowing multiplexing a large number of SRS resources in a first SRS transmission to obtain a 'coarse' estimate of the channel and to aid the gNB in determining a set of frequency domain resources used for a second SRS transmission to obtain a 'fine' estimate of the channel.

In accordance with embodiments, the UE may be configured to transmit the SRS transmit sequence on every r-th resource element of a PRB or across all PRBs associated with the configured bandwidth region of an SRS resource, wherein the value of 'r' is configured to the UE. In addition, the UE may be configured to use a value of 'Kr' for the first SRS transmission of an SRS resource and a value of 'r' for the second SRS transmission of an SRS resource. In one example, the first SRS transmission may be associated with the sounding of all N subbands of the configured bandwidth region and the second SRS transmission may be associated with the sounding of one or more subbands of the configured bandwidth region. In one example, the value of 'K' may be dependent on the configured value of 'r'. In another example, the value of K may be fixed in the specification or configured to the UE via higher-layer signaling (e.g., via RRC or MAC-CE) or via physical layer signaling (e.g., DCI). In one example, the value of K is selected from the set $K \in \{1, 2, 4, 8\}$.

In accordance with embodiments, the UE may be configured to transmit the SRS transmit sequence on every r-th resource element of a PRB or across all PRBs associated with the configured bandwidth region of an SRS resource, wherein the value of 'r' is configured to the UE. In addition, the UE may be configured to use a value of 'r' for the first SRS transmission of an SRS resource and the value of 'Kr' for the second SRS transmission of an SRS resource. In one example, the first SRS transmission may be associated with the sounding of all N subbands of the configured bandwidth region and the second SRS transmission may be associated with sounding of one or more subbands of the configured bandwidth region. In one example, the value of 'K' may be dependent on the configured value of 'r'. In another example, the value of K may be fixed in the specification or configured to the UE via higher-layer signaling (e.g., via RRC or MAC-CE) or via physical layer signaling (e.g., DCI). In one example, the value of K is selected from the set $$K \in \left\{ \frac{1}{8}, \frac{1}{4}, \frac{1}{2}, \frac{3}{4}, 1 \right\}.$$

In one embodiment, the UE may be configured with two values of 'r' i.e., {$r_1$, $r_2$}, wherein the first value '$r_1$' may be used for the first SRS transmission of an SRS resource and the second value '$r_2$' may be used for the second SRS transmission of an SRS resource and wherein $r_1 > r_2$. In one example, the first SRS transmission may be associated with the sounding of N subbands of the configured bandwidth region and the second SRS transmission may be associated with sounding one or more subbands of the configured bandwidth region. In one example, only '$r_1$' is configured and '$r_2$' is derived from '$r_1$'. In another example, '$r_2$' is configured and '$r_1$' is derived.

In accordance with embodiments, for an SRS resource with a configured bandwidth region of size $m_{SRS,b}$ PRBs, the UE may be configured with a 'r' value such that the SRS transmit sequence is greater than or equal to 12. In other words, the value of 'r' that is configured to the UE may be dependent on the configured bandwidth region of size $m_{SRS,b}$ PRBs. Here, $b=b_{hop}$ or b=min (b hop, $b_{SRS}$). In one example, for $m_{SRS,b} < 96$ PRBs, the UE may be configured with a value of r<8. In another example, for $m_{SRS,b} < 144$ PRBs, the UE may be configured with a value of r<12.

In one embodiment, when two resources are configured with an identical value of 'r' or '$r_1$' or '$r_2$', the UE may be additionally configured with a parameter '$r_{offset}$' to separate the two resources from overlapping in the frequency domain. The parameter '$r_{offset}$' shifts the position of the SRS transmit sequence with respect to a PRB boundary by 'r' REs. For example, when r=2, one resource may be configured with a $r_{offset}=0$ and the other resource may be configured with an $r_{offset}=1$. The parameter $r_{offset}$ takes the following values $r_{offset} \in \{0, 1, \ldots, r-1\}$.

Third Aspect

Figure 23:
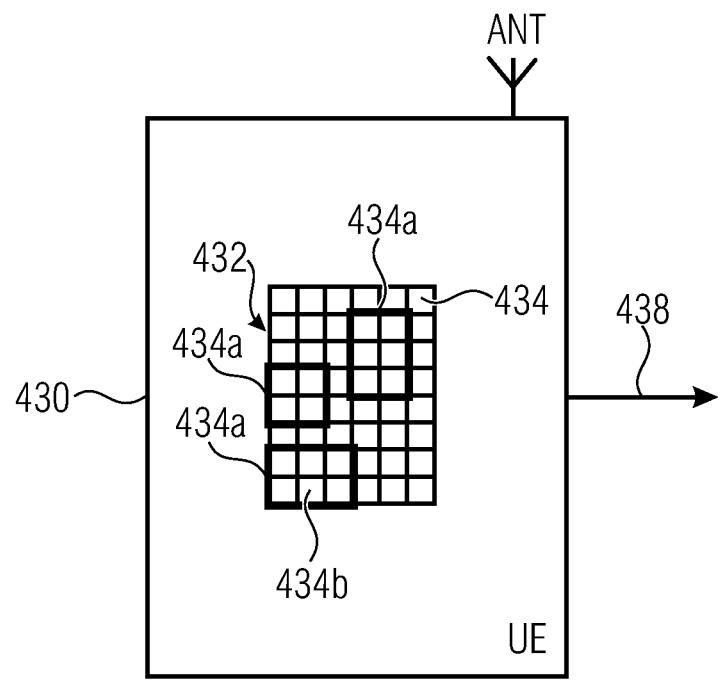
FIG. 23 illustrates a UE in accordance with embodiments of the third aspect of the present invention.

Embodiments of a third aspect of the present invention are now described. FIG. 23 illustrates a UE in accordance with embodiments of the second aspect of the present invention and providing an SRS transmission granularity. FIG. 23 illustrates a UE 430 for a wireless communication network, of like the system or network described above with reference to FIG. 1. The UE is configured or preconfigured with one or more Sounding Reference Signal, SRS, resources to be used for SRS transmissions, as is indicated at 432. The one or more SRS resources include a plurality of frequency domain resources 434 defining an SRS bandwidth region which comprises D PRB subsets 434a. Each PRB subset 434a comprises Z PRBs 434b. The UE perform an SRS transmission 438 over D or less than D PRB subsets. For each PRB subset, G PRBs out of the Z PRBs are used for the SRS transmission 438, wherein G<Z and G≥1.

Embodiments of the third aspect of the present invention facilitate further enhancements for increasing the uplink SRS transmission capacity compared to current NR systems by orthogonalizing SRS transmissions from multiple UEs in the frequency domain.

The user equipment, UE, 400 may perform a method including the following steps:
receiving, from a network node, a sounding reference signal, SRS, configuration 432 providing one or more SRS resources 434, each SRS resource comprising one or more SRS ports, a set of frequency domain resources defining the SRS transmission bandwidth, and a number of symbol resources for the SRS transmission, wherein the transmission bandwidth is defined by $m_{SRS,b}$ PRBs comprising D PRB subsets, wherein each PRB subset comprises Z PRBs, and
performing the SRS transmission over D or less than D PRB subsets 434a, wherein for each PRB subset G PRB(s) out of Z PRBs 434b are used for the SRS transmission, wherein G≤Z and G≥1.

In accordance with embodiments, the $m_{SRS,b}$ PRBs that define the SRS transmission bandwidth of an SRS resource are grouped into D PRB subsets, wherein each PRB subset has a size of Z PRBs. Here, $b=b_{hop}$ and $b_{hop} < b_{SRS}$ or b=min ($b_{hop}$, $b_{SRS}$). Furthermore, in one method the SRS transmission bandwidth is grouped into a number of subbands, wherein each subband is associated with one or more PRB subsets comprising QZ PRBs, where Q≥1. Here, each PRB subset comprises Z PRBs and defines the granularity of the SRS transmission bandwidth. This means the SRS transmission bandwidth (in number of PRBs) configured to a UE is given by a multiple of ZPRBs. For each PRB subset comprising Z PRBs, the UE is configured with a subset of G PRB(s) used for the SRS transmission, where G≤Z. The value of G may be identical for all PRB subsets. In some examples, G=1 and Z=4, or G=2 and Z=4 or G=3 and Z=4. The value of the parameter G may be fixed in the specification, or the parameter is indicated to the UE via higher layer signaling (e.g., RRC or MAC-CE) or via physical layer signaling (e.g., DCI).

In accordance with embodiments, the UE is configured with a pattern defining the frequency domain location(s) of the G PRB(s) for each PRB subset (of size Z PRBs). In some examples, the location(s) of the G PRB(s) in each PRB subset is identical for all PRB subsets. For example, for Z=4 and G=1, there are four possible patterns for the frequency domain location(s) of the single (G=1) PRB. The patterns are defined by pairs {$x_1$, $x_2$, $x_3$, $x_4$}={1, 0, 0, 0}, {$x_1$, $x_2$, $x_3$, $x_4$}={0, 1, 0, 0}, {$x_1$, $x_2$, $x_3$, $x_4$}={0, 0, 1, 0}, {$x_1$, $x_2$, $x_3$, $x_4$}={0, 0, 0, 1}, where each $x_i$ is associated with a PRB of the PRB subset of size four. When $x_i$=1, the i-th PRB of the PRB subset is used for SRS sounding. When $x_i$=0, the i-th PRB is not used for SRS sounding. The pattern defining the frequency domain location(s) of the G PRB(s) per PRB subset (of size Z PRBs) may be indicated via a higher layer (e.g., RRC or MAC-CE) or indicated via the physical layer (e.g., DCI).

In accordance with embodiments, the UE is configured with a parameter 'g' that indicates a pattern, out of $\binom{Z}{G}$ possible patterns for each PRB subset, or it indicates a pattern out of P pre-defined patterns, where P≤$\binom{Z}{G}$, defining the frequency domain location(s) of the G PRB(s) per PRB subset (of size Z PRBs). For example, when Z=4 and G=1, g=0 may be associated with the pattern {$x_1$, $x_2$, $x_3$, $x_4$}={1, 0, 0, 0} and g=1 may be associated with the pattern {$x_1$, $x_2$, $x_3$, $x_4$}={0, 1, 0, 0}, and so on.

Figure 24:
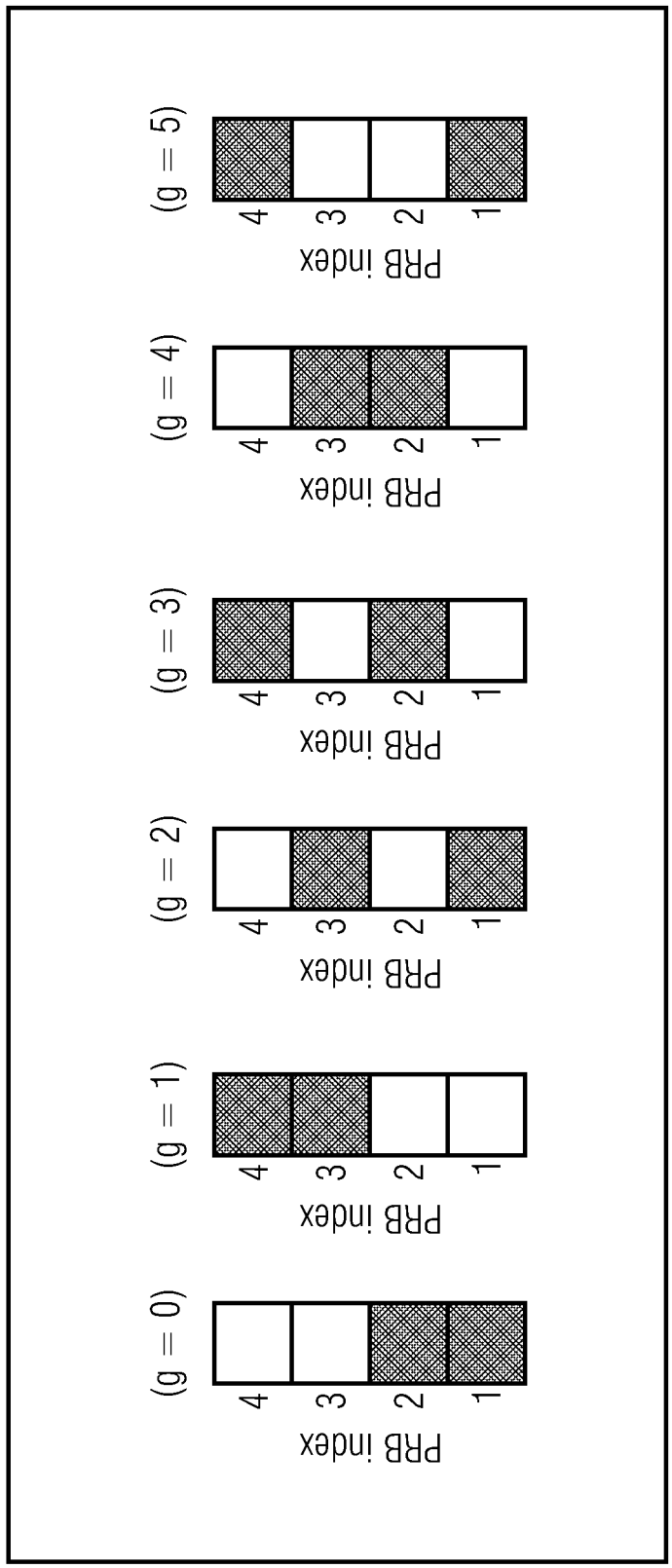
FIG. 24 illustrates an example association of 'g' to six different combinations of selecting G=2 PRBs out of Z=4 PRBs . . .

FIG. 24 shows an example of different patterns for G=2 and Z=4. The association of the value 'g' to each pattern is shown in the figure as well.

In accordance with embodiments, the value of 'g' may be fixed in the specification, or indicated to the UE via higher-layer signaling (e.g., RRC or MAC-CE) or via physical layer signaling (e.g., DCI).

In accordance with embodiments, when at least two SRS resources are configured with the same value of 'r' and the same value of 'g', the UE does not expect to be configured with the same value of '$r_{offset}$' for the configured SRS resources.

In accordance with embodiments, when at least two SRS resources are configured with the same value of 'r' and the same value of '$r_{offset}$,' the UE does not expect to be configured with the same value of 'g' for the configured SRS resources.

General

Although the respective aspects and embodiments of the inventive approach have been described separately, it is noted that each of the aspects/embodiments may be implemented independent from the other, or some or all of the aspects/embodiments may be combined. Moreover, the subsequently described embodiments may be used for each of the aspects/embodiments described so far.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments of the present invention, a network entity comprises one or more of the following: a macro cell base station, or a small cell base station, or a central unit of a base station, an integrated access and backhaul, IAB, node, or a distributed unit of a base station, or a road side unit (RSU), or a remote radio head, or an AMF, or an MME, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 25 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory, RAM, and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] 3GPP TS 38.214 V15.8.0: "3GPP; TSG RAN; NR; Physical layer procedures for data (Rel. 15).", January. 2020.
[2] 3GPP TS 38.331 V16.0.0: "3GPP; TSG RAN; NR; Radio Resource control (RRC) protocol specification (Rel. 16).", March. 2020.
[3] 3GPP TS 38.211 V16.1.0: "3GPP; TSG RAN; NR; Physical channels and modulation (Rel. 16).", March. 2020.

The invention claimed is:

1. A user equipment, UE, for a wireless communication network, wherein:
   the UE is configured or preconfigured with one or more Sounding Reference Signal, SRS, resources to be used for a SRS transmission, the one or more SRS resources comprising a plurality of frequency domain resources, wherein a bandwidth region used for the SRS transmission is associated with a set of frequency domain resources and segmented into multiple subbands, the bandwidth region being of size $m_{SRS,b}$ Physical Resource Blocks, PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where $U \leq N$, and N denotes the number of subbands, and each bandwidth segment being associated with one or more subbands,
   responsive to receiving an indication of a subset of SRS frequency domain resources, the UE is to perform an SRS transmission using the indicated subset of frequency domain resources, the indication indicating a single bandwidth segment to be used for the SRS transmission, and
   the segmentation of the bandwidth region into U segments or the grouping of N subbands into U segments is performed such that each segment is associated with $f \cdot m_{SRS,b}$ PRBs, with $b=b_{hop}$ or $b=\min(b_{hop}, b_{SRS})$ and $f \in [0, 1] \subset \mathbb{R}$.

2. The user equipment, UE, of claim 1, wherein the number of frequency domain resources in the subset of SRS frequency domain resources used for the SRS transmission is less than the number of frequency domain resources with which the UE is configured or preconfigured.

3. The user equipment, UE, of claim 1, wherein the UE is to perform the SRS transmission on the indicated subset of frequency domain resources over one or more symbol resources.

4. The user equipment, UE, of claim 1, wherein each SRS resource comprises one or more SRS ports, a set of frequency domain resources defining an SRS sounding bandwidth, and a number of SRS symbol resources.

5. The user equipment, UE, of claim 1, wherein the plurality of SRS resources comprises N SRS subbands, with $N>1$, each SRS subband comprising a plurality of contiguous or non-contiguous Physical Resource Blocks, PRBs.

6. The user equipment, UE, of claim 1, wherein the UE is configured with one or more SRS parameters, like a number N or a size S of the SRS sounding subbands, via higher layer signaling, like RRC or MAC-CE signaling.

7. The user equipment, UE, of claim 1, wherein, for $f=¼$, the bandwidth region is segmented into four non-overlapping segments, the first segment being associated with a first set of N/4 contiguous subbands, the second segment being associated with a second set of N/4 contiguous subbands, the third segment being associated with a third set of N/4 contiguous subbands and the fourth segment being associated with a fourth set of N/4 contiguous subbands.

8. The user equipment, UE, of claim 1, wherein, for $$f = \frac{1}{2},$$

the bandwidth is segmented into two non-overlapping segments, the first segment being associated with a first set of N/2 contiguous subbands and the second segment being associated with the remaining N/2 contiguous subbands.

9. The user equipment, UE, of claim 1, wherein a sounding subband size S is given by $$S = \left\lceil \frac{m_{SRS,b}}{N} \right\rceil \text{ or } \left\lfloor \frac{m_{SRS,b}}{N} \right\rfloor,$$

with $\lceil \cdot \rceil$ and $\lfloor \cdot \rfloor$ representing the ceiling and floor functions, respectively or $$S = \frac{m_{SRS,b}}{N},$$

if N is a multiple of $m_{SRS,b}$.

10. The user equipment, UE, of claim 1, wherein the UE is to perform an SRS transmission over one or more SRS symbol resources, each SRS symbol resource carrying an SRS transmit sequence in a specific set of SRS frequency-domain resources, and the set of SRS frequency-domain resources being associated either with the resources of one subband or with a part or a subset of the resources of one subband.

11. The user equipment, UE, of claim 10, wherein the subband size is equal to a hopping bandwidth of $m_{SRS,b}$ PRBs, with $b=b_{SRS}$, such that each SRS symbol resource is associated with all $m_{SRS,b}$ PRBs of one subband.

12. An entity for a wireless communication network, wherein:
the entity is to configure or preconfigure a user equipment, UE, with one or more Sounding Reference Signal, SRS, resources to be used for a Sounding Reference Signal, SRS, transmission, the one or more SRS resources comprising a plurality of SRS frequency domain resources,
the entity is to signal to the UE an indication of a subset of SRS frequency domain resources to be used by the UE for performing the SRS transmission,
a bandwidth region used for the SRS transmission is associated with a set of frequency domain resources and segmented into multiple subbands, the bandwidth region being of size $m_{SRS,b}$ Physical Resource Blocks PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where U≤N, and N denotes the number of subbands, and each bandwidth segment being associated with one or more subbands,
the indication indicates a single bandwidth segment to be used for the SRS transmission, and
the segmentation of the bandwidth region into U segments of the grouping of N subbands into U segments is performed such that each segment is associated with $f \cdot m_{SRS,b}$ PRBs, with $b=b_{hop}$ or $b=\min(b_{hop}, b_{SRS})$ and $f \in [0, 1] \subset R$.

13. A method for operating a user equipment, UE, for a wireless communication network, the method comprising:
configuring or preconfiguring the UE with one or more Sounding Reference Signal, SRS, resources to be used for a SRS transmission, the one or more SRS resources comprising a plurality of frequency domain resources, wherein a bandwidth region used for the SRS transmission is associated with a set of frequency domain resources and segmented into multiple subbands, the bandwidth region being of size $m_{SRS,b}$ Physical Resource Blocks, PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where U≤N, and N denotes the number of subbands, and each bandwidth segment being associated with one or more subbands, and responsive to receiving an indication of a subset of SRS frequency domain resources, performing an SRS transmission using the indicated subset of frequency domain resources, the indication indicating a single bandwidth segment to be used for the SRS transmission,
wherein segmentation of the bar id region into U segments or the grouping of N subbands into U segments is performed such that each segment is associated with $f \cdot m_{SRS,b}$ PRBs, with $b=b_{hop}$ or $b=\min(b_{hop}, b_{SRS})$ and $f \in [0, 1] \subset R$.

14. A method for operating an entity for a wireless communication network, the method comprising:
configuring or preconfiguring a user equipment, UE, with one or more Sounding Reference Signal, SRS, resources to be used for a Sounding Reference Signal, SRS, transmission, the one or more SRS resources comprising a plurality of SRS frequency domain resources, and
signaling to the UE an indication of a subset of SRS frequency domain resources to be used by the UE for performing the SRS transmission,
wherein a bandwidth region used for the SRS transmission is associated with a set of frequency domain resources and segmented into multiple subbands, the bandwidth region being of size $m_{SRS,b}$ Physical Resource Blocks (PRBs), where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where U≤N, and N denotes the number of subbands, and each bandwidth segment being associated with one or more subbands,
wherein the indication indicates a single bandwidth segment to be used for the SRS transmission, and
wherein the segmentation of the bandwidth region into U segments or the grouping of N subbands into U segments is performed such that each segment is associated with $f \cdot m_{SRS,b}$ PRBs, with $b=b_{hop}$ or $b=\min(b_{hop}, b_{SRS})$ and $f \in [0, 1] \subset R$.

15. A non-transitory digital storage medium having a computer program stored thereon to perform
a method for operating a user equipment, UE, for a wireless communication network, the method comprising:
configuring or preconfiguring the UE with one or more Sounding Reference Signal, SRS, resources to be used for a SRS transmission, the one or more SRS resources comprising a plurality of frequency domain resources, wherein a bandwidth region used for the SRS transmission is associated with a set of frequency domain resources and segmented into multiple subbands, the bandwidth region being of size $m_{SRS,b}$ Physical Resource Blocks, PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where U≤N, and N denotes the number of subbands, and each bandwidth segment being associated with one or more subbands, and
responsive to receiving an indication of a subset of SRS frequency domain resources, performing an SRS transmission using the indicated subset of frequency domain resources, the indication indicating a single bandwidth segment to be used for the SRS transmission, wherein the segmentation of the bandwidth region into U segments or the grouping of N subbands into U segments is performed such that each segment is associated with $f \cdot m_{SRS,b}$ PRBs, with $b=b_{hop}$ or $b=\min(b_{hop}, b_{SRS})$ and $f \in [0, 1] \subset R$, or a method for operating an entity for a wireless communication network, the method comprising:
configuring or preconfiguring a user equipment, UE, with one or more Sounding Reference Signal, SRS, resources to be used for a Sounding Reference Signal, SRS, transmission, the one or more SRS resources comprising a plurality of SRS frequency domain resources, and
signaling to the UE an indication of a subset of SRS frequency domain resources to be used by the UE for performing the SRS transmission,
wherein a bandwidth region used for the SRS transmission is associated with a set of frequency domain resources and segmented into multiple subbands, the bandwidth region being of size $m_{SRS,b}$ Physical Resource Blocks, PRBs, where $b=b_{hop}$ or $b=\min(b_{hop}, b_{SRS})$, $b_{SRS}$ determines a hopping bandwidth and $b_{hop}$ determines a sounding bandwidth, and segmented into U overlapping or non-overlapping bandwidth segments, where $U \le N$, and N denotes the number of subbands, and each bandwidth segment being associated with one or more subbands,
wherein the indication indicates a single bandwidth segment to be used for the SRS transmission, and
wherein the segmentation of the bandwidth region into U segments or the grouping of N subbands into U segments is performed such that each segment is associated with $f \cdot m_{SRS,b}$ PRBs, With $b=b_{hop}$ or $b=\min(b_{hop}, b_{SRS})$ and $f \in [0, 1] \subset R$.

* * * * *